United States Patent
Kwak et al.

(10) Patent No.: US 10,848,797 B2
(45) Date of Patent: Nov. 24, 2020

(54) BROADCAST SIGNAL TRANSMITTING APPARATUS, BROADCAST SIGNAL RECEIVING APPARATUS, METHOD FOR TRANSMITTING BROADCAST SIGNAL, AND METHOD FOR RECEIVING BROADCAST SIGNAL

(71) Applicant: LG ELECTRONICS INC., Seoul (KR)

(72) Inventors: Minsung Kwak, Seoul (KR); Seungryul Yang, Seoul (KR); Kyoungsoo Moon, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/206,494

(22) Filed: Nov. 30, 2018

(65) Prior Publication Data
US 2019/0098342 A1 Mar. 28, 2019

Related U.S. Application Data

(60) Division of application No. 15/872,578, filed on Jan. 16, 2018, now Pat. No. 10,284,886, which is a
(Continued)

(51) Int. Cl.
*H04N 21/2362* (2011.01)
*H04N 21/41* (2011.01)
(Continued)

(52) U.S. Cl.
CPC ....... *H04N 21/2362* (2013.01); *H04N 21/233* (2013.01); *H04N 21/234* (2013.01);
(Continued)

(58) Field of Classification Search
CPC ............. H04N 21/2362; H04N 21/233; H04N 21/234; H04N 21/235; H04N 21/23892;
(Continued)

(56) References Cited

U.S. PATENT DOCUMENTS

| | | | |
|---|---|---|---|
| 5,900,908 A | 5/1999 | Kirkland | |
| 6,487,722 B1 | 11/2002 | Okura et al. | |

(Continued)

FOREIGN PATENT DOCUMENTS

| | | |
|---|---|---|
| CN | 101094434 A | 12/2007 |
| CN | 101132292 A | 2/2008 |

(Continued)

OTHER PUBLICATIONS

Wu et al., "Very-High Power Density AlGaN/GaN HEMTs," IEEE Transactions on Electronic Devices, vol. 48, No. 3, Mar. 2001, pp. 586-590.

*Primary Examiner* — John R Schnurr
(74) *Attorney, Agent, or Firm* — Dentons US LLP

(57) ABSTRACT

An apparatus for receiving a broadcast signal, includes a receiver configured to receive the broadcast signal including physical layer signaling data, signaling data, content data and service guide information, wherein the signaling data is included in a signal frame indicated by the physical layer signaling data, wherein the signaling data includes mapping information between a service and a PLP, and information supporting channel scanning and service acquisition, wherein the service guide information includes a service fragment having information about the broadcast service and a content fragment having information about content data of the broadcast service, wherein the content fragment further includes a content-level PrivateExt element having component information of the content data, wherein the component information includes information for a component in the broadcast service, and wherein the component is one of a
(Continued)

video component, an audio component, and a closed caption component (CC).

16 Claims, 95 Drawing Sheets

Related U.S. Application Data continuation of application No. 15/115,567, filed as application No. PCT/KR2015/004171 on Apr. 27, 2015, now Pat. No. 9,888,271.

(60) Provisional application No. 62/003,039, filed on May 27, 2014, provisional application No. 62/000,515, filed on May 19, 2014, provisional application No. 61/991,624, filed on May 12, 2014, provisional application No. 61/984,854, filed on Apr. 27, 2014.

(51) Int. Cl.
| | |
|---|---|
| H04N 21/45 | (2011.01) |
| H04N 21/258 | (2011.01) |
| H04N 21/482 | (2011.01) |
| H04N 21/462 | (2011.01) |
| H04N 21/234 | (2011.01) |
| H04N 21/235 | (2011.01) |
| H04N 21/472 | (2011.01) |
| H04N 21/2389 | (2011.01) |
| H04N 21/434 | (2011.01) |
| H04N 21/233 | (2011.01) |
| H04N 21/262 | (2011.01) |
| H04N 21/439 | (2011.01) |
| H04N 21/44 | (2011.01) |
| H04N 21/488 | (2011.01) |
| H04N 21/81 | (2011.01) |

(52) U.S. Cl.
CPC ..... *H04N 21/235* (2013.01); *H04N 21/23892* (2013.01); *H04N 21/258* (2013.01); *H04N 21/26283* (2013.01); *H04N 21/41* (2013.01); *H04N 21/439* (2013.01); *H04N 21/4345* (2013.01); *H04N 21/44* (2013.01); *H04N 21/45* (2013.01); *H04N 21/462* (2013.01); *H04N 21/472* (2013.01); *H04N 21/47211* (2013.01); *H04N 21/4821* (2013.01); *H04N 21/4884* (2013.01); *H04N 21/816* (2013.01)

(58) Field of Classification Search
CPC ........... H04N 21/258; H04N 21/26283; H04N 21/41; H04N 21/4345; H04N 21/439; H04N 21/44; H04N 21/45; H04N 21/462; H04N 21/472; H04N 21/47211; H04N 21/4821; H04N 21/4884; H04N 21/816
See application file for complete search history.

(56) References Cited

U.S. PATENT DOCUMENTS

| | | |
|---|---|---|
| 7,092,888 B1 | 8/2006 | McCarthy et al. |
| 7,774,815 B1 | 8/2010 | Allen |
| 7,814,524 B2 | 10/2010 | Candelore |
| 8,296,808 B2 | 10/2012 | Hardacker et al. |
| 8,423,363 B2 | 4/2013 | Gupta et al. |
| 8,572,488 B2 | 10/2013 | Phillips et al. |
| 8,694,533 B2 | 4/2014 | Oztaskent et al. |
| 8,712,218 B1 | 4/2014 | Begeja et al. |
| 2002/0170053 A1 | 11/2002 | Peterka et al. |
| 2002/0170068 A1 | 11/2002 | Rafey et al. |
| 2003/0025832 A1 | 2/2003 | Swart et al. |
| 2003/0206717 A1 | 11/2003 | Yogeshwar et al. |
| 2004/0096110 A1 | 5/2004 | Yogeshwar et al. |
| 2004/0210931 A1 | 10/2004 | Gordon et al. |
| 2005/0080915 A1 | 4/2005 | Shoemaker et al. |
| 2005/0188411 A1 | 8/2005 | Dacosta |
| 2005/0204646 A1 | 9/2005 | Tupper et al. |
| 2006/0015339 A1 | 1/2006 | Charlesworth et al. |
| 2006/0285508 A1 | 12/2006 | Vermola et al. |
| 2007/0050820 A1 | 3/2007 | Saarikivi et al. |
| 2007/0061862 A1 | 3/2007 | Berger et al. |
| 2007/0100984 A1 | 5/2007 | Jansky et al. |
| 2007/0110057 A1 | 5/2007 | Hwang et al. |
| 2007/0112837 A1 | 5/2007 | Houh et al. |
| 2007/0123244 A1 | 5/2007 | Paila |
| 2007/0124756 A1 | 5/2007 | Covell et al. |
| 2007/0124788 A1 | 5/2007 | Wittkoter |
| 2008/0091713 A1 | 4/2008 | Candelore et al. |
| 2008/0097984 A1 | 4/2008 | Candelore |
| 2008/0148318 A1 | 6/2008 | Jung et al. |
| 2008/0204595 A1 | 8/2008 | Rathod et al. |
| 2009/0054042 A1 | 2/2009 | Kim et al. |
| 2009/0070659 A1 | 3/2009 | Zhong et al. |
| 2009/0070811 A1 | 3/2009 | Song et al. |
| 2009/0094644 A1 | 4/2009 | Jung et al. |
| 2009/0210899 A1 | 8/2009 | Lawrence-Apfelbaum et al. |
| 2009/0253416 A1 | 10/2009 | Lee et al. |
| 2010/0162334 A1 | 6/2010 | Suh et al. |
| 2010/0180310 A1 | 7/2010 | Lee et al. |
| 2010/0250764 A1 | 9/2010 | Vare et al. |
| 2010/0299702 A1 | 11/2010 | Lo et al. |
| 2010/0316131 A1 | 12/2010 | Shanableh et al. |
| 2011/0055867 A1 | 3/2011 | Lee et al. |
| 2011/0069940 A1 | 3/2011 | Shimy et al. |
| 2011/0096232 A1 | 4/2011 | Dewa et al. |
| 2011/0126239 A1 | 5/2011 | Lee et al. |
| 2011/0145883 A1 | 6/2011 | Godar et al. |
| 2011/0221873 A1 | 9/2011 | Eyer |
| 2011/0231876 A1 | 9/2011 | Choe et al. |
| 2011/0258654 A1 | 10/2011 | Lee et al. |
| 2011/0289530 A1 | 11/2011 | Dureau et al. |
| 2011/0289533 A1 | 11/2011 | White et al. |
| 2011/0307925 A1 | 12/2011 | Vaysman et al. |
| 2012/0131616 A1 | 5/2012 | Kunkel et al. |
| 2012/0250800 A1 | 10/2012 | Shankaraiah et al. |
| 2013/0081087 A1 | 3/2013 | Lee et al. |
| 2013/0097627 A1 | 4/2013 | Hwang et al. |
| 2013/0117624 A1 | 5/2013 | Nicolas et al. |
| 2013/0283311 A1 | 10/2013 | Eyer |
| 2014/0002593 A1 | 1/2014 | Zhang et al. |
| 2014/0020036 A1 | 1/2014 | Hasek et al. |
| 2014/0025389 A1 | 1/2014 | Hoffmann |
| 2014/0047496 A1 | 2/2014 | Kim et al. |
| 2015/0082349 A1 | 3/2015 | Ishtiaq et al. |
| 2015/0100859 A1 | 4/2015 | Petrov |
| 2015/0317304 A1 | 11/2015 | An et al. |
| 2017/0070306 A1* | 3/2017 | Deshpande .......... H04N 21/435 |

FOREIGN PATENT DOCUMENTS

| | | |
|---|---|---|
| CN | 101273560 A | 9/2008 |
| CN | 101305532 A | 11/2008 |
| CN | 101411103 A | 4/2009 |
| CN | 101500135 A | 8/2009 |
| CN | 101981839 A | 2/2011 |
| CN | 102356639 A | 2/2012 |
| CN | 102783159 A | 11/2012 |
| CN | 103428569 A | 12/2013 |
| CN | 103548358 A | 1/2014 |
| CN | 103650482 A | 3/2014 |
| EP | 2720456 A2 | 4/2014 |
| EP | 2768198 A2 | 8/2014 |
| JP | 2008-294867 A | 12/2008 |
| JP | 2009-516943 A | 4/2009 |
| JP | 2010-541461 A | 12/2010 |
| JP | 2012-23769 A | 2/2012 |
| JP | 2013-509818 A | 3/2013 |
| KR | 10-1999-0072565 A | 9/1999 |
| KR | 10-2007-0049041 A | 5/2007 |
| KR | 10-2008-0055551 A | 6/2008 |
| KR | 10-2008-0107137 A | 12/2008 |

(56) References Cited

FOREIGN PATENT DOCUMENTS

| KR | 10-2009-0035359 A | 4/2009 |
|---|---|---|
| KR | 10-2010-0099649 A | 9/2010 |
| KR | 10-2011-0111335 A | 10/2011 |
| KR | 10-1179828 B1 | 9/2012 |
| KR | 10-1377951 B1 | 3/2014 |
| WO | WO 2007/052111 A1 | 5/2007 |
| WO | WO 2008/143447 A1 | 11/2008 |
| WO | WO 2009/082167 A2 | 7/2009 |
| WO | 2012150791 A2 | 11/2012 |
| WO | 2012152589 A1 | 11/2012 |
| WO | WO 2013/055191 A2 | 4/2013 |
| WO | WO 2014/025207 A1 | 2/2014 |

\* cited by examiner

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 12

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE<br>PLS2_MOD<br>PLS2_SIZE_CELL<br>PLS2_STAT_SIZE_BIT<br>PLS2_SYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

FIG. 13

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for -1: NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1: NUM_DP | |
|     DP_ID | 6 |
|     DP_START | 15 (or13) |
|     DP_NUM_BLOCK | 10 |
|     RESERVED | 8 |
| end | |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i=1:NUM_AUX | |
|     AUX_PRIVATE_DYN | 48 |
| end | |
| CRC 32 | 32 |

FIG. 20
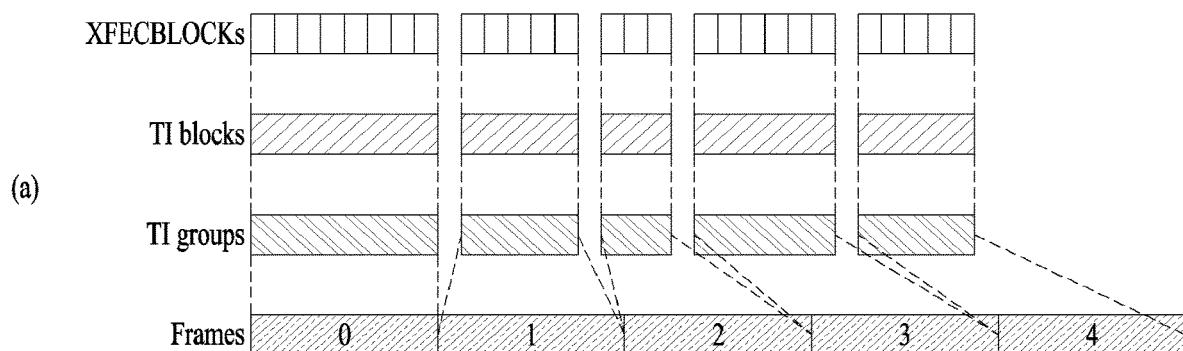
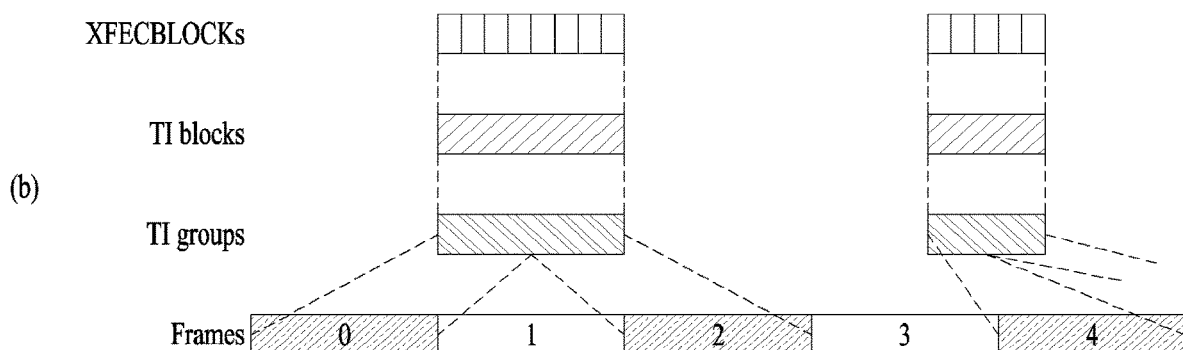
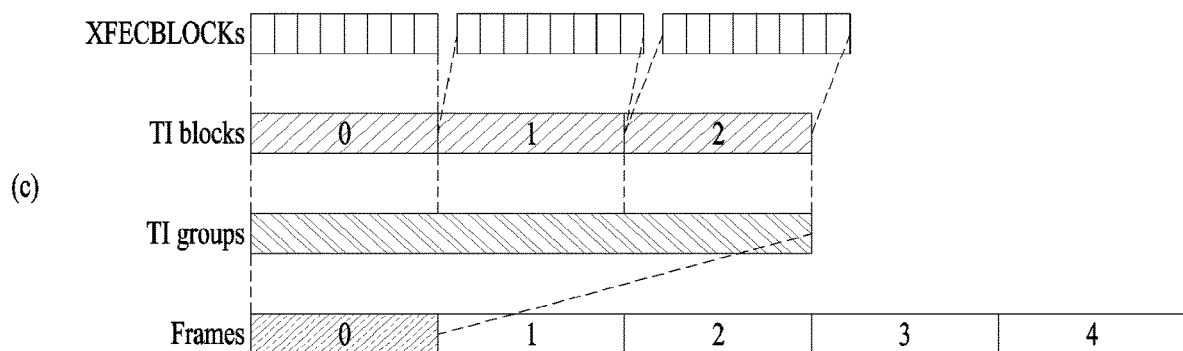

```
<xs:element name="ServiceType" type="ServiceTypeRangeType" minOccurs="0" maxOccurs="unbounded"/>
...
<xs:simpleType name="ServiceTypeRangeType">
    <xs:union memberTypes="ServiceTypeLRType ServiceTypeOtherEnablersRangeType ServiceTypeProprietaryRangeType"/>
</xs:simpleType>
<xs:simpleType name="ServiceTypeLRType">
    <xs:restriction base="xs:unsignedByte">
        <xs:minInclusive value="0"/>
        <xs:maxInclusive value="13"/>  ⟵ ⌐ 14 or 15 or 16 ... ⌐
    </xs:restriction>
</xs:simpleType>
<xs:simpleType name="ServiceTypeOtherEnablersRangeType">
    <xs:restriction base="xs:unsignedByte">
        <xs:minInclusive value="128"/>
        <xs:maxInclusive value="223"/>
    </xs:restriction>
</xs:simpleType>
<xs:simpleType name="ServiceTypeProprietaryRangeType">
    <xs:restriction base="xs:unsignedByte">
        <xs:minInclusive value="224"/>
        <xs:maxInclusive value="255"/>
    </xs:restriction>
</xs:simpleType>
```

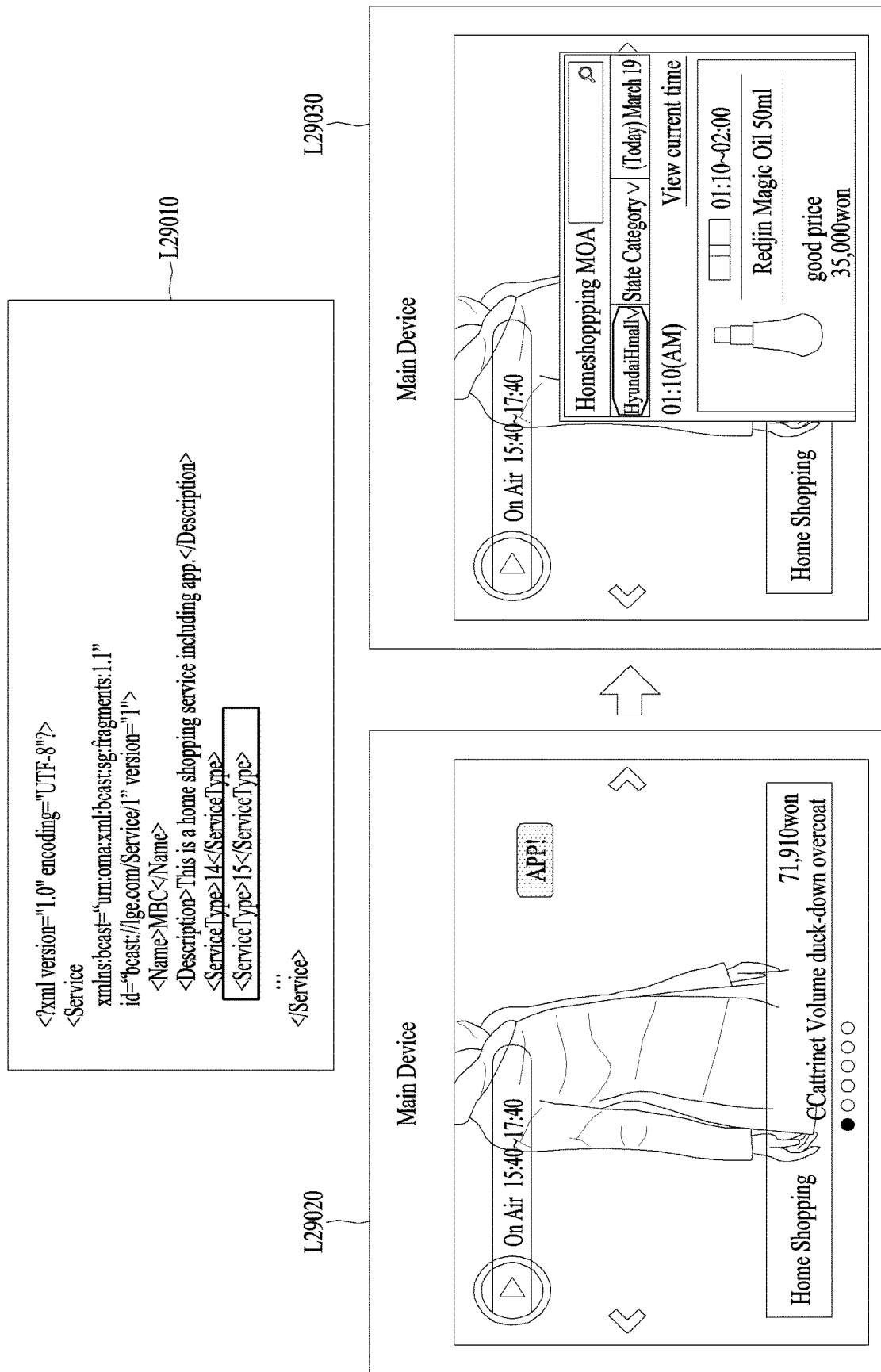

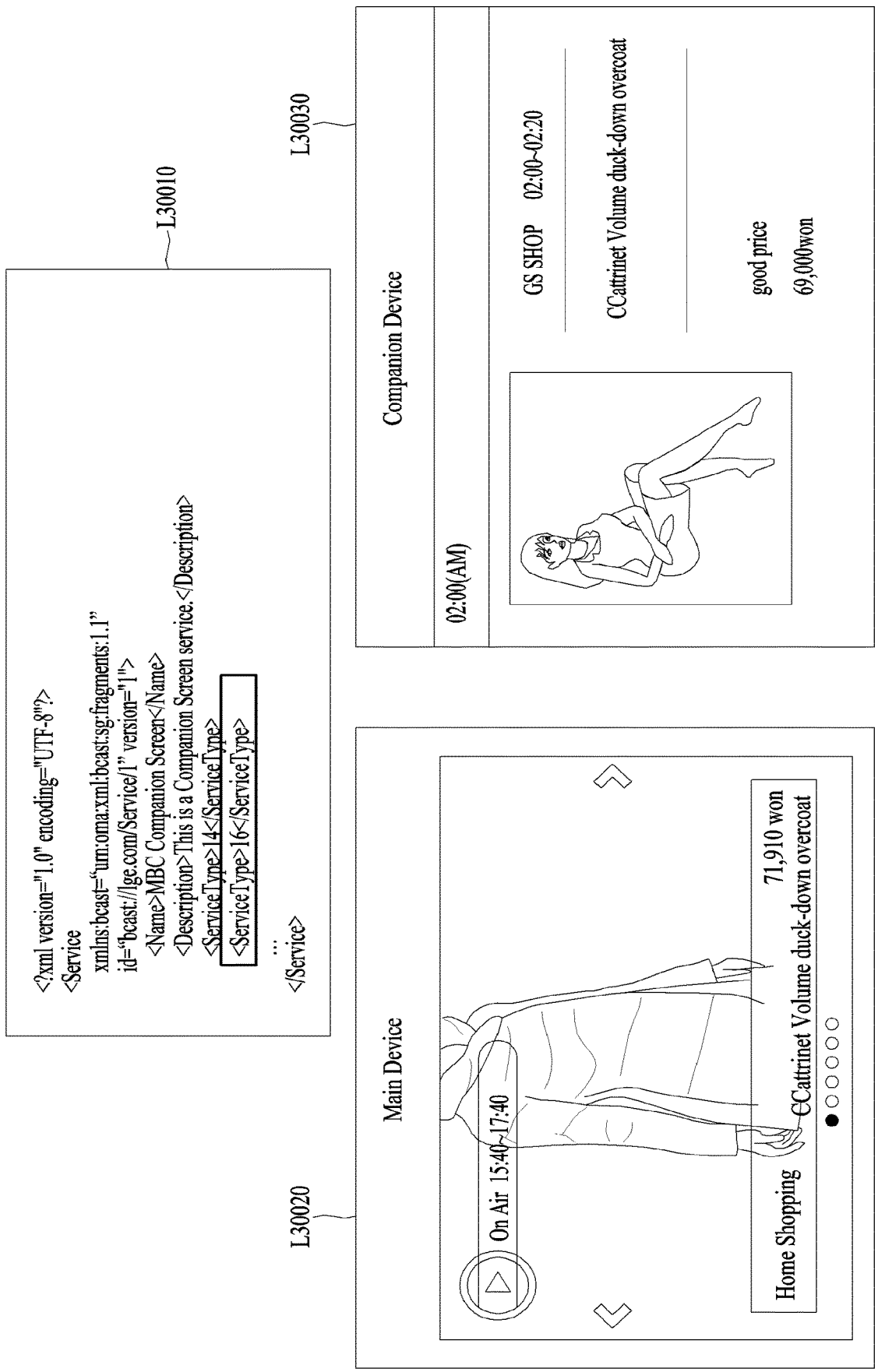

FIG. 31

```
<xs:element name="Component" type="ComponentFragmentType">
</xs:element>

<xs:complexType name="ComponentFragmentType">
    <xs:sequence>
        <xs:element name="ComponentType" type="ComponentRangeType"
                          minOccurs="1" maxOccurs="unbounded"/>
        ...
        <xs:element name="ComponentData" type="ComponentDataType" minOccurs="0"/>
        <xs:element name="PrivateExt" type="PrivateExtType" minOccurs="0"/>
    </xs:sequence>
    <xs:attribute name="id" type="xs:anyURI" use="required"/>
    <xs:attribute name="version" type="xs:unsignedInt" use="required"/>
    <xs:attribute name="validFrom" type="xs:unsignedInt" use="optional"/>
    <xs:attribute name="validTo" type="xs:unsignedInt" use="optional"/>
</xs:complexType>
```

FIG. 32

```
<!--
    Specifies the range of the ComponentContent
    0: Unspecified
    1: Continuous component
    2: Elementary component
    3: Composite component
    4: PickOne component
    5: Complex component
    6: Presentable component
    7: NRT File
    8: NRT Content Item
    9: Application
    10: ATSC3.0 Application
    11: On Demand component
    12: Notification Stream
    13: App-based Enhancement
    14-255: Reserved for future use.
-->
<xs:simpleType name="ComponentRangeType">
    <xs:restriction base="xs:unsignedByte">
        <xs:minInclusive value="0"/>
        <xs:maxInclusive value="13"/>
    </xs:restriction>
</xs:simpleType>
```

FIG. 33

```
<xs:complexType name="ComponentDataType">
    <xs:choice>
        <xs:group>
            <xs:attribute name="ContentType">
                <xs:value>Video</xs:value>
            </xs:attribute>
            <xs:element name="VideoComponent" type="VideoDataType" minOccurs="1"/>
        </xs:group>
        <xs:group>
            <xs:attribute name="ContentType">
                <xs:value>Audio</xs:value>
            </xs:attribute>
            <xs:element name="AudioComponent" type="AudioDataType" minOccurs="1"/>
        </xs:group>
        <xs:group>
            <xs:attribute name="ContentType">
                <xs:value>CC</xs:value>
            </xs:attribute>
            <xs:element name="CCComponent" type="CCDataType" minOccurs="1"/>
        </xs:group>
    </xs:choice>
</xs:complexType>
```

```
<xs:complexType name="VideoDataType">
    <xs:sequence>
        <xs:element name="VideoRole" type="VideoRoleRangeType" minOccurs="1"/>
        <xs:element name="TargetUserProfile" type="TargetUserProfileType" minOccurs="0" maxOccurs="unbounded"/>
        <xs:element name="TargetDevice" type="TargetDeviceType" minOccurs="0" maxOccurs="unbounded"/>
    </xs:sequence>
</xs:complexType>
```

L34020

```
<!--
    Specifies the role of the video
    [Presentable Video Component]
    0: Unspecified
    1: Primary (default) video
    2: Alternative camera view
    3: Other alternative video component
    4: Sign language (e.g., ASL) inset
    5: Follow subject video
    [Composite Video Component]
    6: Base layer for scalable video encoding
    7: Enhancement layer for scalable video encoding, with level
    8: 3D video left view
    9: 3D video right view
    10: 3D video depth information
    11: Part of video array, <x,y> of <n,m>
    12: Follow-Subject metadata
    [Other Video Component]
    13-255: Reserved for future use.
-->
<xs:simpleType name="VideoRoleRangeType">
    <xs:union memberTypes="PresentableVideoRoleRangeType CompositeVideoRoleRangeType VideoRoleOtherEnablersRangeType"/>
</xs:simpleType>
<xs:simpleType name="PresentableVideoRoleRangeType">
    <xs:restriction base="xs:unsignedByte">
        <xs:minInclusive value="0"/>
        <xs:maxInclusive value="5"/>
    </xs:restriction>
</xs:simpleType>
<xs:simpleType name="CompositeVideoRoleRangeType">
    <xs:restriction base="xs:unsignedByte">
        <xs:minInclusive value="6"/>
        <xs:maxInclusive value="12"/>
    </xs:restriction>
</xs:simpleType>
<xs:simpleType name="VideoRoleOtherEnablersRangeType">
    <xs:restriction base="xs:unsignedByte">
        <xs:minInclusive value="13"/>
        <xs:maxInclusive value="255"/>
    </xs:restriction>
</xs:simpleType>
```

FIG. 35

```
<xs:complexType name="AudioDataType">
    <xs:sequence>
        <xs:element name="AudioRole" type="AudioRoleRangeType" minOccurs="1"/>
        <xs:element name="TargetUserProfile" type="TargetUserProfileType" minOccurs="0" maxOccurs="unbounded"/>
        <xs:element name="TargetDevice" type="TargetDeviceType" minOccurs="0" maxOccurs="unbounded"/>
    </xs:sequence>
    <xs:attribute name="associatedTo" type="xs:anyURI" minOccurs="0" maxOccurs="unbounded"/>
    <xs:attribute name="NumberOfAudioChannels" type="xs:unsignedInt" minOccurs="0"/>
</xs:complexType>
```
— L35010

```
<!--
    Allowed values are:
    0 - unspecified
    1 - Complete main
    2 - Music
    3 - Dialog
    4 - Effects
    5 - Visually impaired
    6 - Hearing impaired
    7 - Commentary
    8-255 - Reserved for future use.
-->
<xs:simpleType name="AudioRoleRangeType">
    <xs:restriction base="xs:unsignedByte">
        <xs:minInclusive value="0"/>
        <xs:maxInclusive value="7"/>
    </xs:restriction>
</xs:simpleType>
```
— L35020

FIG. 36

```
<xs:complexType name="CCDataType">
    <xs:sequence>
        <xs:element name="CCRole" type="CCRoleRangeType" minOccurs="1"/>
        <xs:element name="TargetUserProfile" type="TargetUserProfileType" minOccurs="0" maxOccurs="unbounded"/>
        <xs:element name="TargetDevice" type="TargetDeviceType" minOccurs="0" maxOccurs="unbounded"/>
    </xs:sequence>
    <xs:attribute name="associatedTo" type="xs:anyURI" minOccurs="0" maxOccurs="unbounded"/>
</xs:complexType>
```
L36010

```
<!--
    Allowed values are:
    0 - unspecified
    1 - normal
    2 - easy reader
-->
<xs:simpleType name="CCRoleRangeType">
    <xs:restriction base="xs:unsignedByte">
        <xs:minInclusive value="0"/>
        <xs:maxInclusive value="2"/>
    </xs:restriction>
</xs:simpleType>
```
L36020

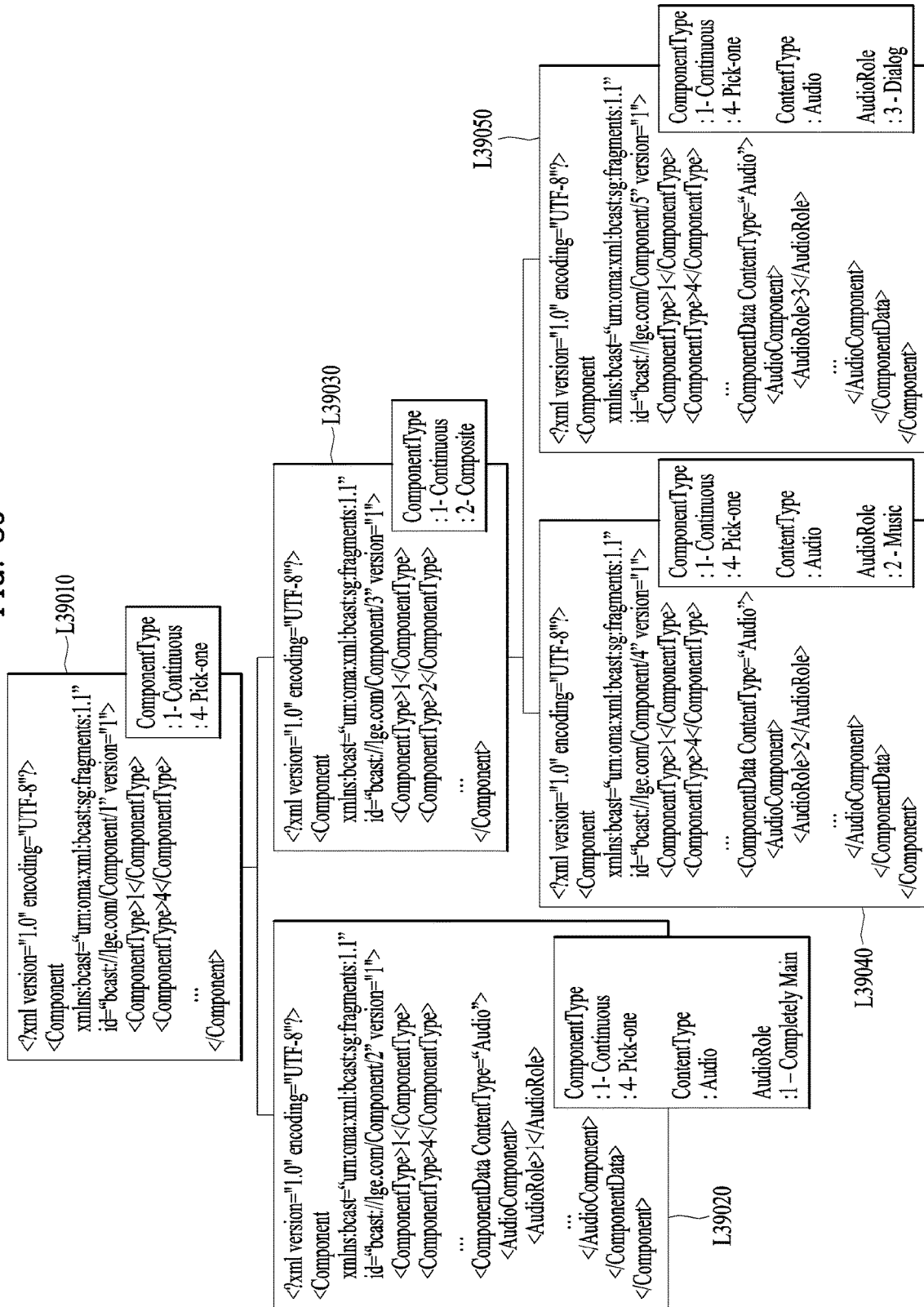

FIG. 40

```
<xs:element name="Component" type="ComponentElementType"></xs:element>
<xs:complexType name="ComponentElementType">
    <xs:sequence>
        <xs:element name="VideoData" type="VideoDataType" minOccurs="0"/>
        <xs:element name="AudioData" type="AudioDataType" minOccurs="0"/>
        <xs:element name="CCData" type="CCDataType" minOccurs="0"/>
    </xs:sequence>
</xs:complexType>
<xs:complexType name="VideoDataType">
    <xs:sequence>
        <xs:element name="VideoRole" type="VideoRoleRangeType" minOccurs="1"/>
        <xs:element name="TargetUserProfile" type="TargetUserProfileType" minOccurs="0" maxOccurs="unbounded"/>
        <xs:element name="TargetDevice" type="TargetDeviceType" minOccurs="0" maxOccurs="unbounded"/>
    </xs:sequence>
</xs:complexType>
<xs:complexType name="AudioDataType">
    <xs:sequence>
        <xs:element name="AudioRole" type="AudioRoleRangeType" minOccurs="1"/>
        <xs:element name="TargetUserProfile" type="TargetUserProfileType" minOccurs="0" maxOccurs="unbounded"/>
        <xs:element name="TargetDevice" type="TargetDeviceType" minOccurs="0" maxOccurs="unbounded"/>
    </xs:sequence>
    <xs:attribute name="NumberOfAudioChannels" type="xs:unsignedInt" minOccurs="0"/>
</xs:complexType>
<xs:complexType name="CCDataType">
    <xs:sequence>
        <xs:element name="CCRole" type="CCRoleRangeType" minOccurs="1"/>
        <xs:element name="TargetUserProfile" type="TargetUserProfileType" minOccurs="0" maxOccurs="unbounded"/>
        <xs:element name="TargetDevice" type="TargetDeviceType" minOccurs="0" maxOccurs="unbounded"/>
    </xs:sequence>
</xs:complexType>
```

FIG. 41

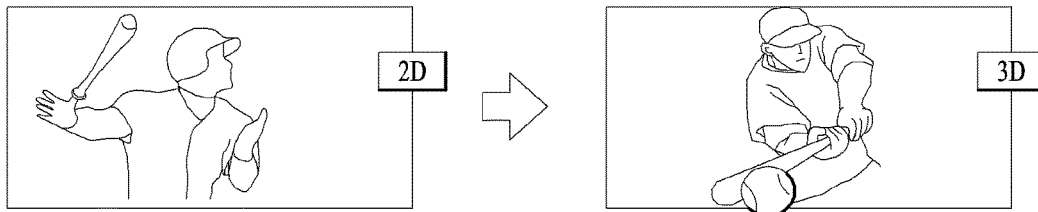

```
<?xml version="1.0" encoding="UTF-8"?>
<Content
    xmlns:bcast="urn:oma:xml:bcast:sg:fragments:1.1"
    id="bcast://lge.com/Content/1" version="1">
    ...
    <PrivateExt>
        <Component>
            <VideoData>
                <VideoRole>1</VideoRole>
                <TargetUserProfile/>
                <TargetDevice>1</TargetDevice>
            </VideoData>

<AudioData NumOfAudioChannels="5">
                <AudioRole>1</AudioRole>
                <TargetUserProfile/>
                <TargetDevice>1</TargetDevice>
            </AudioData>

<CCData>
                <CCRole>1</CCRole>
                <TargetUserProfile/>
                <TargetDevice>1</TargetDevice>
            </CCData>
        </Component>
    </PrivateExt>
</Content>
```

```
<?xml version="1.0" encoding="UTF-8"?>
<Content
    xmlns:bcast="urn:oma:xml:bcast:sg:fragments:1.1"
    id="bcast://lge.com/Content/1" version="1">
    ...
    <PrivateExt>
        <Component>
            <VideoData>
                <VideoRole>8</VideoRole>
                <TargetUserProfile/>
                <TargetDevice>1</TargetDevice>
            </VideoData>

<VideoData>
                <VideoRole>9</VideoRole>
                <TargetUserProfile/>
                <TargetDevice>1</TargetDevice>
            </VideoData>

<AudioData NumOfAudioChannels="5">
                <AudioRole>1</AudioRole>
                <TargetUserProfile/>
                <TargetDevice>1</TargetDevice>
            </AudioData>

<CCData>
                <CCRole>1</CCRole>
                <TargetUserProfile/>
                <TargetDevice>1</TargetDevice>
            </CCData>
        </Component>
    </PrivateExt>
</Content>
```

8: 3D video left view
9: 3D video right view

FIG. 42

```
<xs:element name="Component" type="ComponentElementType"></xs:element>
<xs:complexType name="ComponentElementType">
    <xs:sequence>
        <xs:element name="VideoData" type="VideoDataType" minOccurs="0"/>
        <xs:element name="AudioData" type="AudioDataType" minOccurs="0"/>
        <xs:element name="CCData" type="CCDataType" minOccurs="0"/>
    </xs:sequence>
</xs:complexType>
```

FIG. 43

```
<xs:element name="Component" type="ComponentFragmentType">
</xs:element>

<xs:complexType name="ComponentFragmentType">
    <xs:sequence>
        <xs:element name="ComponentType" type="ComponentRangeType"
                    minOccurs="1" maxOccurs="unbounded"/>
        ...
        <xs:element name="ComponentData" type="ComponentDataType" minOccurs="0"/>
        <xs:element name="PrivateExt" type="PrivateExtType" minOccurs="0"/>
    </xs:sequence>
    <xs:attribute name="id" type="xs:anyURI" use="required"/>
    ...
</xs:complexType>
```

```
<xs:complexType name="VideoDataType">
    ...
</xs:complexType>
```

```
<xs:complexType name="AudioDataType">
    ...
    <xs:attribute name="associatedTo" type="xs:anyURI" minOccurs="0" maxOccurs="unbounded"/>
    <xs:attribute name="NumberOfAudioChannels" type="xs:unsignedInt" minOccurs="0"/>
</xs:complexType>
```

```
<xs:complexType name="CCDataType">
    ...
    <xs:attribute name="associatedTo" type="xs:anyURI" minOccurs="0" maxOccurs="unbounded"/>
</xs:complexType>
```

FIG. 44

```
<xs:element name="Component" type="ComponentFragmentType">
</xs:element>

<xs:complexType name="ComponentFragmentType">
    <xs:sequence>
        <xs:element name="ComponentType" type="ComponentRangeType"
                        minOccurs="1" maxOccurs="unbounded"/>
        ...
        <xs:element name="ComponentData" type="ComponentDataType" minOccurs="0"/>
        <xs:element name="PrivateExt" type="PrivateExtType" minOccurs="0"/>
    </xs:sequence>
    <xs:attribute name="id" type="xs:anyURI" use="required"/>
    ...
</xs:complexType>
```

```
<xs:complexType name="VideoDataType">
    ...
    <xs:attribute name="associatedAudio" type="xs:anyURI" minOccurs="0" maxOccurs="unbounded"/>
    <xs:attribute name="associatedCC" type="xs:anyURI" minOccurs="0" maxOccurs="unbounded"/>
</xs:complexType>
```

```
<xs:complexType name="AudioDataType">
    ...
    <xs:attribute name="NumberOfAudioChannels" type="xs:unsignedInt" minOccurs="0"/>
</xs:complexType>
```

```
<xs:complexType name="CCDataType">
    ...
</xs:complexType>
```

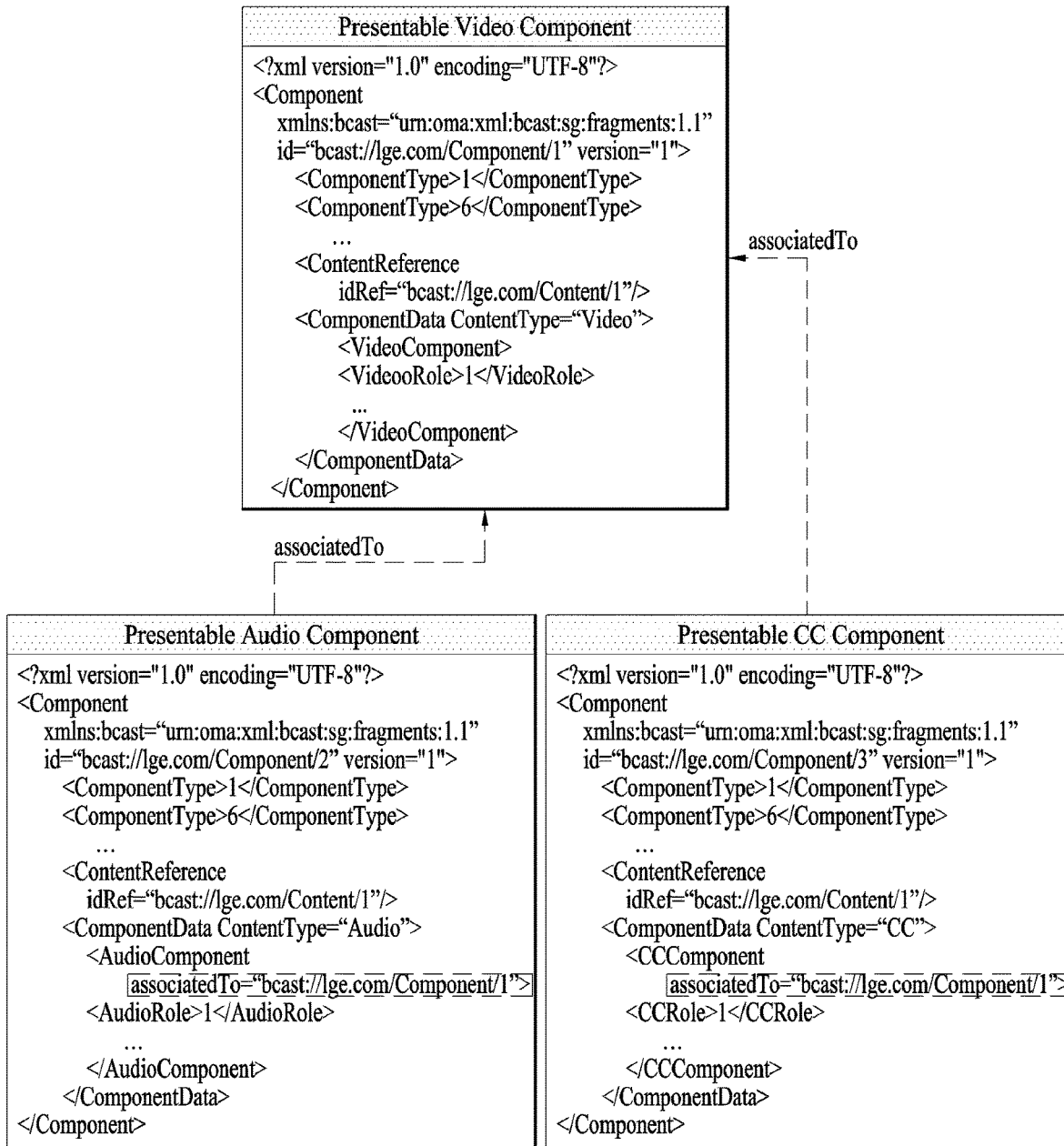

FIG. 47

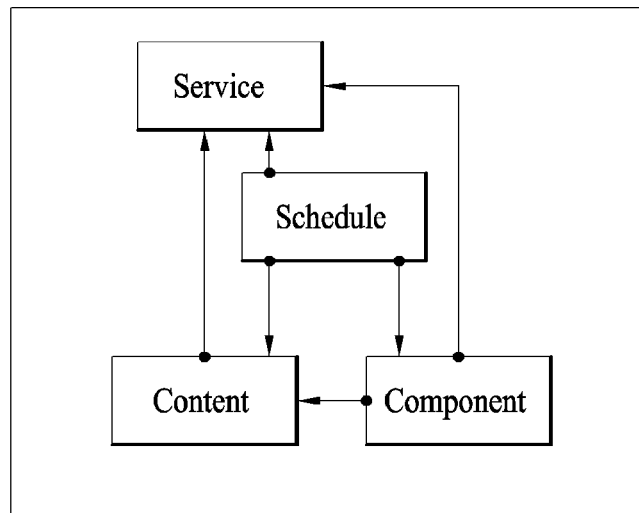

FIG. 48

```
<xs:element name="Component" type="ComponentFragmentType">
</xs:element>
<xs:complexType name="ComponentFragmentType">
    <xs:sequence>
        ...
        <xs:element name="ServiceReference" type="IDRefType" minOccurs="0"/>
        <xs:element name="ContentReference" type="IDRefType" minOccurs="0"/>
        <xs:element name="ComponentReference" type="IDRefType" minOccurs="0"/>
        ...
        <xs:element name="PrivateExt" type="PrivateExtType" minOccurs="0"/>
    </xs:sequence>
    <xs:attribute name="id" type="xs:anyURI" use="required"/>
    <xs:attribute name="version" type="xs:unsignedInt" use="required"/>
    ...
</xs:complexType>
<xs:complexType name="IDRefType">
    <xs:attribute name="idRef" type="xs:anyURI" use="required"/>
</xs:complexType>
```

FIG. 49

```
<xs:element name="Schedule" type="ScheduleType"></xs:element>
<xs:complexType name="ScheduleType">
    <xs:sequence>
        <xs:element name="ServiceReference">...</xs:element>
        ...
        <xs:element name="ContentReference" minOccurs="0" maxOccurs="unbounded">...</xs:element>
        <xs:element name="ComponentReference" minOccurs="0" maxOccurs="unbounded">
            <xs:complexType>
                <xs:attribute name="idRef" type="xs:anyURI" use="required"/>
            </xs:complexType>
        </xs:element>
        ...
        <xs:element name="PrivateExt" type="PrivateExtType" minOccurs="0"/>
    </xs:sequence>
    <xs:attribute name="id" type="xs:anyURI" use="required"/>
    <xs:attribute name="version" type="xs:unsignedInt" use="required"/>
    ...
</xs:complexType>
```

FIG. 53

```
<xs:element name="Content" type="ContentType"/>
</xs:element>

<xs:complexType name="ContentType">
    <xs:sequence>
        <xs:element name="ServiceReference" minOccurs="0" maxOccurs="unbounded">
            <xs:complexType>
                <xs:attribute name="idRef" type="xs:anyURI" use="required" />
                    <xs:attribute name="weight" type="xs:unsignedShort"
                        use="optional" default="65535" />
                    <xs:attribute name="relationship" type="RelationshipRangeType"
                        use="required" default="1" />
            </xs:complexType>
        </xs:element>
        ...
    </xs:sequence>
</xs:complexType>

<!--
    Specifies Relationship between Content and Service
    0 – Unspecified
    1 – ProgramOf
    2 – ContentItemOf
    3 – OnDemandComponentOf
    4~255 – Reserved for future use.
-->
<xs:simpleType name="RelationshipRangeType">
    <xs:restriction base="xs:unsignedInt">
        <xs:minInclusive value="0"/>
        <xs:maxInclusive value="3"/>
    </xs:restriction>
</xs:simpleType>
```

```
<xs:element name="Service" type="ServiceType">
</xs:element>
<xs:complexType name="ServiceType">
    <xs:sequence>
        ...
        <xs:element name="ContentReference" type="IDRefType" minOccurs="0"/>
        <xs:element name="ComponentReference" type="IDRefType" minOccurs="0"/>
        ...
        <xs:element name="PrivateExt" type="PrivateExtType" minOccurs="0"/>
    </xs:sequence>
    <xs:attribute name="id" type="xs:anyURI" use="required"/>
    <xs:attribute name="version" type="xs:unsignedInt" use="required"/>
    ...
</xs:complexType>
```

L56020

```
<xs:element name="Contnet" type="ContentType"></xs:element>
<xs:complexType name="ContentType">
    <xs:sequence>
        ...
        <xs:element name="ComponentReference" minOccurs="0" maxOccurs="unbounded">...</xs:element>
        ...
        <xs:element name="PrivateExt" type="PrivateExtType" minOccurs="0"/>
    </xs:sequence>
    <xs:attribute name="id" type="xs:anyURI" use="required"/>
    <xs:attribute name="version" type="xs:unsignedInt" use="required"/>
    ...
</xs:complexType>
```

L56030

```
<xs:element name="Component" type="ComponentType"></xs:element>
<xs:complexType name="ComponentType">
    <xs:sequence>
        ...
        <xs:element name="ComponentReference" minOccurs="0" maxOccurs="unbounded">...</xs:element>
        ...
        <xs:element name="PrivateExt" type="PrivateExtType" minOccurs="0"/>
    </xs:sequence>
    <xs:attribute name="id" type="xs:anyURI" use="required"/>
    <xs:attribute name="version" type="xs:unsignedInt" use="required"/>
    ...
</xs:complexType>
```

FIG. 60

| Name | Type | Category | Cardinality | Description | Data Type |
|---|---|---|---|---|---|
| Component | E | | | 'Component' fragment<br>Contains the following attributes:<br>id<br>version<br>validFrom<br>validTo<br>Contains the following elements:<br>ServiceReference<br>ContentReference<br>ComponentReferece<br>ComponentType<br>ComponentRole<br>PrivateExt<br>ProprietaryElements | |
| id | A | NM/TM | 1 | ID of the 'Component' fragment. The value of this attribute SHALL be globally unique. | anyURI |
| version | A | NM/TM | 1 | Version of this fragment. The newer version overrides the older one starting from the time specified by the 'validFrom' attribute, or as soon as it has been received if no 'validFrom' attribute is given. | unsignedInt |
| validFrom | A | NM/TM | 0..1 | The first moment when this fragment is valid. If not given, the validity is assumed to have started at some time in the past. This field contains the 32bits integer part of an NTP time stamp. | unsignedInt |
| valid To | A | NM/TM | 0..1 | The last moment when this fragment is valid. If not given, the validity is assumed to end in undefined time in the future. | unsignedInt |
| ServiceReference | E1 | NM/TM | 0..N | Reference to the 'Service' fragment(s) to which the 'Component' fragment belongs.<br>Contains the following attributes:<br>idRef<br>weight | |
| idRef | A | NM/TM | 1 | Identification of the 'Service' fragment which this 'Component' fragment is associated with. | anyURI |
| ContentReference | E1 | NM/TM | 0..N | Reference to the 'Content' fragment(s) to which the 'Component' fragment belongs.<br>Contains the following attributes:<br>idRef | |
| idRef | A | NM/TM | 1 | Identification of the 'Content' fragment which this 'Component' fragment is associated with. | anyURI |
| ComponentReferece | E1 | NM/TM | 0..N | Reference to the 'Component' fragment(s) to which the 'Component' fragment belongs.<br>Contains the following attributes:<br>idRef | |
| idRef | A | NM/TM | 1 | Identification of the 'Component' fragment which this 'Component' fragment is associated with. | anyURI |

FIG. 61

| | | | | | |
|---|---|---|---|---|---|
| ComponentType | E1 | NM/ TM | 1..N | Type of the component. Allowed values are:<br>0 – Unspecified<br>1 - Continuous component<br>2 - Elementary component<br>3 - Composite component<br>4 - PickOne component<br>5 - Complex component<br>6 - Presentable Video component<br>7 - Presentable Audio component<br>8 - Presentable CC component<br>9 - NRT File<br>10 - NRT Content Item<br>11 - Application<br>12 - ATSC3.0 Application<br>13 - On Demand component<br>14 - Notification Stream<br>15 - App-based Enhancement<br>16-255 - Reserved for future use | unsigned Byte |
| ComponentRole | E1 | NM/ TM | 0..N | Role of the component.<br>0 - Unspecified<br>[Presentable Video component]<br>1 - Primary (default) video<br>2 - Alternative camera view<br>3 - Other alternative video component<br>4 - Sign language (e.g., ASL) inset<br>5 - Follow subject video<br>[Composite Video Component]<br>6 - Base layer for scalable video encoding<br>7 - Enhancement layer for scalable video encoding, with level<br>8 - 3D video left view<br>9 - 3D video right view<br>10 - 3D video depth information<br>11 - Part of video array, <x,y> of <n,m><br>12 - Follow-Subject metadata<br>[Presentable Audio component]<br>13 - Complete main<br>14 - Music<br>15 - Dialog<br>16 - Effects<br>17 - Visually impaired<br>18 - Hearing impaired<br>19 – Commentary<br>[Presentable CC component]<br>20 - Normal<br>21 – Easy reader<br>22-255: Reserved for future use. | unsigned Byte |
| PrivateExt | E1 | NO/ TO | 0..1 | An element serving as a container for proprietary or application-specific extensions. | |
| Proprietary Elements | E1 | NO/ TO | 0..N | Proprietary or application-specific elements that are not defined in this specification. These elements may further contain sub-elements or attributes. | |

FIG. 62

```
<xs:element name="Component" type="ComponentFragmentType">
</xs:element>

<xs:complexType name="ComponentFragmentType">
    <xs:sequence>
        <xs:element name="ServiceReference" type="IDRefType" minOccurs="0" />
        <xs:element name="ContentReference" type="IDRefType" minOccurs="0" />
        <xs:element name="ComponentReference" type="IDRefType" minOccurs="0"/>
        <xs:element name="ComponentType" type="ComponentTypeRangeType" minOccurs="1"/>
        <xs:element name="ComponentRole" type="ComponentRoleRangeType" minOccurs="0"/>
        <xs:element name="PrivateExt" type="PrivateExtType" minOccurs="0"/>
        <xs:element name="ProprietaryElements" type=" ProprietaryElementsType" minOccurs="0"/>
    </xs:sequence>
    <xs:attribute name="id" type="xs:anyURI" use="required"/>
    <xs:attribute name="version" type="xs:unsignedInt" use="required"/>
    <xs:attribute name="validFrom" type="xs:unsignedInt" use="optional"/>
    <xs:attribute name="validTo" type="xs:unsignedInt" use="optional"/>
</xs:complexType>
<xs:complexType name="IDRefType">
    <xs:attribute name="idRef" type="xs:anyURI" use="required"/>
</xs:complexType>
```

FIG. 63

```
<!--
    Specifies the range of the ComponentType
    0 - Unspecified
    1 - Continuous component
    2 - Elementary component
    3 - Composite component
    4 - PickOne component
    5 - Complex component
    6 - Presentable Video component
    7 - Presentable Audio component
    8 - Presentable CC component
    9 - NRT File
    10 - NRT Content Item
    11 - Application
    12 - ATSC3.0 Application
    13 - On Demand component
    14 - Notification Stream
    15 - App-based Enhancement
    16-255 - Reserved for future use
-->
<xs:simpleType name="ComponentTypeRangeType">
    <xs:restriction base="xs:unsignedByte">
        <xs:minInclusive value="0"/>
        <xs:maxInclusive value="15"/>
    </xs:restriction>
</xs:simpleType>
```

FIG. 64

```
<!--
    Specifies the range of the ComponentType
    0 – Unspecified

[Presentable Video component]
    1 - Primary (default) video
    2 - Alternative camera view
    3 - Other alternative video component
    4 - Sign language (e.g., ASL) inset
    5 - Follow subject video

[Composite Video Component]
    6 - Base layer for scalable video encoding
    7 - Enhancement layer for scalable video encoding, with level
    8 - 3D video left view
    9 - 3D video right view
    10 - 3D video depth information
    11 - Part of video array, <x,y> of <n,m>
    12 - Follow-Subject metadata

[Presentable Audio component]
    13 - Complete main
    14 - Music
    15 - Dialog
    16 - Effects
    17 - Visually impaired
    18 - Hearing impaired
    19 – Commentary

[Presentable CC component]
    20 - Normal
    21 – Easy reader 22-255: Reserved for future use.
-->
<xs:simpleType name="ComponentRoleRangeType">
    <xs:restriction base="xs:unsignedByte">
        <xs:minInclusive value="0"/>
        <xs:maxInclusive value="21"/>
    </xs:restriction>
</xs:simpleType>
```

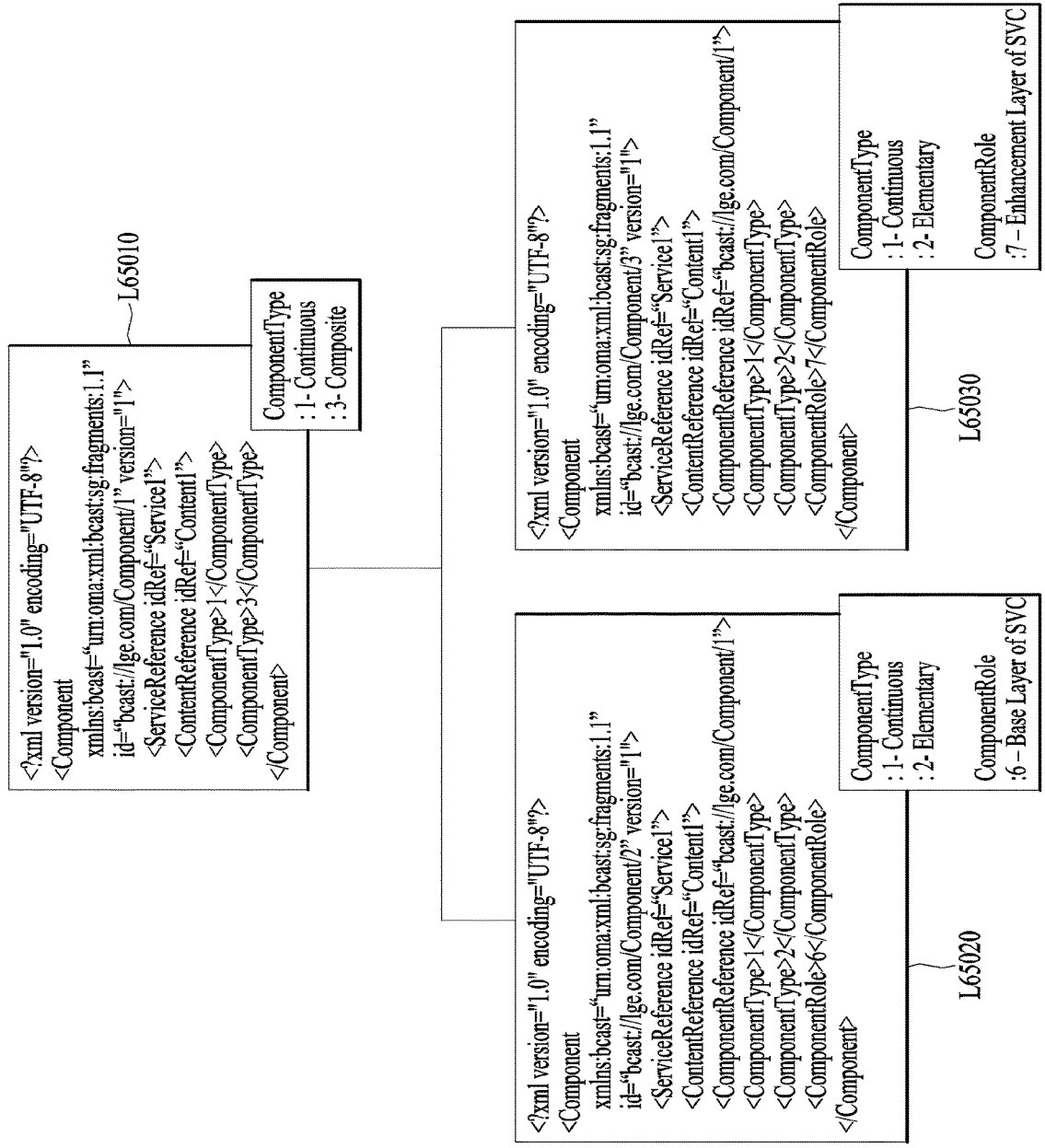

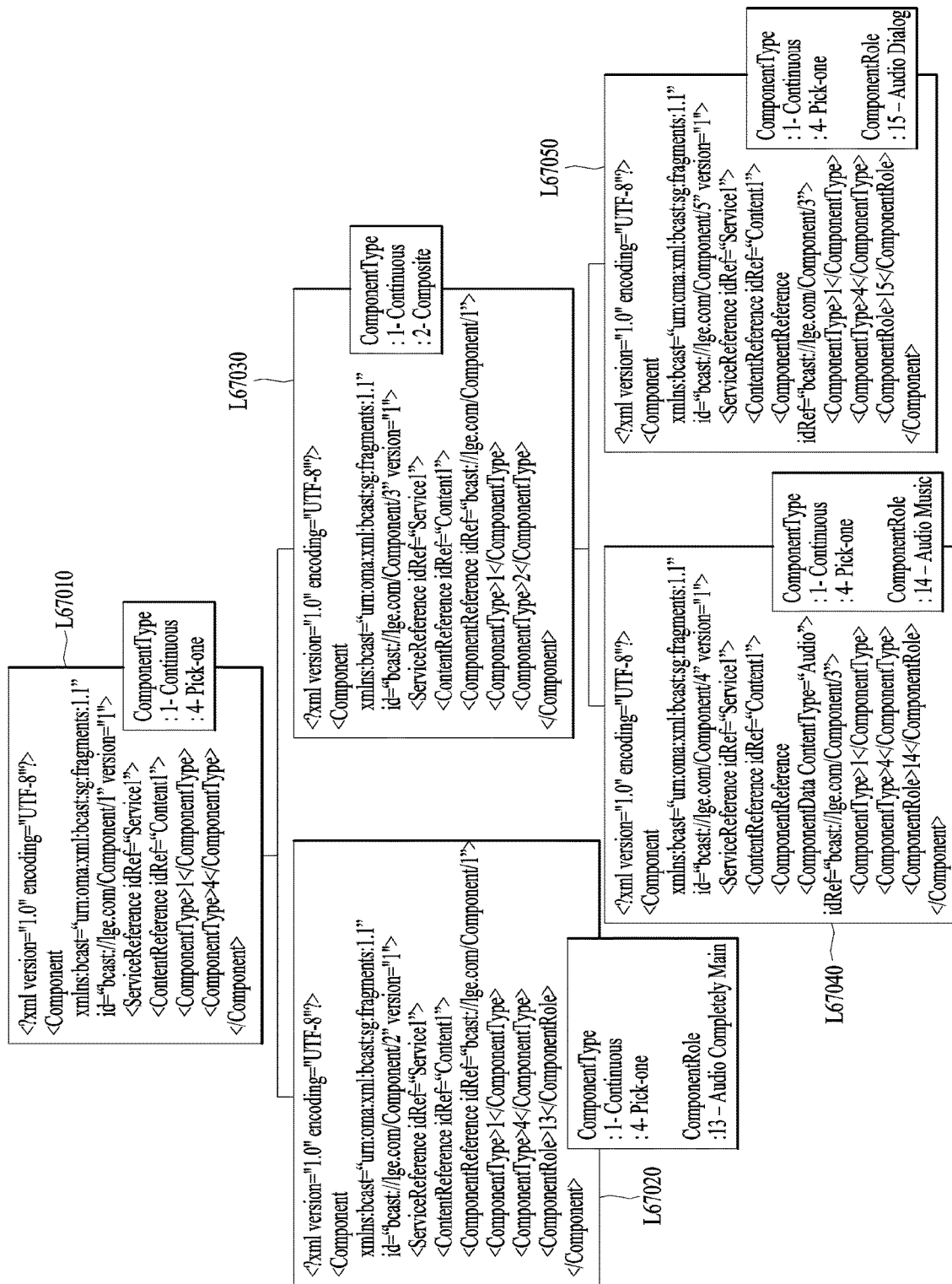

FIG. 68

| Name | Type | Category | Cardinality | Description | Data Type |
|---|---|---|---|---|---|
| Content | E | | | 'Content' fragment<br>Contains the following attributes:<br>id<br>version<br>validFrom<br>validTo<br>globalContentID<br>emergency<br>baseCID<br><br>Contains the following elements:<br><br>ServiceReference<br>ProtectionKeyID<br>Name<br>Description<br>StartTime<br>EndTime<br>AudioLanguage<br>TextLanguage<br>Length<br>ParentalRating<br>TargetUserProfile<br>Genre<br>Extension<br>PreviewDataReference<br>BroadcastArea<br>TermsOfUse<br><br>PrivateExt | |
| ... | | | | | |
| PrivateExt | E1 | NO/TO | 0..1 | An element serving as a container for proprietary or application-specific extensions. | PrivateExt |
| ProprietaryElements | E2 | NO/TO | 0..N | Proprietary or application-specific elements that are not defined in this specification. These elements may further contain sub | ProprietaryElements |

FIG. 69

| Name | Type | Category | Cardinality | Description | Data Type |
|---|---|---|---|---|---|
| Component | E2 | NM/TM | 0..N | 'Component' sub-element | |
| ComponentType | E3 | NM/TM | 1 | Type of the component. Allowed values are: <br> 0 - Unspecified <br> 1 - Presentable Video component <br> 2 - Presentable Audio component <br> 3 - Presentable CC component <br> 4 - App-based Enhancement <br> 5-255 - Reserved for future use | unsigned Byte |

FIG. 70

| Name | Type | Category | Cardinality | Description | Data Type |
|---|---|---|---|---|---|
| ComponentRole | E3 | NM/ TM | 1 | Role of the component.<br>0 - Unspecified<br>[Allowed for Presentable Video component]<br>1 - Primary (default) video<br>2 - Alternative camera view<br>3 - Other alternative video component<br>4 - Sign language (e.g., ASL) inset<br>5 - Follow subject  video<br>[Allowed for Presentable Audio component]<br>6 - Complete main<br>7 - Music<br>8 - Dialog<br>9 - Effects<br>10 - Visually impaired<br>11 - Hearing impaired<br>12 - Commentary<br>[Allowed for Presentable CC component]<br>13 - Normal<br>14 - Easy reader<br>[Allowed for App-based Enhancement component]<br>15 - App<br>16 - NRT Content Item<br>17 - On Demand component<br>18 - Notification Stream<br>19 - Start-Over<br>20 - Companion Screen<br>21 -255 : Reserved for future use. | unsigned Byte |

FIG. 71

| Name | Type | Category | Cardinality | Description | Data Type |
|---|---|---|---|---|---|
| StartTime | E3 | NM/TM | 0..1 | | dateTime |
| EndTime | E3 | NM/TM | 0..1 | | dateTime |
| Language | E3 | NM/TM | 0..1 | [Allowed for Presentable Video, Audio or CC Component] This element declares for a the end users that this component is available in the language represented by the value of this element. | string |
| languageSDPTag | A | NM/TO | 1 | Identifier of the language described by the parent 'Language' element.<br><br>• The 'languageSDPTag' SHALL be formatted according to the rules of [RFC 3066], for the described language.<br><br>• Each 'Language' element declaring the same stream SHALL have the same value of the 'languageSDPTag'. | string |
| Length | E3 | NM/TM | 0..1 | | duration |
| ParentalRating | E3 | NM/TM | 0..N | | string |

FIG. 72

| Name | Type | Category | Cardinality | Description | Data Type |
|---|---|---|---|---|---|
| DeviceCapability | E3 | NM/TM | 0..N | 0 - Unspecified<br>1 – Broadband connection<br>(for components requiring broadband connection to present)<br><br>[Allowed for Presentable Video component]<br>(Video Rendering Capability)<br>2 – SD<br>3 – HD<br>4 – UHD<br>5 – 8K<br>6 – 3D video<br>7 – High Dynamic Range Imaging<br>8 – Wide Color Gamut<br><br>[Allowed for Presentable Audio component]<br>(Surround Sound Capability)<br>9 – 2.0 channels<br>10 – 2.1 channels<br>11 – 5.1 channels<br>12 – 6.1 channels<br>13 – 7.1 channels<br>14 – 22.1 channels<br>15 – 3D audio<br>(Audio Mixing/Rendering Capability)<br>16 – Dialog Level adjustment<br><br>(Audio Mixing/Rendering Capability)<br>(Input Capability)<br>17 – magic remote control input<br>18 – touch screen input<br>19 – mouse input<br>20 – keyboard input<br><br>21 – app rendering<br><br>22 - 255: Reserved for future use. | unsigned Byte |
| TargetDevice | E3 | NM/TM | 0..1 | Type of the Target Device.<br>Allowed values are:<br>0 – Unspecified<br>1 - Primary<br>2 - Companion<br>3 - Inset on Primary Screen ("Picture-in-Picture")<br>4-255: Reserved for future use. | unsigned Byte |

FIG. 73

```
<xs:element name="Component" type="ComponentPrivateExtType">
<xs:annotation>
<xs:documentation>
        This element is a wrapper for ATSC 3.0 Component extensions to OMA BCAST SG Content fragments.
        It shall only be used inside a PrivateExt element within a Content fragment.
    </xs:documentation>
</xs:annotation>
</xs:element>
<xs:complexType name="ComponentPrivateExtType">
<xs:annotation>
<xs:documentation>
        Defines the set of ATSC 3.0 Component extension elements that may be added to Content fragments.
    </xs:documentation>
</xs:annotation>
<xs:sequence>
<xs:element name="ComponentType" type="ComponentTypeRangeType" minOccurs="1"/>
<xs:element name="ComponentRole" type="ComponentRoleRangeType" minOccurs="1"/>
<xs:element name="StartTime" type="xs:dateTime" minOccurs="0"/>
<xs:element name="EndTime" type="xs:dateTime" minOccurs="0"/>
<xs:element name="Language" type="LanguageType" minOccurs="0"/>
<xs:element name="Length" type="xs:duration" minOccurs="0"/>
<xs:element name="ParentalRating" type="ParentalRatingType" minOccurs="0" maxOccurs="unbounded" />
<xs:element name="DeviceCapability" type="DeviceCapabilityRangeType" minOccurs="0" maxOccurs="unbounded"/>
<xs:element name="TargetDevice" type="TargetDeviceRangeType" minOccurs="0"/>
</xs:sequence>
</xs:complexType>
```

FIG. 74

```
<xs:complexType name="LanguageType">
<xs:simpleContent>
<xs:extension base="xs:string">
<xs:attribute name="languageSDPTag" type="xs:string" use="required"/>
</xs:extension>
</xs:simpleContent>
</xs:complexType>
```
— L74010

```
<!--
Specifies the type of the component.
Allowed values are:
0 – Unspecified
1 - Presentable Video component
2 - Presentable Audio component
3 - Presentable CC component
4 - App-based Enhancement 5-255 - Reserved for future use
-->
<xs:simpleType name="ComponentTypeRangeType">
<xs:restriction base="xs:unsignedByte">
<xs:minInclusive value="0"/>
<xs:maxInclusive value="4"/>
</xs:restriction>
</xs:simpleType>
```
— L74020

FIG. 75

```
<xs:simpleType name="ComponentRoleRangeType">
 <xs:restriction base="xs:unsignedByte">
  <xs:minInclusive value="0"/>
  <xs:maxInclusive value="20"/>
 </xs:restriction>
</xs:simpleType>
```

```
<!--
Specifies the role of the component.
0 - Unspecified

[Allowed for Presentable Video component]
1 - Primary (default) video
2 - Alternative camera view
3 - Other alternative video component
4 - Sign language (e.g., ASL) inset
5 - Follow subject video

[Allowed for Presentable Audio component]
6 - Complete main
7 - Music
8 - Dialog
9 - Effects
10 - Visually impaired
11 - Hearing impaired
12 - Commentary

[Allowed for Presentable CC component]
13 - Normal
14 - Easy reader

[Allowed for App-based Enhancement component]
15 - App
16 - NRT Content Item
17 - On Demand component
18 - Notification Stream
19 - Start-Over
20 - Companion Screen 21-255: Reserved for future use.

```
<!--
Specifies Device Capabilities to render the component

0 - Unspecified
1 – Broadband connection
(for components requiring broadband connection to present)
 [Allowed for Presentable Video component]
(Video Rendering Capability)
2 – SD
3 – HD
4 – UHD
5 – 8K
6 – 3D video
7 – High Dynamic Range Imaging
8 – Wide Color Gamut
[Allowed for Presentable Audio component]
(Surround Sound Capability)
9 – 2.0 channels
10 – 2.1 channels
11 – 5.1 channels
12 – 6.1 channels
13 – 7.1 channels
14 – 22.1 channels
15 – 3D audio
(Audio Mixing/Rendering Capability)
16 – Dialog Level adjustment
[Allowed for any type of component]
(Input Capability)
17 – magic remote control input
18 – touch screen input
19 – mouse input
20– keyboard input
21 – app rendering
22 - 255: Reserved for future use.
-->
<xs:simpleType name="DeviceCapabilityRangeType">
<xs:restriction base="xs:unsignedByte">
<xs:minInclusive value="0"/>
<xs:maxInclusive value="21"/>
</xs:restriction>
</xs:simpleType>
```
— L76010

```
<!--
Specifies how the Terminal is expected to set a target device
0: Unspecified
1: Primary Device
2: Companion Device
3: Inset on Primary Screen ("Picture-in-Picture")
4-255: Reserved for future use.
-->
<xs:simpleType name="TargetDeviceRangeType">
<xs:restriction base="xs:unsignedByte">
<xs:minInclusive value="0"/>
<xs:maxInclusive value="3"/>
</xs:restriction>
</xs:simpleType>
```
— L76020

FIG. 78

```
<?xml version="1.0" encoding="UTF-8"?>
<Content
 xmlns:bcast="urn:oma:xml:bcast:sg:fragments:1.1"
 id="bcast://lge.com/Content/1" version="1">
    ...
    <PrivateExt>
        <Component>
            <ComponentType>1</ComponentType>
            <ComponentRole>1</ComponentRole>
            <StartTime/>
            <EndTime/>
            <Language/>
            <Length/>
            <ParentalRating/>
            <DeviceCapability>4</DeviceCapability>
            <TargetDevice>1</TargetDevice>
        </Component>
        <Component>
            <ComponentType>2</ComponentType>
            <ComponentRole>6</ComponentRole>
            <StartTime/>
            <EndTime/>
            <Language>ENG</Language>
            <Length/>
            <ParentalRating/>
            <DeviceCapability/>
            <TargetDevice>1</TargetDevice>
        </Component>
        <Component>
            <ComponentType>2</ComponentType>
            <ComponentRole>6</ComponentRole>
            <StartTime/>
            <EndTime/>
            <Language>SPA</Language>
            <Length/>
            <ParentalRating/>
            <DeviceCapability>1</DeviceCapability>
            <TargetDevice>1</TargetDevice>
        </Component>
    </PrivateExt>
</Content>
```

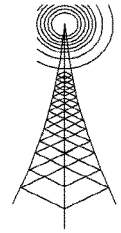

L78010

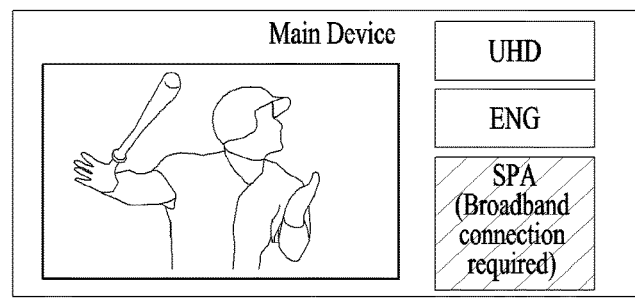

| Name | Type | Category | Cardinality | Description | Data Type |
|---|---|---|---|---|---|
| Component | E2 | NM/ TM | 0..N | 'Component' sub-element.<br><br>Contains the following attribute:<br><br>ComponentType<br><br>Contains the following elements:<br><br>ComponentRole<br><br>Language<br><br>EssentialCapabilities | |
| ComponentType | A | NM/ TM | 1 | Type of the component.<br><br>Allowed values are:<br><br>0 – Unspecified<br><br>1 - Presentable Video component<br><br>2 - Presentable Audio component<br><br>3 - Presentable CC component<br><br>4 – Presentable App component<br><br>5-255 - Reserved for future use | unsigned Byte |

FIG. 81

| Name | Type | Category | Cardinality | Description | Data Type |
|---|---|---|---|---|---|
| ComponentRole | E3 | NM/ TM | 0..N | Role of the component.<br><br>Textual description intended for human con sumption regarding role of the component.<br><br>Strings which could be used to describe role of component of ATSC3.0 service include:<br><br>[For Presentable Video component]<br>"Primary video"<br>"Alternative camera view"<br>"Other alternative video component"<br>"Sign language inset"<br>"Follow subject video"<br>[For Presentable Audio component]<br>"Complete main"<br>"Music"<br>"Dialog"<br>"Effects"<br>"Visually impaired"<br>"Hearing impaired"<br>"Commentary"<br>[For Presentable CC component]<br>"Normal"<br>"Easy reader"<br>[For Presentable App component ]<br>"On Demand"<br>"Start-over"<br>"Companion-Screen"<br>Any other useful descriptions for a viewer can be provided. | string |

FIG. 82

```xml
<xs:element name="Component" type="ComponentPrivateExtType">
<xs:annotation>
<xs:documentation>
        This element is a wrapper for ATSC 3.0 Component extensions to OMA BCAST SG
Content fragments.
            It shall only be used inside a PrivateExt element within a Content fragment.
        </xs:documentation>
</xs:annotation>
</xs:element>
<xs:complexType name="ComponentPrivateExtType">
<xs:annotation>
<xs:documentation>
        Defines the set of ATSC 3.0 Component extension elements that may be added to Content
fragments.
        </xs:documentation>
</xs:annotation>
<xs:sequence>
    <xs:element name="ComponentRole" type="xs:string" minOccurs="0"
    maxOccurs="unbounded" />
    ...
</xs:sequence>
<xs:attribute name="ComponentType" type="unsignedByte" use="required"/>
</xs:complexType>
```

FIG. 83

| Name | Type | Category | Cardinality | Description | Data Type |
|---|---|---|---|---|---|
| Component | E2 | NM/ TM | 0..N | 'Component' sub-element | |
| PresentableVideo Component | E3 | NM/ TM | 0..N | Role of the presentable video component. Textual description intended for human consumption regarding role of the component. Strings which could be used to describe role of component of ATSC3.0 service include:<br><br>"Primary video"<br>"Alternative camera view"<br>"Other alternative video component"<br>"Sign language inset"<br>"Follow subject video"<br>Any other useful descriptions for a viewer can be provided. | string |
| PresentableAudio Component | E3 | NM/ TM | 0..N | Role of the presentable audio component. Textual description intended for human consumption regarding role of the component. Strings which could be used to describe role of component of ATSC3.0 service include:<br><br>"Complete main"<br>"Music"<br>"Dialog"<br>"Effects"<br>"Visually impaired"<br>"Hearing impaired"<br>"Commentary"<br>Any other useful descriptions for a viewer can be provided. | |

FIG. 84

| Name | Type | Category | Cardinality | Description | Data Type |
|---|---|---|---|---|---|
| PresentableCCComponent | E3 | NM/ TM | 0..N | Role of the presentable CC component.<br><br>Textual description intended for human consumption regarding role of the component. Strings which could be used to describe role of component of ATSC3.0 service include:<br><br>"Normal"<br>"Easy reader"<br>Any other useful descriptions for a viewer can be provided. | string |
| PresentableAppComponent | E3 | NM/ TM | 0..N | Role of the presentable App component.<br><br>Textual description intended for human consumption regarding role of the component. Strings which could be used to describe role of component of ATSC3.0 service include:<br><br>"On Demand"<br>"Start-over"<br>"Companion-Screen"<br>Any other useful descriptions for a viewer can be provided. | |

FIG. 85

```
<xs:element name="Component" type="ComponentPrivateExtType">
<xs:annotation>
<xs:documentation>
        This element is a wrapper for ATSC 3.0 Component extensions to OMA BCAST SG
Content fragments.
        It shall only be used inside a PrivateExt element within a Content fragment.
    </xs:documentation>
</xs:annotation>
</xs:element>
<xs:complexType name="ComponentPrivateExtType">
<xs:annotation>
<xs:documentation>
        Defines the set of ATSC 3.0 Component extension elements that may be added to Content
fragments.
    </xs:documentation>
</xs:annotation>
<xs:sequence>
    <xs:element name="PresentableVideoComponent" type="xs:string" minOccurs="0"
    maxOccurs="unbounded" />
    <xs:element name="PresentableAudioComponent" type="xs:string" minOccurs="0"
    maxOccurs="unbounded" />
    <xs:element name="PresentableCCComponent" type="xs:string" minOccurs="0"
    maxOccurs="unbounded" />
    <xs:element name="PresentableAppComponent" type="xs:string" minOccurs="0"
    maxOccurs="unbounded" />
    ...
</xs:sequence>
</xs:complexType>
```

FIG. 86

| Name | Type | Category | Cardinality | Description | Data Type |
|---|---|---|---|---|---|
| Essential Capabilities | E3 | NO/TO | 0..1 | Capabilities essential for a meaningful presentation of the service.<br>Contains the following elements:<br>CapabilityCodes<br>CapabilityString | |
| CapabilityCodes | E4 | NO/TO | 0..1 | A list of code points from Table A.1 in numeric form. | list of unsignedByte |
| CapabilityString | E4 | NO/TO | 1..N | A string containing the representation of a capability per Table 8.8 [3] and the text following it. See capability_string (Section 8.3 [3]).<br><br>Contains the following attribute:<br>Category | string |
| category | A | NO/TO | 1..1 | Gives the capability category of the capability represented by this CapabilityString element. | unsignedByte |

FIG. 87

| capability_code | Meaning | Reference |
|---|---|---|
| 0x00 | Forbidden | |
| Download Protocols | | |
| 0x01 | FLUTE protocol, as specified in this Standard. | |
| 0x02-0x0F | Reserved for future ATSC use. | |
| 0x02 | IP via Broadband | |
| FEC Algorithms | | |
| | | |
| Wrapper/Archive Formats | | |
| | | |
| Compression Algorithms | | |
| | | |
| Media Types | | |
| | | |
| Rendering Capability (ATSC 3.0 ESG purpose only) | | |
| Video Rendering Capability #1 | | |
| 0x80 | SD | |
| 0x81 | HD | |
| 0x82 | UHD | |
| 0x83 | E-UHD (8K) | |
| 0x85-0x8F | Reserved for future ATSC use. | |
| Video Rendering Capability #2 | | |
| 0x90 | 3D | |
| 0x91 | High Dynamic Range | |
| 0x92 | Wide Color Gamut | |
| 0x93-0x9F | Reserved for future ATSC use. | |
| Audio Rendering Capability #1 | | |
| 0xA0 | Mono | |
| 0xA1 | Stereo (2 channels) | |
| 0xA2 | 5.1 channel surround | |
| 0xA3 | Immersive/ 3D | |
| 0xA4-0xAF | Reserved for future ATSC use. | |
| Audio Rendering Capability #2 | | |
| 0xB1 | Dialog level adjustment | |
| 0xB2-0xBF | Reserved for future ATSC use. | |
| Application Rendering Capability** | | |
| 0xC0 | PVR support | |
| 0xC1 | Downloading (Persistent Storage) | |
| 0xC2 | Content protection (DRM) | |
| 0xC3 | Service protection (Conditional Access) | |
| 0xC4-0xCF | Reserved for future ATSC use. | |

FIG. 88

| capability_category_code | Capability Category | Registry |
|---|---|---|
| 0x00 | reserved | |
| 0x01 | Download Protocol | No registry use widely used industry name |
| 0x02 | FEC Algorithm | IANA registry of FEC encoding IDs and instance IDs [65] |
| 0x03 | Wrapper/Archive Format | IANA registry of media types and subtypes [64] |
| 0x04 | Compression Algorithm | IANA registry of HTTP Content -Coding values [63] |
| 0x05 | Media Type | IANA registry of media types and subtypes [64] |
| 0x06* | Rendering Capability (ATSC 3.0 ESG purpose only) | No registry |
| 0x06 -0x7F | reserved | |

$N'_{BLOCK\_TI\_MAX}$ : Maximum number of FEC blocks in a TI group $N_{BLOCK\_TI}$ : The actual number of FEC blocks in a TI group $N_{BLOCK\_TI\_Diff} = N'_{BLOCK\_TI\_MAX} - N_{BLOCK\_TI}$ $N'_{BLOCK\_TI\_MAX} = N_{BLOCK\_TI\_MAX} + 1,$ if $N_{BLOCK\_TI\_MAX} \bmod 2 = 0$ $N'_{BLOCK\_TI\_MAX} = N_{BLOCK\_TI\_MAX},$ if $N_{BLOCK\_TI\_MAX} \bmod 2 = 1$ $N_{BLOCK\_TI\_Diff,j} = N'_{BLOCK\_TI\_MAX} - N_{BLOCK\_TI,j}$

BROADCAST SIGNAL TRANSMITTING APPARATUS, BROADCAST SIGNAL RECEIVING APPARATUS, METHOD FOR TRANSMITTING BROADCAST SIGNAL, AND METHOD FOR RECEIVING BROADCAST SIGNAL

CROSS-REFERENCE TO RELATED APPLICATIONS

This application is a Divisional of U.S. application Ser. No. 15/872,578, filed Jan. 16, 2018, which is a Continuation of co-pending application Ser. No. 15/115,567 filed Jul. 29, 2016, which is the national phase of PCT/KR2015/004171, filed Apr. 27, 2015, which claims the benefit U.S. Provisional Application Nos. 62/003,039, filed May 27, 2014, 62/000,515, field on May 19, 2014, 61/991,624, filed on May 12, 2014, and 61/984,854, filed on Apr. 27, 2014. The entire contents of all of the above applications are hereby incorporated by reference.

BACKGROUND OF THE INVENTION

Field of the Invention

The present invention relates to an apparatus for transmitting broadcast signals, an apparatus for receiving broadcast signals, and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and may further include various types of additional data in addition to the video/audio data.

SUMMARY OF THE INVENTION

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcasting.

The object of the present invention can be achieved by providing a method of transmitting a broadcast signal, including generating service guide information including access information of a broadcast service and content data, wherein the service guide information includes a service fragment indicating information about the broadcast service, encoding the generated service guide information and content data, and transmitting the encoded service guide information and content data.

The service fragment may include service type information indicating type of the broadcast service, and the type of the broadcast service indicated by the service type information may include at least one of a linear service (Linear Service) that provides broadcast schedule information, an application based service (Appbased Service), and a companion screen service (CompanionScreen Service) using a companion device.

The service guide information may include a component fragment indicating information about a component included in the broadcast service, and the component fragment may include at least one of information that identifies the component fragment, component type information indicating type of the component, and component role information indicating role of the component.

The type of the component indicated by the component type information may include at least one of a continuous component (Continuous component) indicating a component represented in one continuous stream, an elementary component (Elementary component) indicating an independently encoded component, a composite component (Composite component) indicating a component that can be combined for one presentation, and a pick-one component (PickOne component) indicating a component selected for one presentation.

The component role information may indicate that the component performs at least one role of a base layer for scalable video encoding, an enhancement layer for scalable video encoding, a left-eye image of 3D video, a right-eye image of 3D video, depth information of 3D video, music audio, dialog audio, and caption for children.

In accordance with another aspect of the present invention, an apparatus for receiving a broadcast signal includes a receiver configured to receive service guide information including access information of a broadcast service and content data, wherein the service guide information includes a service fragment indicating information about the broadcast service, and a decoder configured to decode the received service guide information and content data.

The service fragment may include service type information indicating type of the broadcast service, and the type of the broadcast service indicated by the service type information may include at least one of a linear service (Linear Service) that provides broadcast schedule information, an application based service (Appbased Service), and a companion screen service (CompanionScreen Service) using a companion device.

The service guide information may include a component fragment indicating information about a component included in the broadcast service, and the component fragment may include at least one of information that identifies the component fragment, component type information indicating type of the component, and component role information indicating role of the component.

The type of the component indicated by the component type information may include at least one of a continuous component (Continuous component) indicating a component represented in one continuous stream, an elementary component (Elementary component) indicating an independently encoded component, a composite component (Composite component) indicating a component that can be combined for one presentation, and a pick-one component (PickOne component) indicating a component selected for one presentation.

The component role information may indicate that the component performs at least one role of a base layer for scalable video encoding, an enhancement layer for scalable video encoding, a left-eye image of 3D video, a right-eye image of 3D video, depth information of 3D video, music audio, dialog audio, and caption for children.

In accordance with another aspect of the present invention, an apparatus for transmitting a broadcast signal includes a generator configured to generate service guide information including access information of a broadcast service and content data, wherein the service guide information includes a service fragment indicating information about the broadcast service, an encoder configured to encode the generated service guide information and content data, and a transmitter configured to transmit the encoded service guide information and content data.

The service fragment may include service type information indicating type of the broadcast service, and the type of the broadcast service indicated by the service type information may include at least one of a linear service (Linear Service) that provides broadcast schedule information, an application based service (Appbased Service), and a companion screen service (CompanionScreen Service) using a companion device.

In accordance with another aspect of the present invention, a method of receiving a broadcast signal includes receiving service guide information including access information of a broadcast service and content data, wherein the service guide information includes a service fragment indicating information about the broadcast service, and decoding the received service guide information and content data.

The service fragment may include service type information indicating type of the broadcast service, and the type of the broadcast service indicated by the service type information may include at least one of a linear service (Linear Service) that provides broadcast schedule information, an application based service (Appbased Service), and a companion screen service (CompanionScreen Service) using a companion device.

The service guide information may include a component fragment indicating information about a component included in the broadcast service, and the component fragment may include at least one of information that identifies the component fragment, component type information indicating type of the component, and component role information indicating role of the component.

As is apparent from the above description, the embodiments of the present invention can process data according to service characteristics to control QoS (Quality of Service) for each service or service component, thereby providing various broadcast services.

The embodiments of the present invention can achieve transmission flexibility by transmitting various broadcast services through the same radio frequency (RF) signal bandwidth.

The embodiments of the present invention can improve data transmission efficiency and increase robustness of transmission/reception (Tx/Rx) of broadcast signals using a MIMO (Multiple Input Multiple Output) system.

The embodiments of the present invention can provide a method and apparatus, which are configured to receive digital broadcast signals without errors even with mobile reception equipment or in an indoor environment, for transmitting and receiving broadcast signals.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 12 illustrates PLS1 data according to an embodiment of the present invention.

FIG. 13 illustrates PLS2 data according to an embodiment of the present invention.

FIG. 20 illustrates a time interleaving according to an embodiment of the present invention.

FIG. 24 illustrates interleaved XFECBLOCKs from each interleaving array according to an embodiment of the present invention.

FIG. 27 is a conceptual diagram illustrating an XML schema of a Service Type element according to an embodiment of the present invention.

FIG. 29 illustrates an XML schema regarding a specific service having service type values 14 and 15, and an exemplary display image thereof according to an embodiment of the present invention.

FIG. 30 illustrates an XML schema regarding a specific service having service type values 14 and 16, and an exemplary display image thereof according to an embodiment of the present invention.

FIG. 31 illustrates an XML schema of a Component Fragment according to an embodiment of the present invention.

FIG. 32 illustrates an XML schema of a ComponentType element according to an embodiment of the present invention.

FIG. 33 illustrates an XML schema of a ComponentData element according to an embodiment of the present invention.

FIG. 34 illustrates an XML schema of a VideoComponent element and a VideoRole element according to an embodiment of the present invention.

FIG. 35 illustrates an XML schema of an AudioComponent element and an AudioRole element according to an embodiment of the present invention.

FIG. 36 illustrates an XML schema of a CCComponent element and a CCRole element according to an embodiment of the present invention.

FIG. 39 illustrates an XML schema of component fragments configured to describe a Complete Audio Component according to an embodiment of the present invention.

FIG. 40 illustrates an XML schema of a component element contained in a content fragment according to an embodiment of the present invention.

FIG. 41 illustrates an XML schema of a content fragment regarding a Linear Service including Video, Audio, and CC Components according to an embodiment of the present invention.

FIG. 42 illustrates an XML schema of a component element when the component element is defined in the content fragment so as to describe the association relationship among Video, Audio, and CC components.

FIG. 43 is a conceptual diagram illustrating an exemplary case in which AssociatedTo attributes are used to describe the association relationship among Video, Audio, and CC components.

FIG. 44 is a conceptual diagram illustrating an exemplary case in which associatedAudio and associatedCC attributes are used to describe the association relationship among Video, Audio, and CC components.

FIG. 45 is a conceptual diagram illustrating the association relationship among Video, Audio, and CC components using AssociatedTo attributes.

FIG. 47 is a conceptual diagram illustrating the reference relationship between fragments according to an embodiment of the present invention.

FIG. 48 illustrates an XML schema of a Component fragment including an element indicating the reference relationship between fragments according to an embodiment of the present invention.

FIG. 49 illustrates an XML schema of a Schedule fragment including an element indicating the reference relationship between fragments according to an embodiment of the present invention.

FIG. 53 illustrates functions to be used when a content fragment refers to the associated service fragment according to an embodiment of the present invention.

FIG. 56 is a conceptual diagram illustrating a service fragment including not only elements indicating the reference relationship between fragments, but also a content fragment and an XML schema of the component fragment according to another embodiment of the present invention.

FIGS. 60 and 61 illustrate the Component fragments according to an embodiment of the present invention.

FIG. 62 illustrates an XML schema of a Component fragment according to another embodiment of the present invention.

FIG. 63 illustrates an XML schema of a ComponentType element according to another embodiment of the present invention.

FIG. 64 illustrates an XML schema of a ComponentRole element according to an embodiment of the present invention.

FIG. 65 illustrates an XML schema of component fragments regarding a Composite Video Component including one base layer and two enhancement layers in scalable video coding according to another embodiment of the present invention.

FIG. 67 illustrates an XML schema of component fragments configured to describe a Complete Audio Component according to another embodiment of the present invention.

FIG. 68 is a structural view illustrating a Content fragment according to an embodiment of the present invention.

FIGS. 69, 70, 71, and 72 are structural views illustrating Component elements according to an embodiment of the present invention.

FIG. 73 illustrates an XML schema of a Component element according to an embodiment of the present invention.

FIG. 74 illustrates an XML schema of a Language element and a ComponentType element according to an embodiment of the present invention.

FIG. 75 illustrates an XML schema of a ComponentRole element according to an embodiment of the present invention.

FIG. 76 illustrates an XML schema of a DeviceCapability element and a TargetDevice element according to an embodiment of the present invention.

FIG. 78 illustrates an XML schema of a Component element when a Presentable Video component (UHD) and Presentable ENG audio component are transmitted as broadcast signals and a Presentable SPA audio component is transmitted as a broadband signal.

FIG. 80 illustrates a component element according to another embodiment of the present invention.

FIG. 81 illustrates a ComponentRole element according to an embodiment of the present invention.

FIG. 82 illustrates an XML-formatted component element according to another embodiment of the present invention.

FIG. 83 is a conceptual diagram illustrating a Component element according to another embodiment of the present invention.

FIG. 84 illustrates a PresentableCCComponent element and a PresentableAppComponent element according to another embodiment of the present invention.

FIG. 85 illustrates an XML-formatted component element according to another embodiment of the present invention.

FIG. 86 illustrates Essential Capabilities elements according to an embodiment of the present invention.

FIG. 87 illustrates the meaning of Capability in response to a CapabilityCode element value according to an embodiment of the present invention.

FIG. 88 illustrates a Capability Category dependent upon a Category attribute information value.

DETAILED DESCRIPTION OF THE EMBODIMENTS

Figure 1:
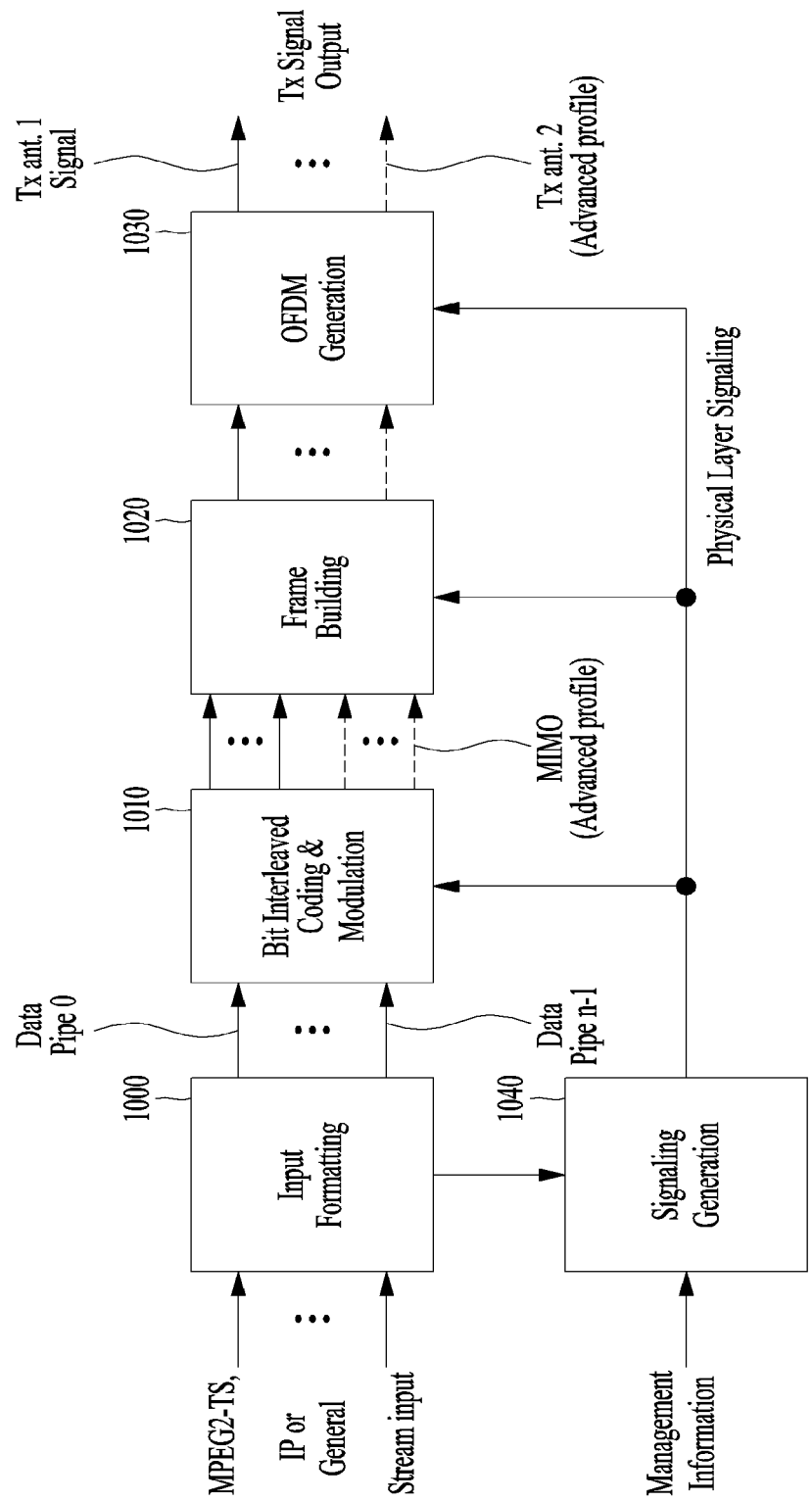
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

The term "signaling" in the present invention may indicate that service information (SI) that is transmitted and received from a broadcast system, an Internet system, and/or a broadcast/Internet convergence system. The service information (SI) may include broadcast service information (e.g., ATSC-SI and/or DVB-SI) received from the existing broadcast systems.

The term "broadcast signal" may conceptually include not only signals and/or data received from a terrestrial broadcast, a cable broadcast, a satellite broadcast, and/or a mobile broadcast, but also signals and/or data received from bidirectional broadcast systems such as an Internet broadcast, a broadband broadcast, a communication broadcast, a data broadcast, and/or VOD (Video On Demand).

The term "PLP" may indicate a predetermined unit for transmitting data contained in a physical layer. Therefore, the term "PLP" may also be replaced with the terms 'data unit' or 'data pipe' as necessary.

A hybrid broadcast service configured to interwork with the broadcast network and/or the Internet network may be used as a representative application to be used in a digital television (DTV) service. The hybrid broadcast service transmits, in real time, enhancement data related to broadcast A/V (Audio/Video) contents transmitted through the terrestrial broadcast network over the Internet, or transmits, in real time, some parts of the broadcast A/V contents over the Internet, such that users can experience a variety of contents.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas. The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators.

base data pipe: data pipe that carries service signaling data.

baseband frame (or BBFRAME): set of Kbch bits which form the input to one FEC encoding process (BCH and LDPC encoding).

cell: modulation value that is carried by one carrier of the OFDM transmission.

coded block: LDPC-encoded block of PLS1 data or one of the LDPC-encoded blocks of PLS2 data.

data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol).

DP_ID: this 8-bit field identifies uniquely a DP within the system identified by the SYSTEM_ID.

dummy cell: cell carrying a pseudo-random value used to fill the remaining capacity not used for PLS signaling, DPs or auxiliary streams.

emergency alert channel: part of a frame that carries EAS information data.

frame: physical layer time slot that starts with a preamble and ends with a frame edge symbol.

frame repetition unit: a set of frames belonging to same or different physical layer profile including a FEF, which is repeated eight times in a super-frame.

fast information channel: a logical channel in a frame that carries the mapping information between a service and the corresponding base DP.

FECBLOCK: set of LDPC-encoded bits of a DP data.

FFT size: nominal FFT size used for a particular mode, equal to the active symbol period Ts expressed in cycles of the elementary period T.

frame signaling symbol: OFDM symbol with higher pilot density used at the start of a frame in certain combinations of FFT size, guard interval and scattered pilot pattern, which carries a part of the PLS data.

frame edge symbol: OFDM symbol with higher pilot density used at the end of a frame in certain combinations of FFT size, guard interval and scattered pilot pattern.

frame-group: the set of all the frames having the same PHY profile type in a super-frame.

future extension frame: physical layer time slot within the super-frame that could be used for future extension, which starts with a preamble.

Futurecast UTB system: proposed physical layer broadcasting system, of which the input is one or more MPEG2-TS or IP or general stream(s) and of which the output is an RF signal.

input stream: A stream of data for an ensemble of services delivered to the end users by the system.

normal data symbol: data symbol excluding the frame signaling symbol and the frame edge symbol.

PHY profile: subset of all configurations that a corresponding receiver should implement.

PLS: physical layer signaling data consisting of PLS1 and PLS2.

PLS1: a first set of PLS data carried in the FSS symbols having a fixed size, coding and modulation, which carries basic information about the system as well as the parameters needed to decode the PLS2.

NOTE: PLS1 data remains constant for the duration of a frame-group.

PLS2: a second set of PLS data transmitted in the FSS symbol, which carries more detailed PLS data about the system and the DPs.

PLS2 dynamic data: PLS2 data that may dynamically change frame-by-frame.

PLS2 static data: PLS2 data that remains static for the duration of a frame-group.

preamble signaling data: signaling data carried by the preamble symbol and used to identify the basic mode of the system.

preamble symbol: fixed-length pilot symbol that carries basic PLS data and is located in the beginning of a frame.

NOTE: The preamble symbol is mainly used for fast initial band scan to detect the system signal, its timing, frequency offset, and FFT-size.

reserved for future use: not defined by the present document but may be defined in future.

super-frame: set of eight frame repetition units.

time interleaving block (TI block): set of cells within which time interleaving is carried out, corresponding to one use of the time interleaver memory.

TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion.

Type 2 DP: DP of a frame where all DPs are mapped into the frame in FDM fashion.

XFECBLOCK: set of Ncells cells carrying all the bits of one LDPC FECBLOCK.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame building block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
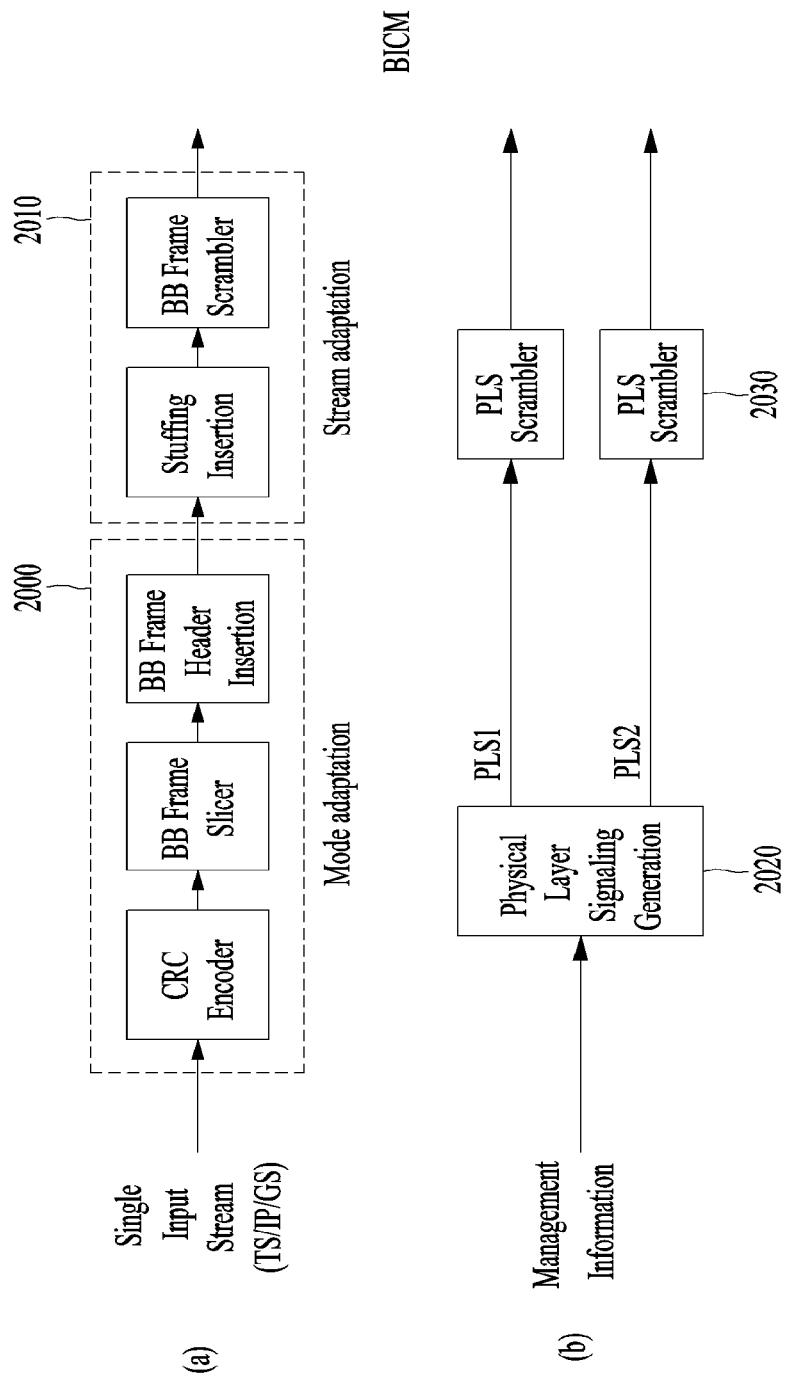
FIG. 2 illustrates an input formatting block according to one embodiment of the present invention.
Figure 3:
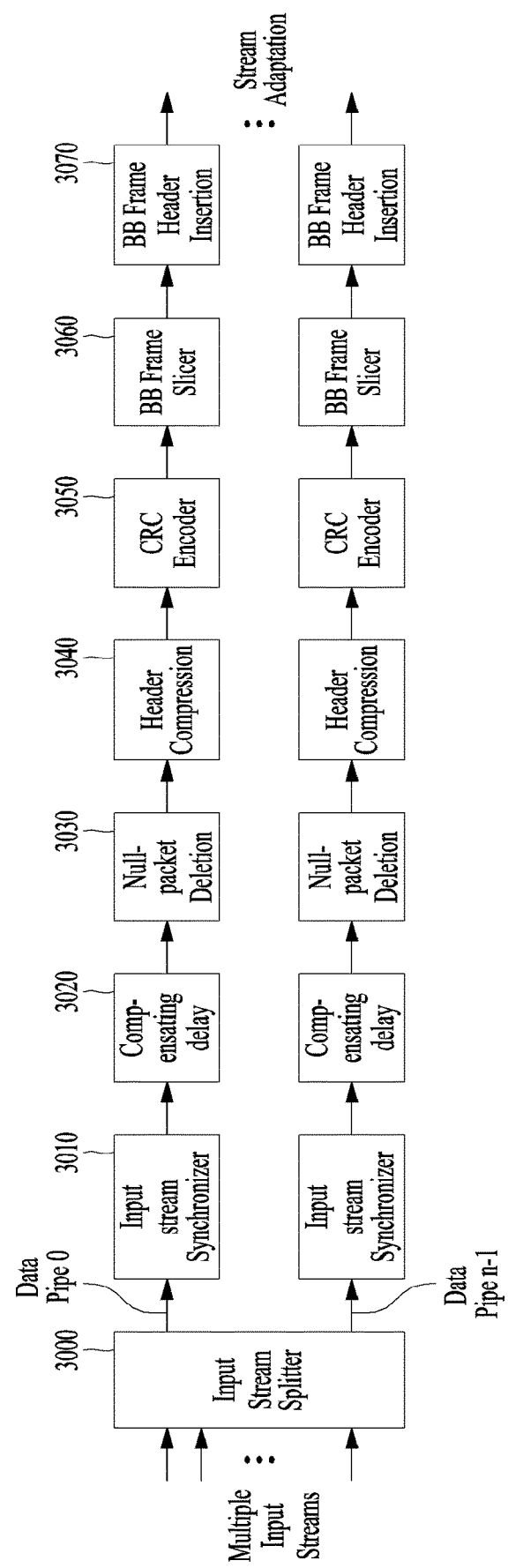
FIG. 3 illustrates an input formatting block according to another embodiment of the present invention.
Figure 4:
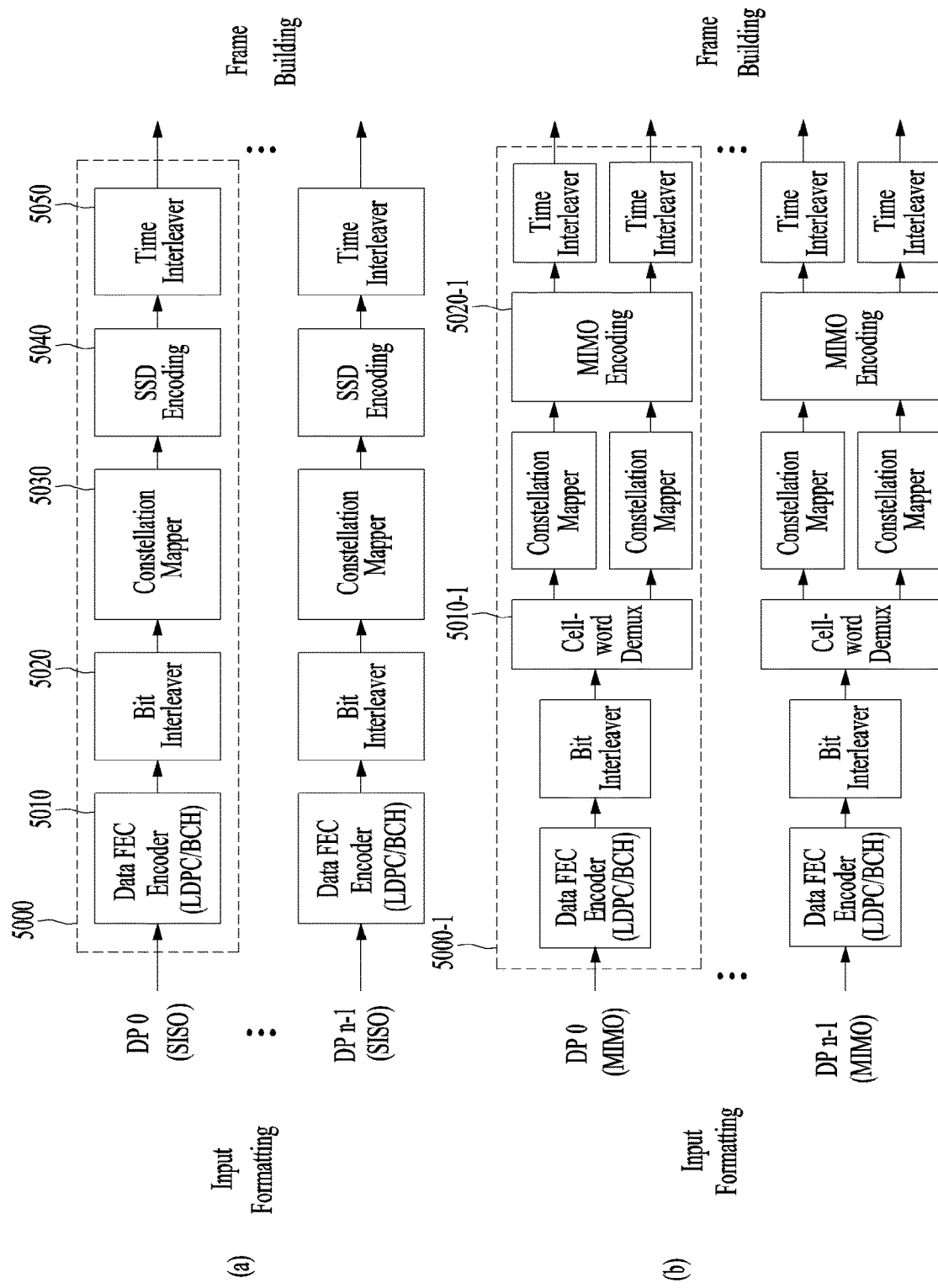
FIG. 4 illustrates a BICM block according to an embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler. The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream. The above-described blocks may be omitted or replaced by blocks having similar or identical functions.

FIG. 4 illustrates a BICM block according to an embodiment of the present invention.

The BICM block illustrated in FIG. 4 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The time interleaver 5050 can operates at the DP level. The parameters of time interleaving (TI) may be set differently for each DP. Details of operations of the time interleaver 5050 will be described later.

A processing block 50001 of the BICM block for the advanced profile can include the Data FEC encoder, bit interleaver, constellation mapper, and time interleaver.

However, the processing block 5000-1 is distinguished from the processing block 5000 further includes a cell-word demultiplexer 50101 and a MIMO encoding block 50201.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol 1 of their respective TX antennas.

The above-described blocks may be omitted or replaced by blocks having similar or identical functions.

Figure 5:
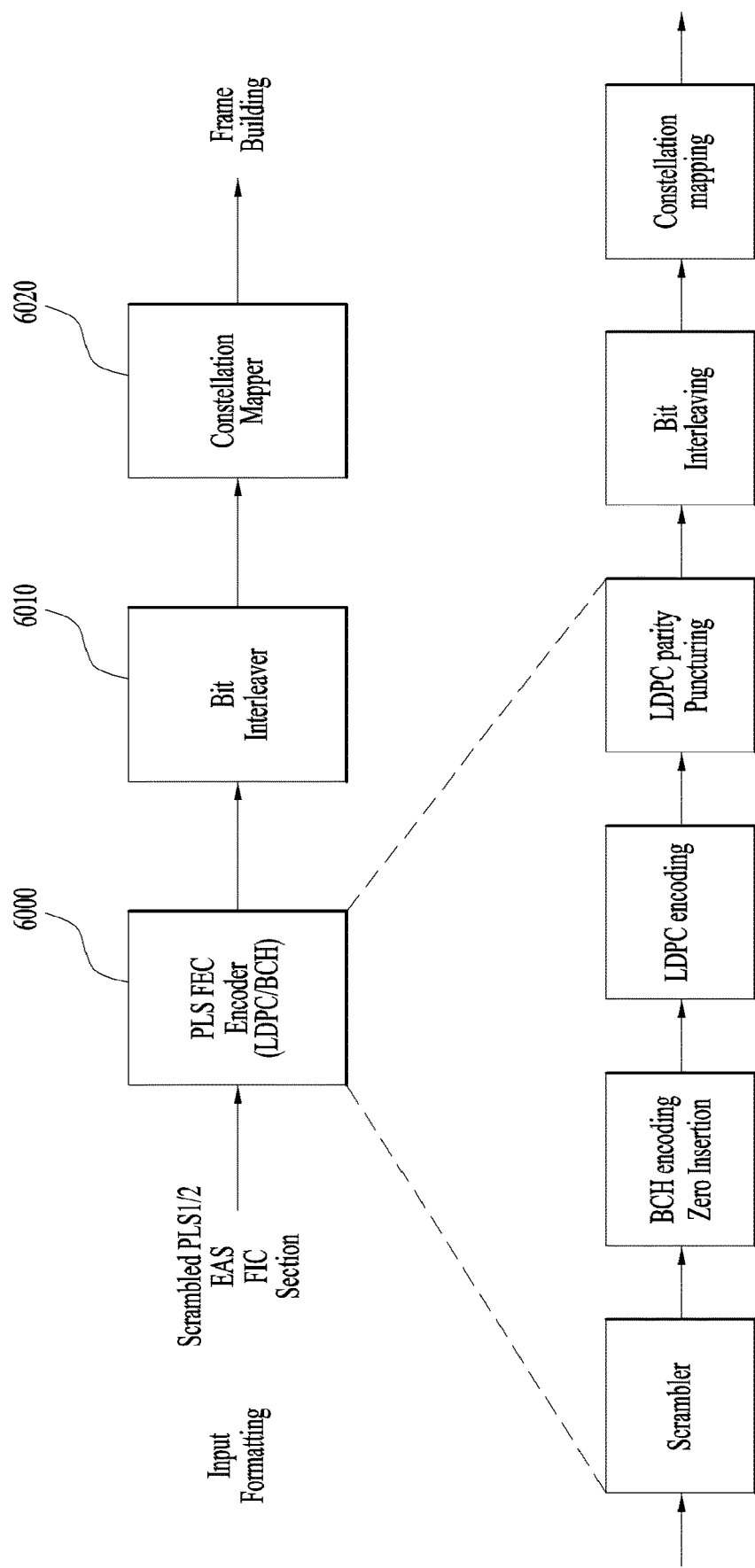
FIG. 5 illustrates a BICM block according to another embodiment of the present invention.

FIG. 5 illustrates a BICM block according to another embodiment of the present invention.

The BICM block illustrated in FIG. 6 corresponds to an embodiment of the BICM block 1010 described with reference to FIG. 1.

FIG. 5 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Figure 6:
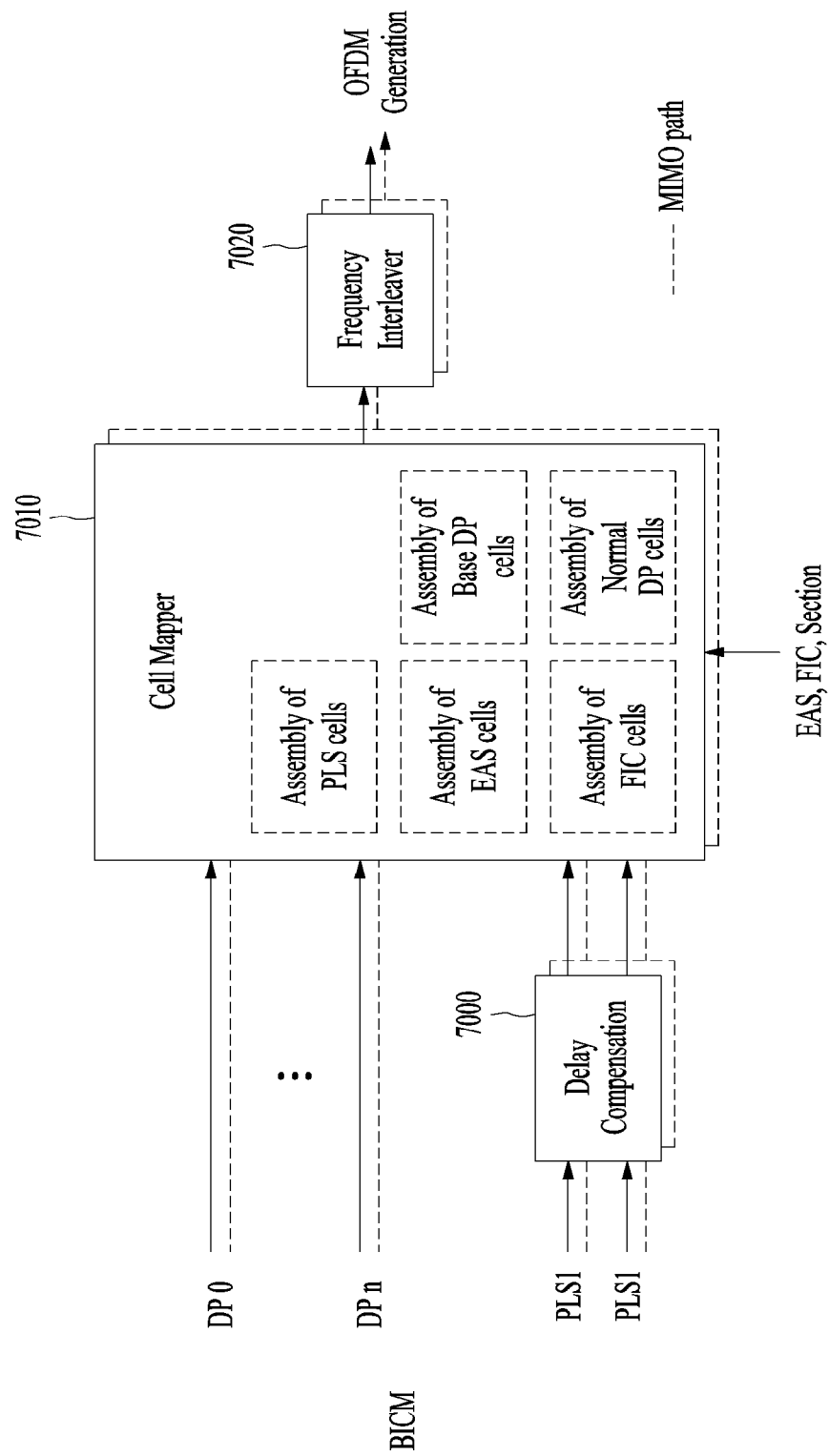
FIG. 6 illustrates a frame building block according to one embodiment of the present invention.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permuted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Equation 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ (=$N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 <1021 | | | | | | | | |
| >1020 | 2100 | | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

FIG. 6 illustrates a frame building block according to one embodiment of the present invention.

The frame building block illustrated in FIG. 6 corresponds to an embodiment of the frame building block 1020 described with reference to FIG. 1.

Referring to FIG. 6, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 7:
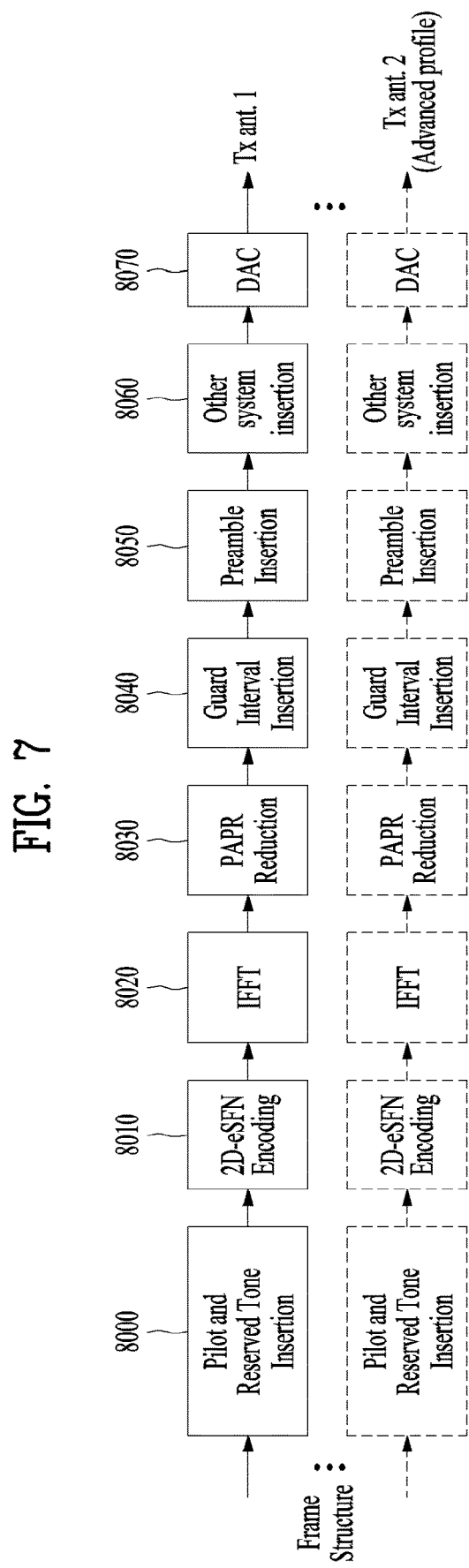
FIG. 7 illustrates an OFDM generation block according to an embodiment of the present invention.

FIG. 7 illustrates an OFDM generation block according to an embodiment of the present invention.

The OFDM generation block illustrated in FIG. 7 corresponds to an embodiment of the OFDM generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 7, the OFDM generation block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070.

The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

Figure 8:
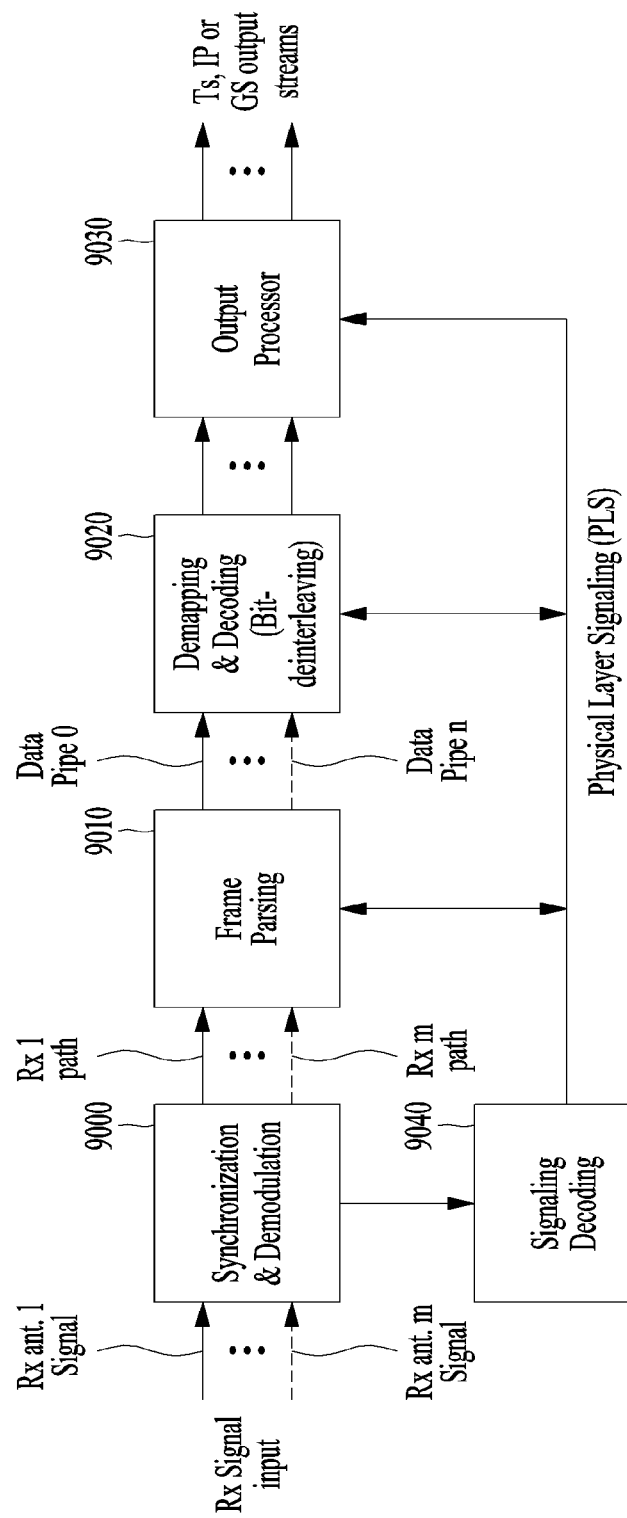
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9040 to restore scheduling information generated by the apparatus for transmitting broadcast signals.

The demapping & decoding module 9020 can convert the input signals into bit domain data and then deinterleave the same as necessary. The demapping & decoding module 9020 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 8300 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

Figure 9:
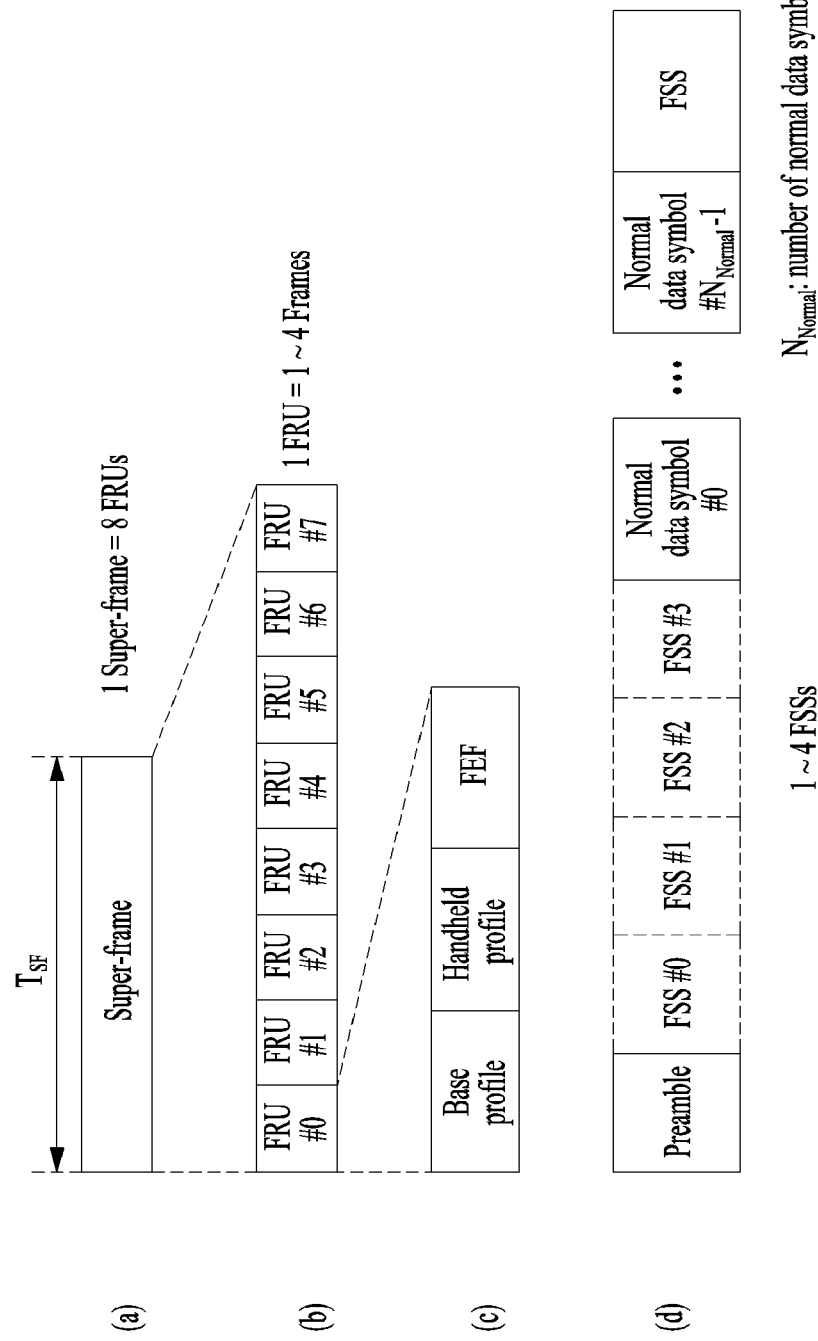
FIG. 9 illustrates a frame structure according to an embodiment of the present invention.

FIG. 9 illustrates a frame structure according to an embodiment of the present invention.

FIG. 9 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figures 10, 11:
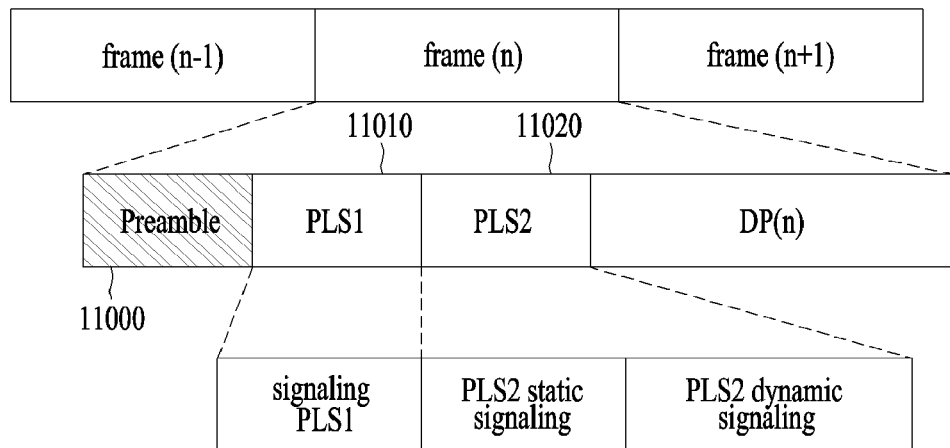
FIG. 10 illustrates a signaling hierarchy structure of the frame according to an embodiment of the present invention.
FIG. 11 illustrates preamble signaling data according to an embodiment of the present invention.

FIG. 10 illustrates a signaling hierarchy structure of the frame according to an embodiment of the present invention.

FIG. 10 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 11 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 12 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
| --- | --- |
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
| --- | --- |
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
| --- | --- |
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotalpartial block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal full block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 13 illustrates PLS2 data according to an embodiment of the present invention.

FIG. 13 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
| --- | --- |
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data.

DP_FEC_TYPE: This 2-bit field indicates the FEC type used by the associated DP. The FEC type is signaled according to the below table 14.

TABLE 14

| Value | FEC_TYPE |
| --- | --- |
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |

TABLE 15-continued

| Value | Code rate |
|---|---|
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | $P_I$ | $N_{TI}$ |
|---|---|---|
| 00 | 1 | 1 |
| 01 | 2 | 2 |

TABLE 18-continued

| 2-bit field | $P_I$ | $N_{TI}$ |
|---|---|---|
| 10 | 4 | 3 |
| 11 | 8 | 4 |

DP_FRAME_INTERVAL: This 2-bit field indicates the frame interval (HUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31.

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 14, 15:
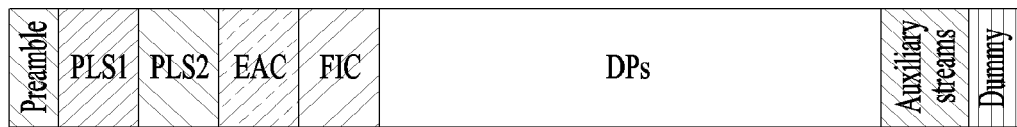
FIG. 14 illustrates PLS2 data according to another embodiment of the present invention.
FIG. 15 illustrates a logical structure of a frame according to an embodiment of the present invention.

FIG. 14 illustrates PLS2 data according to another embodiment of the present invention.

FIG. 14 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023.

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 15 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 16:
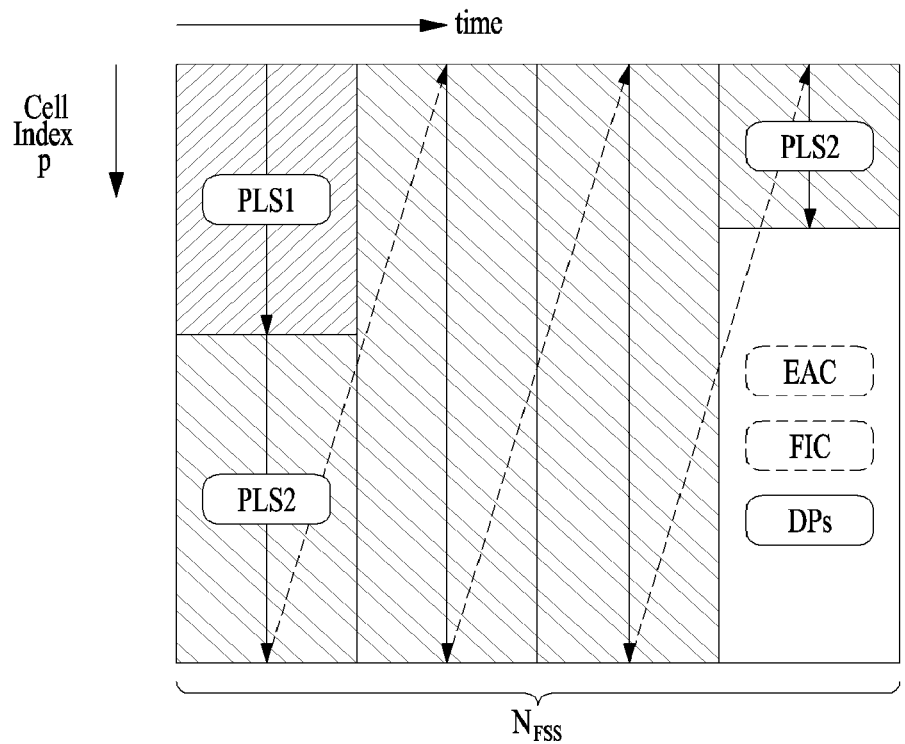
FIG. 16 illustrates PLS mapping according to an embodiment of the present invention.

FIG. 16 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 16. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 17:
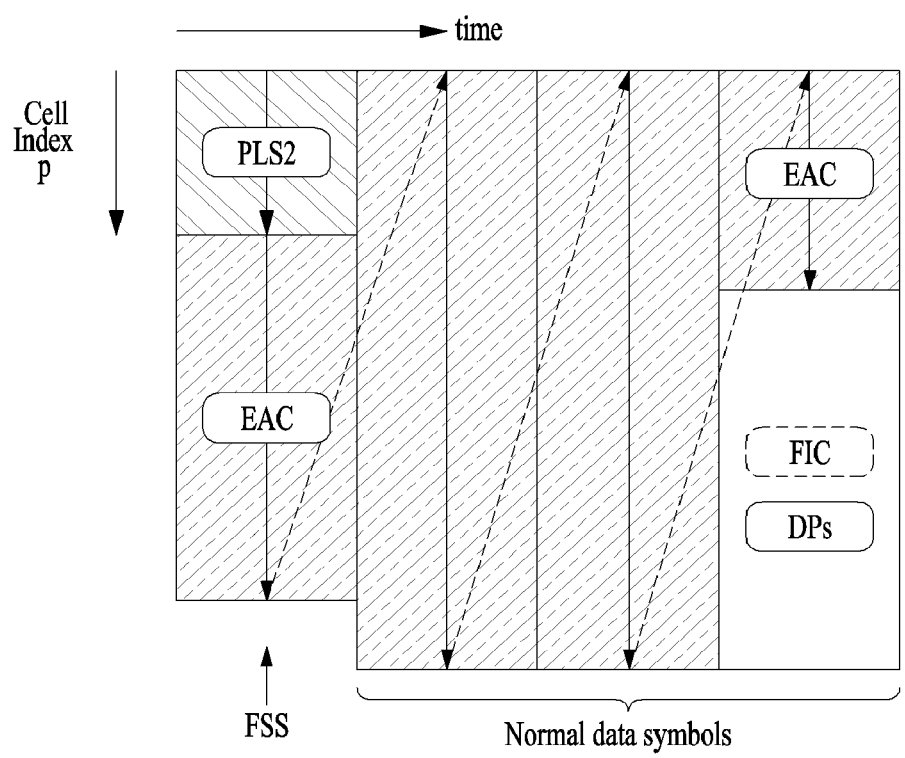
FIG. 17 illustrates EAC mapping according to an embodiment of the present invention.

FIG. 17 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 17. Depending on the EAS message size, EAC cells may occupy a few symbols, as shown in FIG. 17.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 18:
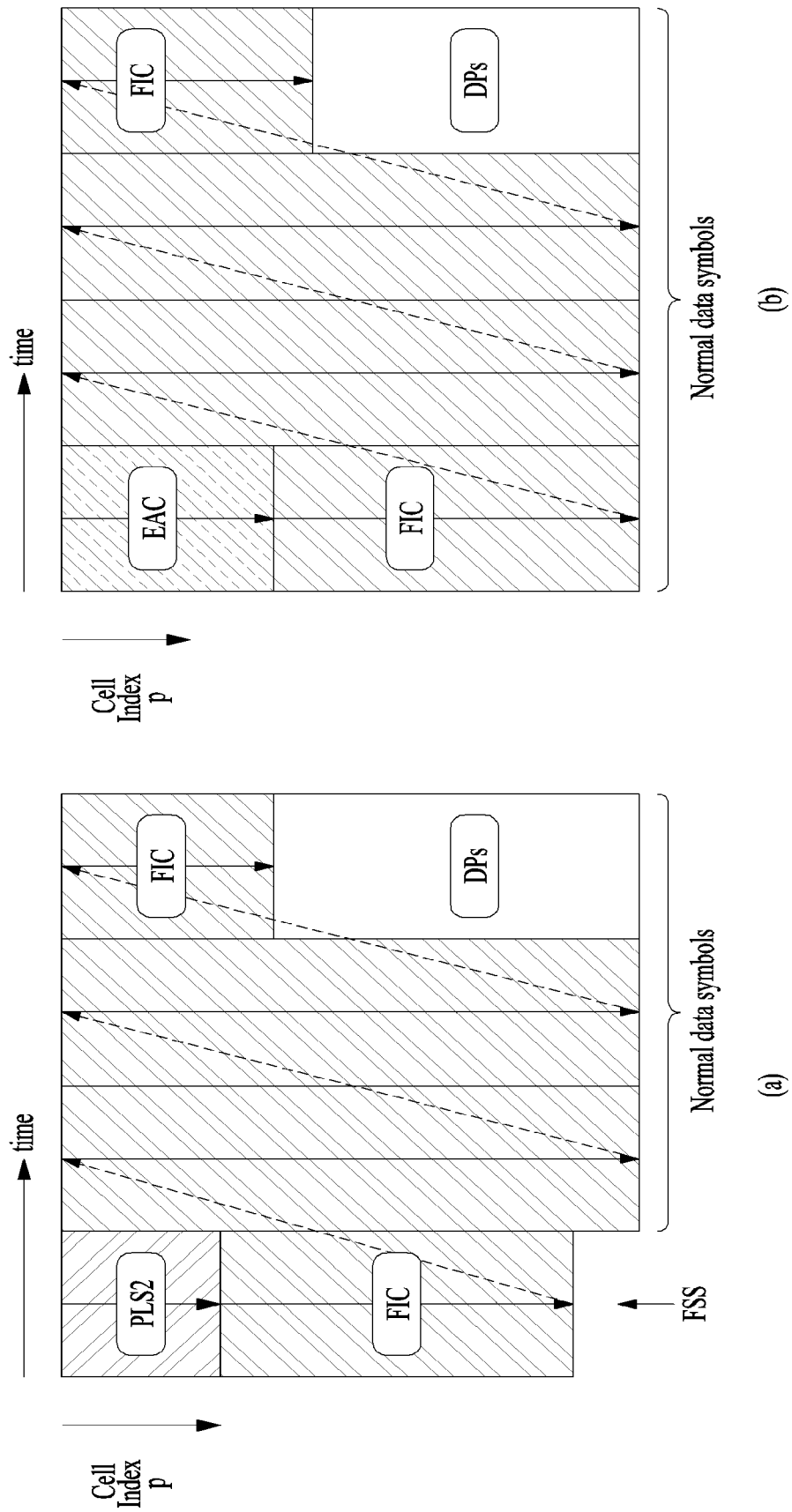
FIG. 18 illustrates FIC mapping according to an embodiment of the present invention.

FIG. 18 illustrates FIC mapping according to an embodiment of the present invention.

shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 19:
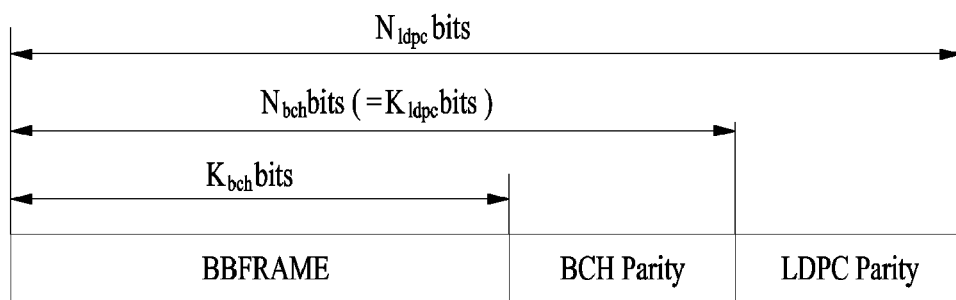
FIG. 19 illustrates an FEC structure according to an embodiment of the present invention.

FIG. 19 illustrates an FEC structure according to an embodiment of the present invention.

FIG. 19 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

Figure 22:
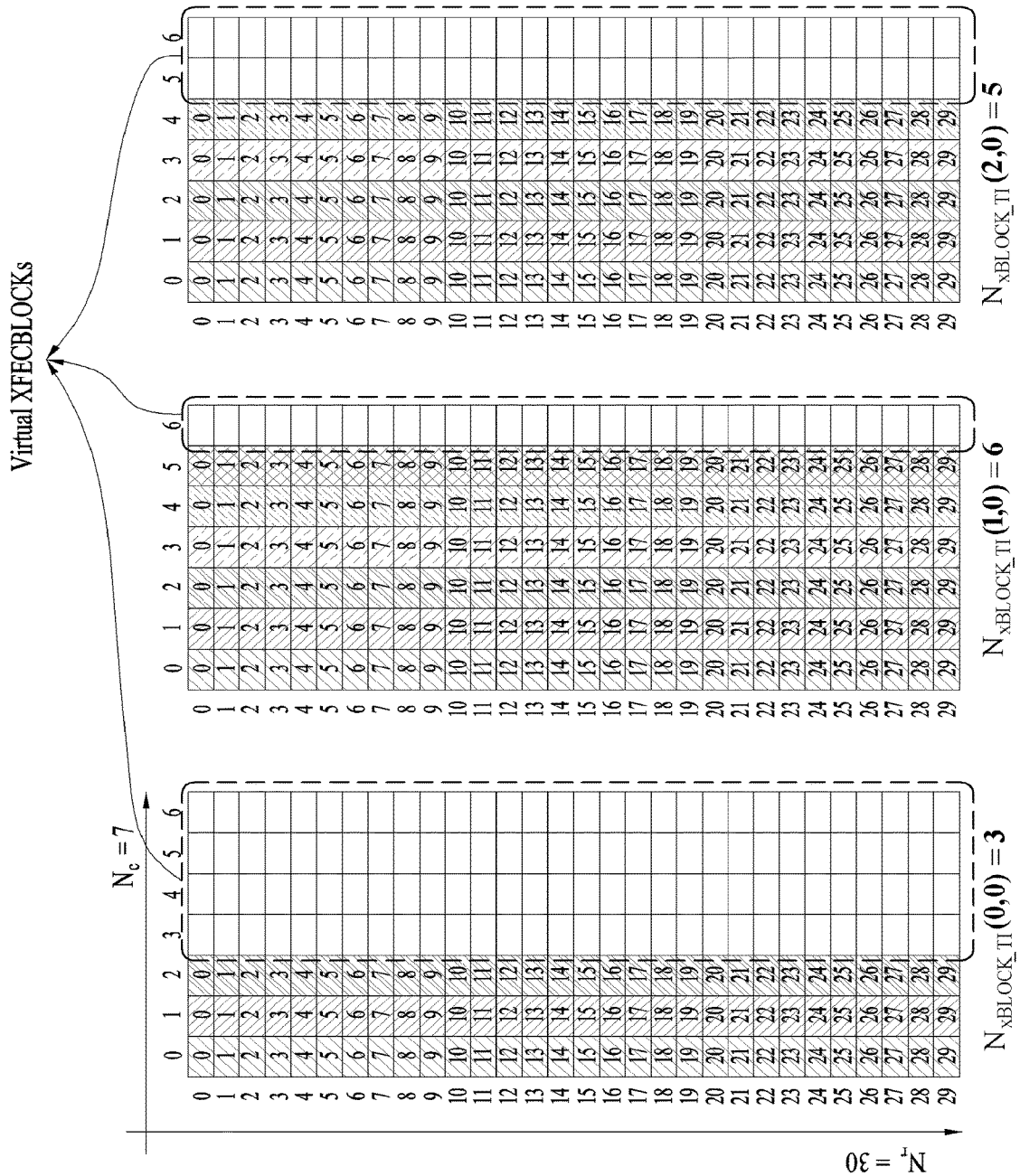
FIG. 22 illustrates an operation of a twisted row-column block interleaver according to another embodiment of the present invention.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as following equation.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Equation 2]

The parameters for long FECBLOCK and short FECBLOCK are given in the above table 28 and 29, respectively.

The detailed procedure to calculate Nldpc−Kldpc parity bits for long FECBLOCK, is as follows:

1) Initialize the parity bits, $$p_0=p_1=p_2=\ldots=p_{N_{ldpc}-L_{ldpc}-1}=0$$ [equation3]

2) Accumulate the first information bit—i0, at parity bit addresses specified in the first row of an addresses of parity check matrix. The details of addresses of parity check matrix will be described later. For example, for rate 13/15:

$$p_{983} = p_{983} \oplus i_0 \quad p_{2815} = p_{2815} \oplus i_0$$ [Equation 4]
$$p_{4837} = p_{4837} \oplus i_0 \quad p_{4989} = p_{4989} \oplus i_0$$
$$p_{6138} = p_{6138} \oplus i_0 \quad p_{6458} = p_{6458} \oplus i_0$$
$$p_{6921} = p_{6921} \oplus i_0 \quad p_{6974} = p_{6974} \oplus i_0$$
$$p_{7572} = p_{7572} \oplus i_0 \quad p_{8260} = p_{8260} \oplus i_0$$
$$p_{8496} = p_{8496} \oplus i_0$$

3) For the next 359 information bits, is, s=1, 2, . . . , 359 accumulate is at parity bit addresses using following equation.

$$\{x+(s \bmod 360) \times Q_{ldpc}\} \bmod (N_{ldpc}-K_{ldpc})$$ [Equation 5]

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_1 \quad p_{2839} = p_{2839} \oplus i_1$$ [Equation 6]
$$p_{4861} = p_{4861} \oplus i_1 \quad p_{5013} = p_{5013} \oplus i_1$$
$$p_{6162} = p_{6162} \oplus i_1 \quad p_{6482} = p_{6482} \oplus i_1$$
$$p_{6945} = p_{6945} \oplus i_1 \quad p_{6998} = p_{6998} \oplus i_1$$
$$p_{7596} = p_{7596} \oplus i_1 \quad p_{8284} = p_{8284} \oplus i_1$$
$$p_{8520} = p_{8520} \oplus i_1$$

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the equation 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1.

$$p_i = p_i \oplus p_{i-1}, i=1,2,\ldots, N_{ldpc}-K_{ldpc}-1 \quad \text{[Equation 7]}$$

where final content of pi, i=0, 1, . . . Nldpc−Kldpc−1 is equal to the parity bit pi.

TABLE 30

| Code Rate | $Q_{ldpc}$ |
| --- | --- |
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with the LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
| --- | --- |
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 20 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames HUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks (NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 32.

TABLE 32

| Modes | Descriptions |
| --- | --- |
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n,s)$.

Figure 21:
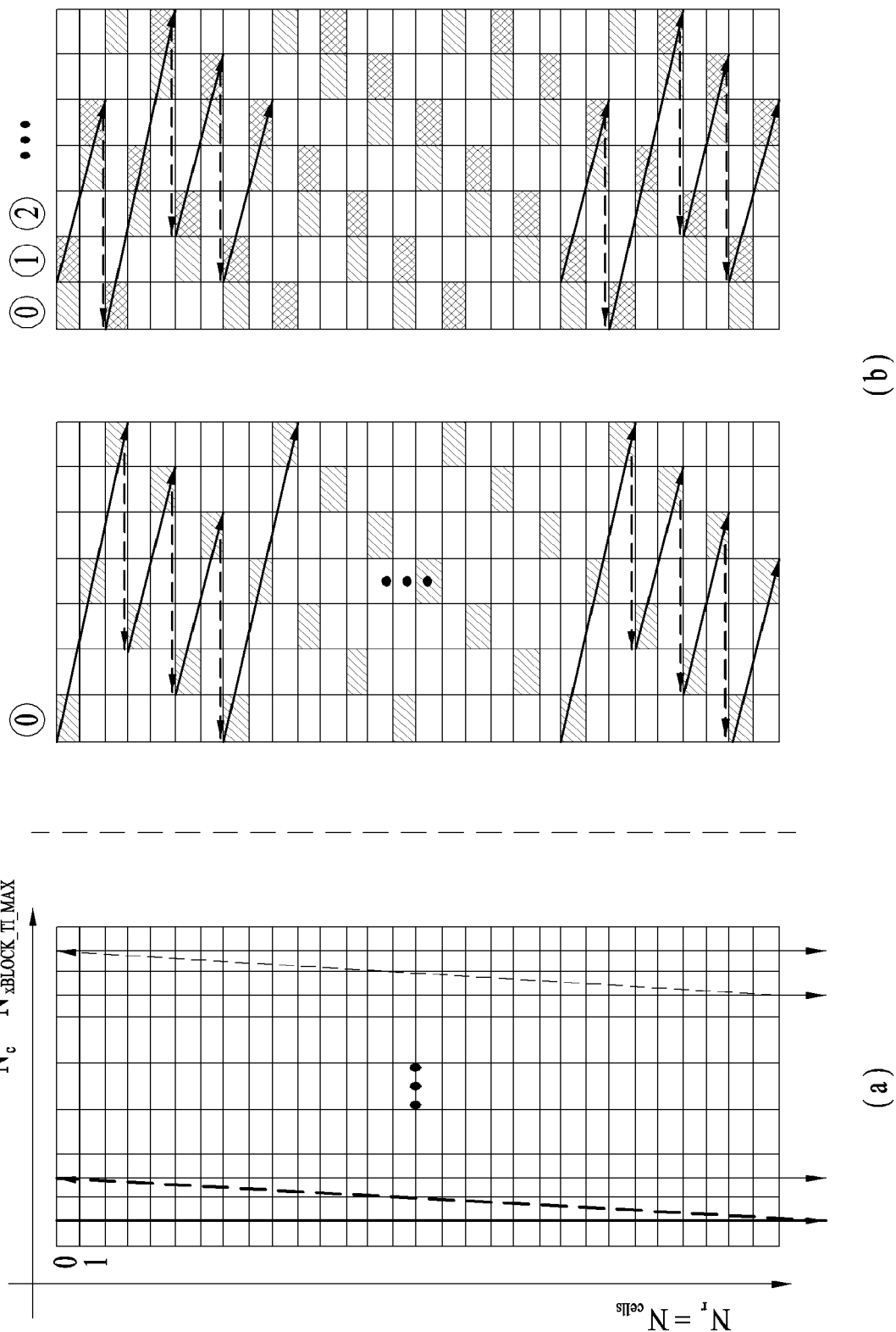
FIG. 21 illustrates the basic operation of a twisted row-column block interleaver according to an embodiment of the present invention.

FIG. 21 illustrates the basic operation of a twisted row-column block interleaver according to an embodiment of the present invention.

FIG. 21(a) shows a writing operation in the time interleaver and FIG. 21(b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ ($i=0, \ldots, N_rN_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows equation.

$$\text{GENERATE}(R_{n,s,i}, C_{n,s,i}) = \quad \text{[Equation 8]}$$
$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows equation.

$$\text{for} \begin{cases} N'_{xBLOCK\_TI\_MAX} = \\ N_{xBLOCK\_TI\_MAX} + 1 \end{cases}, \text{if } N_{xBLOCK\_TI\_MAX} \mod 2 = 0 \quad \text{[Equation 9]}$$
$$\begin{cases} N'_{xBLOCK\_TI\_MAX} = \\ N_{xBLOCK\_TI\_MAX} \end{cases}, \text{if } N_{xBLOCK\_TI\_MAX} \mod 2 = 1$$

$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

FIG. 22 illustrates an operation of a twisted row-column block interleaver according to another embodiment of the present invention.

More specifically, FIG. 22 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$.

The variable number $N_{xBLOCK\_TI}(n,s)=N_r$ will be less than or equal to $N'_{xBLOCK\_TI\_MAX}$. Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow equation.

$$p = 0; \quad \text{[Equation 10]}$$
$$\text{for } i = 0; i < N_{cells}N'_{xBLOCK\_TI\_MAX}; i = i + 1$$
$$\{\text{GENERATE}(R_{n,s,i}, C_{n,s,i});$$
$$V_i = N_r C_{n,s,j} + R_{n,s,j}$$
$$\text{if } V_i < N_{cells}N_{xBLOCK\_TI}(n,s)$$
$$\{$$

-continued
$$Z_{n,s,p} = V_i; p = p + 1;$$
$$\}$$
$$\}$$

The number of TI groups is set to 3. The option of time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK TI(0,0)=3, NxBLOCK TI(1,0)=6, and NxBLOCK TI(2,0)=5, respectively. The maximum number of XFECBLOCK is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

Figure 23:
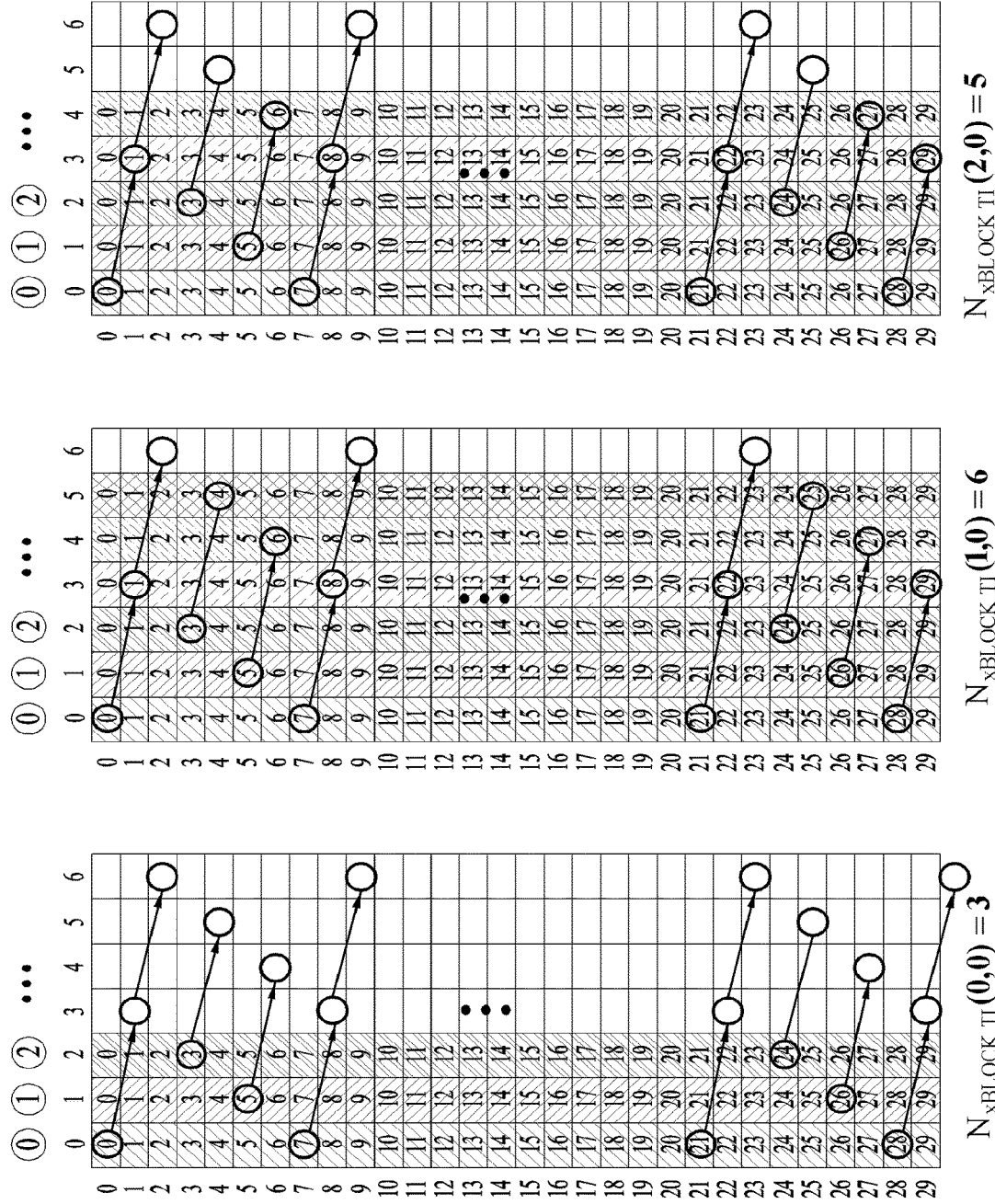
FIG. 23 illustrates a diagonal-wise reading pattern of a twisted row-column block interleaver according to an embodiment of the present invention.

FIG. 23 illustrates a diagonal-wise reading pattern of a twisted row-column block interleaver according to an embodiment of the present invention.

More specifically FIG. 23 shows a diagonal-wise reading pattern from each interleaving array with parameters of $N_{xBLOCK\_TI\_MAX}'=7$ and Sshift=(7−1)/2=3. Note that in the reading process shown as pseudocode above, if $V_i \geq N_{cells} N_{xBLOCK\_TI}(n,s)$, the value of Vi is skipped and the next calculated value of Vi is used.

FIG. 24 illustrates interleaved XFECBLOCKs from each interleaving array according to an embodiment of the present invention.

FIG. 24 illustrates the interleaved XFECBLOCKs from each interleaving array with parameters of $N_{xBLOCK\_TI\_MAX}'=7$ and Sshift=3.

Figure 25:
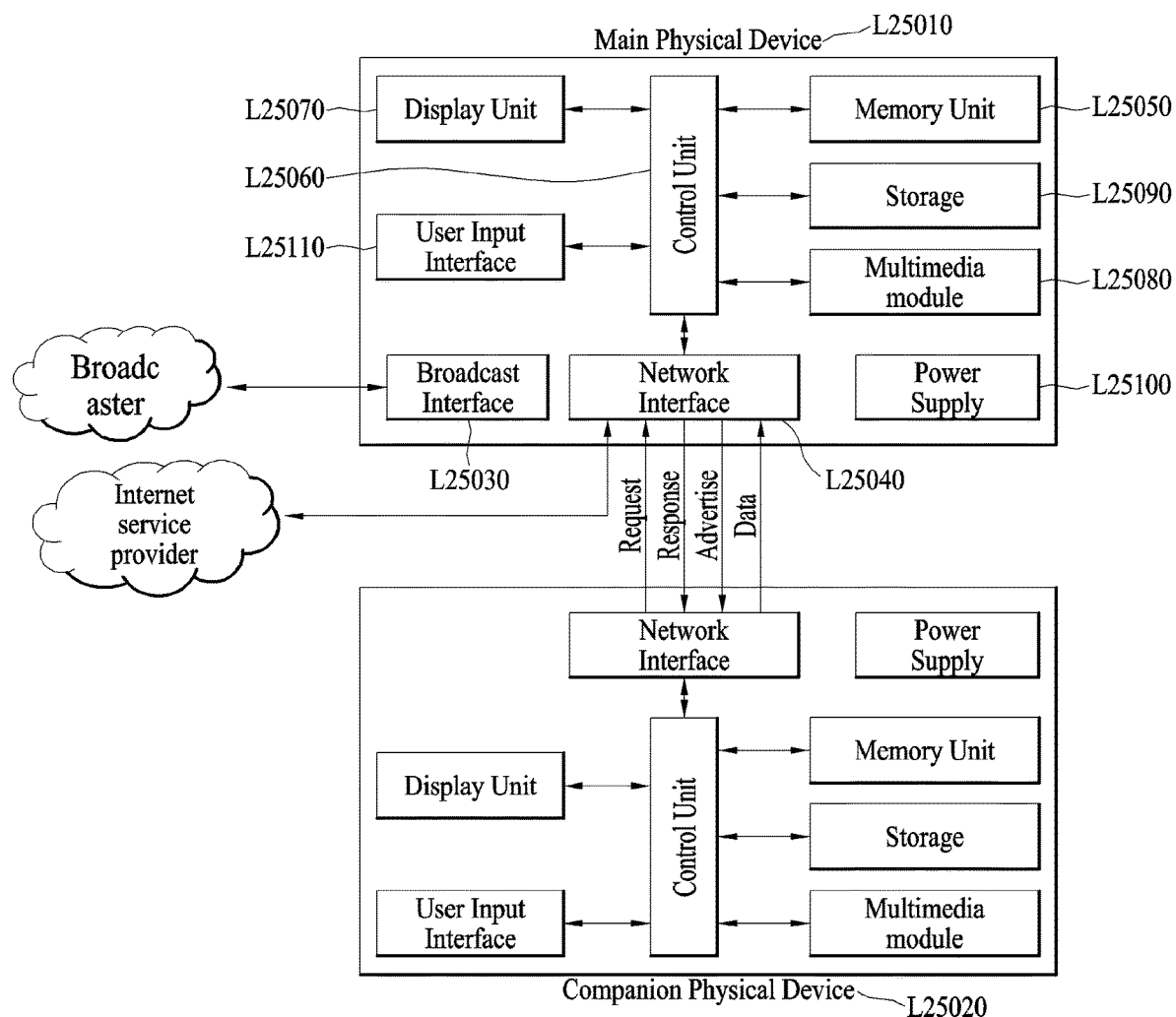
FIG. 25 is a block diagram illustrating a main physical device and a companion physical device according to an embodiment of the present invention.

FIG. 25 is a block diagram illustrating a main physical device and a companion physical device according to an embodiment of the present invention.

The embodiment of the present invention can provide a service guide in a terrestrial broadcast environment or a mobile broadcast environment. In addition, the embodiment of the present invention can provide a service guide regarding services available in the next generation hybrid broadcast environment based on interaction between a terrestrial broadcast network and the Internet.

The embodiment of the present invention can inform users of not only various services available in the next generation hybrid broadcast system, but also constituent content of the services and/or component elements of the services. As a result, the user can easily confirm, select, and view the corresponding service, resulting in increased user convenience.

The embodiment of the present invention may construct a single service, various constituent content of the service, and/or component elements of the service, and may make a cross reference to each other. As a result, the broadcast receiver can easily construct and provide the corresponding service, and can allow the user to easily recognize the corresponding service.

The embodiments of the present invention can extend the reference structure for linking one service to various content and/or component elements of the service, and can allow the broadcast receiver and/or the user to reduce the amount of resources and/or consumption time needed to search for content and/or component elements of the single service.

FIG. 25 is a block diagram illustrating a main physical device and a companion physical device according to an embodiment of the present invention.

The main physical device (L25010) according to an embodiment of the present invention is one of devices for interactive services, and may indicate a target device to be controlled by the companion physical device (L25020). The main physical device may be referred to as a main device, a main reception device, a main display, a main screen, or the like.

The main physical device (L25010) according to one embodiment of the present invention may include a broadcast interface (L25030), a network interface (L25040), a memory unit (L25050), a control unit (L25060), a display unit (L25070), a multimedia module (L25080), a storage unit (L25090), a power-supply unit (L25100), and/or a user input interface (L25110).

The broadcast interface (L25030) may indicate a physical device located between the broadcaster and the device, such that the broadcast interface (L25030) acting as the physical device can transmit various messages (such as the AV stream, service guide, and notification messages) and/or data. The broadcast interface (L25030) may receive broadcast signals, signaling information, data, etc. from the broadcaster.

The network interface (L25040) may indicate a physical device located between various devices (e.g., the main physical device and the companion physical device), such that the network interface (L25040) can transmit various messages (e.g., commands, requests, actions, response messages, etc.), and can perform advertising and/or data transmission. The network interface may receive broadcast services, broadcast content, signaling information, applications, data, etc. from the Internet service provider.

The memory unit (L25050) may be an optional or selective device implemented in various types of devices, and may indicate a volatile physical device capable of temporarily storing various types of data.

The control unit (L25060) may be configured to control the entire operation of the source device and/or the sink device, and may be implemented by software or hardware. In this case, the source device may indicate a device configured to transmit messages and/or data. The sink device may indicate a device configured to receive messages and/or data. Therefore, the main physical device and the companion physical device according to the embodiment of the present invention may correspond to the source device or the sink device.

The display unit (L25070) may display data received through the network interface or data stored in the storage unit on the screen. In this case, the display unit may be controlled by the control unit.

The multimedia module (L25080) may reproduce various types of multimedia. The multimedia module may be contained in the control unit, and may be located independently of the control unit.

The storage unit (L25090) may indicate a non-volatile physical device capable of storing various types of data therein. For example, the SC card may correspond to the storage unit.

The power-supply unit (L25100) may receive the external power-supply voltage and/or the internal power-supply voltage under control of the control unit, such that the power-supply unit (L25100) can provide a power-supply voltage needed to operate other constituent elements.

The user input interface (L25110) may indicate a device capable of receiving input signals or commands from the user.

The companion physical device (L25020) according to the embodiment of the present invention may be one of devices needed for interactive services, and may indicate a device configured to control the main device. Generally, the companion physical device may directly receive input signals from the user. The companion physical device may be referred to as a companion device, a second device, an additional device, an auxiliary device, a companion reception device, a companion receiver, a companion display, a second screen, or the like.

The physical device (L25020) according to the embodiment of the present invention may include a network interface, a memory unit, a control unit, a display unit, a multimedia module, a storage unit, a power-supply unit, and/or a user input interface.

From among all the constituent elements of the companion physical device according to the embodiment, some constituent elements having the same names as those of the main device may have the same functions as those of the constituent elements of the above-mentioned main device.

Figure 26:
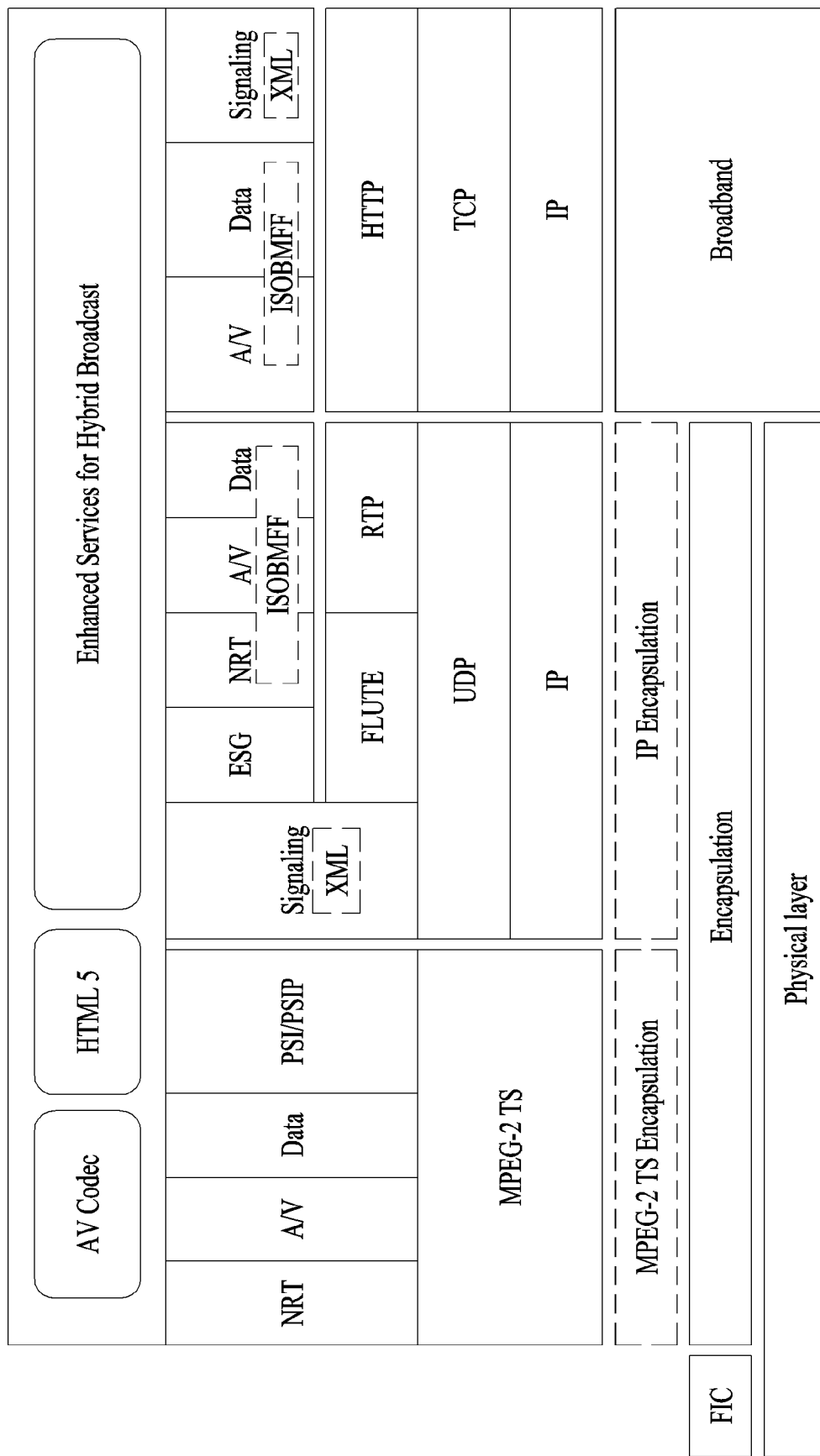
FIG. 26 is a block diagram illustrating a protocol stack to support a hybrid broadcast service according to an embodiment of the present invention.

FIG. 26 is a block diagram illustrating a protocol stack configured to support a hybrid broadcast service according to an embodiment of the present invention.

A physical layer may receive terrestrial broadcast signals, and may properly convert (or transform) the received terrestrial broadcast signals.

IP (Internet Protocol) Encapsulation may acquire an IP datagram using information acquired from the physical layer. In addition, the IP encapsulation may convert (or transform) the acquired IP datagram into a specific frame (e.g., RS Frame, GSE, etc.).

MPEG2 TS Encapsulation may acquire the MPEG2 TS using information acquired from the physical layer. In addition, the MPEG2 TS Encapsulation may convert the acquired MPEG2 TS datagram into a specific frame (e.g., RS Frame, GSE, etc.).

A Fast Information Channel (FIC) may transmit specific information (e.g., mapping information between the service ID and the frame) so as to access the service and/or content.

Signaling may include signaling information to support a hybrid broadcast service according to an embodiment of the present invention. This signaling information may include signaling information to support efficient acquisition of the services and/or content. This signaling information may be denoted in binary and/or XML format, and may be transmitted through the terrestrial broadcast network and/or the broadband network.

Real time A/V (Audio/Video) content and data may be represented by ISO Base Media File Format (ISOBMFF) or the like, and may be transmitted in real time through the terrestrial broadcast network and/or the broadband network. Non-real time content may be transmitted on the basis of IP/UDP/FLUTE. Real-time broadcast A/V (Audio/Video) content, data and/or signaling information may be transmitted in real time through the Internet. In this case, the real-time broadcast A/V (Audio/Video) content, data and/or signaling information may be transmitted by a request message. Alternatively, the real-time broadcast A/V (Audio/Video) content, data and/or signaling information may also be transmitted through real-time streaming.

The embodiment of the present invention may combine data through the above-mentioned protocol stack, and may also provide various enhanced services, for example, an interactive service, a second screen service, etc.

FIG. 27 is a conceptual diagram illustrating an XML schema of a Service Type element according to an embodiment of the present invention.

Prior to describing FIG. 27, definition and structure of the service guide, the service fragment, and the ServiceType element according to the embodiment will be described as follows.

The service guide may indicate a broadcast distribution channel over which Service Guide Delivery Descriptors carried within announcement sessions, can be delivered to the terminal.

Service Guide may enable the service and content providers to describe the services and content they make available, or offer for subscription or purchase, as Mobile Broadcast services either over Broadcast Channel or over Interaction Channel. It may also enable the way to describe how to access the services. From the user perspective the Service Guide can be seen as an entry point to discover the currently available or scheduled services and content and to filter those based on their preferences. Furthermore, the Service Guide may provide the entry point to interactive services.

The Service Guide may include data model that models the services, schedules, content, related purchase and provisioning data, access and interactivity data and so on in terms of Service Guide fragments.

An embodiment of the invention may provide methods for initial discovery of Service Guide and the declaration of Service Guide fragments through Service Guide Delivery Descriptors that are sent over Service Guide Announcement Channel. An embodiment of the invention may provide delivery methods specified for Service Guide fragment delivery over Service Guide Delivery Channel, both over the Broadcast Channel as well as over the Interactive Channel. To manage the Service Guide data, an embodiment of the invention may provide update and management methods. An embodiment of the invention may provide the relevant backend interfaces for Service Guide.

The 'Service' fragment may describe the content items which comprise a broadcast service, at an aggregate level.

Depending on the type of the service, it may have interactive part(s), broadcastonly part(s), or both.

The service fragment may include components not directly related to the content but to the functionality of the service such as purchasing or subscription information.

In accordance with one embodiment of the present invention, as the part of the Service Guide, the 'Service' fragment may form a central hub referenced by the other fragments.

Together with the associated fragments, the terminal may determine the details associated with the service at any point of time. These details may be summarized into a user-friendly display, for example, of what, how and when the associated content may be consumed and at what cost.

A service may represent a bundle of content items, which forms a logical group to the end-user. An example would be a TV channel, composed of several TV shows. A 'Service' fragment contains the metadata describing the Mobile Broadcast service.

ServiceType element may indicate the type of a service written in the corresponding service fragment. The mixed service types may be indicated by the presence of multiple instances of ServiceType. This element may be processed by the terminal strictly for rendering to the user for example as a textual indicator, an icon, or graphic representation for the service.

The embodiments of the present invention provide a method for representing a service type used in a hybrid broadcast system. In addition, according to the embodiment, the range of ServiceType values to be shown in the hybrid broadcast system may be allocated to the ServiceTypeRangeType value.

The values allocated to the Service Type fragment according to the embodiment are as follows. If the Service Type value is set to zero '0', this means "Unspecified". If the Service Type value is set to 1, this means that the corresponding service is Basic TV. If the Service Type value is set to 2, this means that the corresponding service is Basic Radio. If the Service Type value is set to 3, this means that the corresponding service is a Rights Issuer Service. If the Service Type value is set to 4, this means 'Cachecast'. If the Service Type value is set to 5, this means 'File download services'. If the Service Type value is set to 6, this means 'Software management services'. If the Service Type value is set to 7, this means 'Notification'. If the Service Type value is set to 8, this means 'Service Guide'. If the Service Type value is set to 9, this means 'Terminal Provisioning services'. If the Service Type value is set to 10, this means 'Auxiliary Data'. If the Service Type value is set to 11, this means 'Streaming on demand'. If the Service Type value is set to 12, this means 'File download on demand'. If the Service Type value is set to 14, this means 'Linear service'. If the Service Type value is set to 15, this means 'AppBased service'. If the Service Type value is set to 16, this means 'Companion Screen service'. The remaining values other than the above-mentioned values may also be used to represent other services other than the above-mentioned services.

Referring to FIG. 27, the ServiceType element according to the embodiment may have the value of ServiceTypeRangeType. ServiceTypeRangeType may include ServiceTypeLRType, ServiceTypeOtherEnablersRangeType, and/or ServiceTypeProprietaryRangeType. In this case, ServiceTypeLRType may have a minimum value of 0, and may have any one of 13, 14, 15, 16 or higher as a maximum value.

Figure 28:
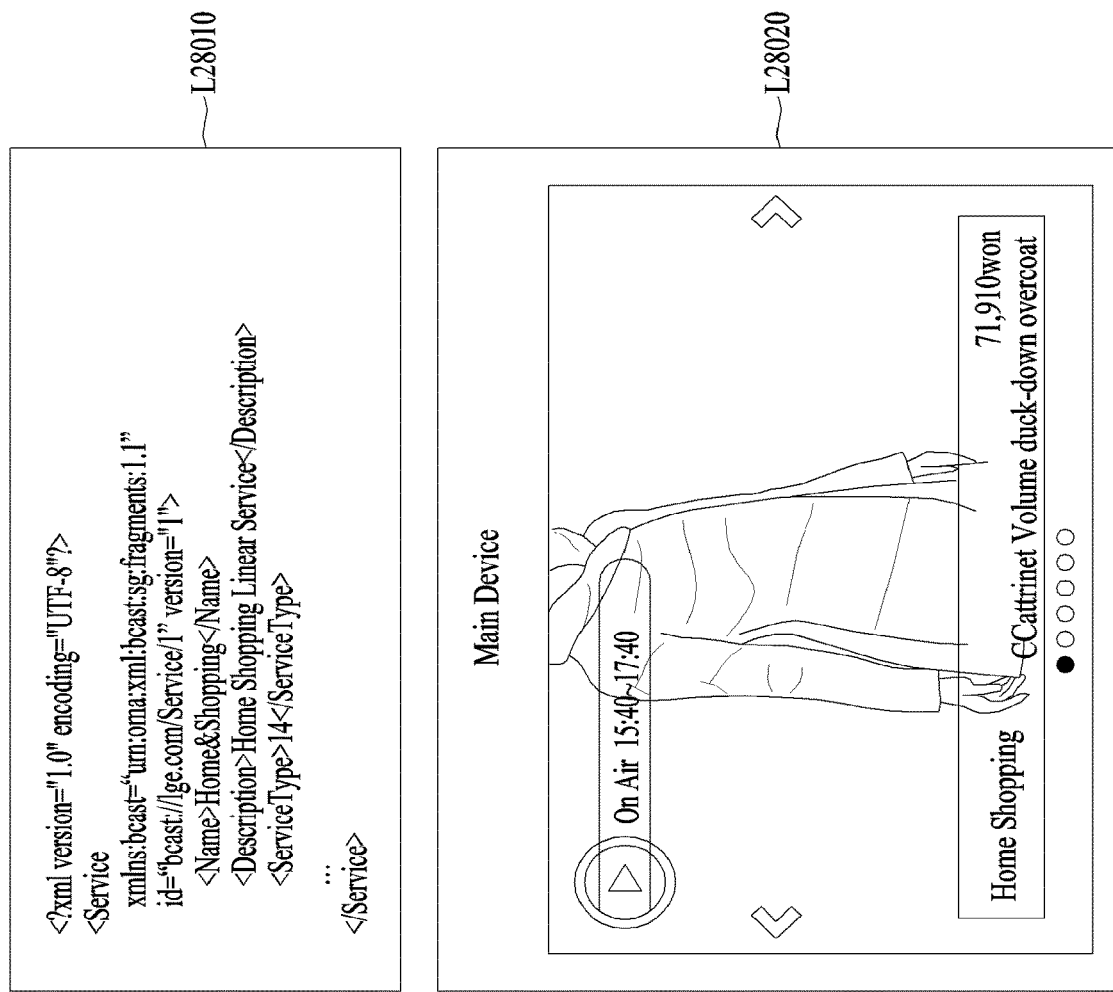
FIG. 28 illustrates an XML schema regarding a specific service having a service type value of 14, and an exemplary display image thereof according to an embodiment of the present invention.

FIG. 28 illustrates an XML schema regarding a specific service having a service type value of 14, and an exemplary display image thereof according to an embodiment of the present invention.

Referring to FIG. 28, the Service fragment may be entitled 'Home and Shopping', and may have the ServiceType value of 14. (L28010).

The ServiceType value of 14 may represent a Linear Service. In this case, the reception apparatus according to the embodiment can recognize that scheduling information of the service guide is contained in the screen when the selected service type is set to Linear Service (value=14). In addition, the embodiment of the present invention can provide the user with broadcast program schedule information by combining the corresponding service with schedule information. (L28020). In addition, if the service type is signaled in the service fragment, the receiver has only to combine the above-mentioned schedule information with the service including time information. Therefore, the embodiment of the present invention can improve throughput or performance of the receiver.

FIG. 29 illustrates an XML schema regarding a specific service having service type values 14 and 15, and an exemplary display image thereof according to an embodiment of the present invention.

Service Fragment according to the embodiment may be entitled 'MBC', and may have the Service Type values 14 and 15. (L29010).

The ServiceType value of 15 may indicate 'AppBased service'. If the AppBased service type is signaled in the service fragment, the reception apparatus according to the embodiment can recognize that the AppBased Service is contained in the corresponding service. (L29020). Therefore, although the embodiment has obtained only the Service fragment, it may inform the user that the associated App can be executed through the ServiceType in L29030. As shown in FIG. 29, since the service entitled 'MBC' also includes the ServiceType value 14, the effects of the present invention may also be achieved when the corresponding service is Linear Service (value=14), and associated description has already been disclosed above.

FIG. 30 illustrates an XML schema regarding a specific service having service type values 14 and 16, and an exemplary display image thereof according to an embodiment of the present invention.

Referring to FIG. 30, the Service fragment may be entitled 'MBC Companion Screen', and may have the ServiceType values (14, 16). (L30010).

The ServiceType value 16 may indicate a Companion Screen service. If the Companion Screen service type is signaled in the service fragment, the reception apparatus according to the embodiment can recognize that the Companion Screen service is contained in the corresponding service. (L30020). Therefore, although the embodiment has obtained only the Service fragment, it may inform the user of the presence of services supplied from the Companion Screen. (L30030). As shown in FIG. 30, since the MBC Companion Screen service also includes the ServiceType value 14, the effects of the present invention may also be achieved when the corresponding service is Linear Service (value=14), and associated description has already been disclosed above.

FIG. 31 illustrates an XML schema of a Component Fragment according to an embodiment of the present invention.

Referring to FIG. 31, the Component fragment according to one embodiment may describe some parts of content to be referenced by the component, or may describe some parts of the service to be referenced by the component. (The 'Component' fragment describes a component that is a part of a service or a content that the component refers to).

The Component fragment according to the embodiment may include an 'id' attribute, a version attribute, a validFrom attribute, a validTo attribute, a ComponentType element, a ComponentData element, and/or a PrivateExt element.

The 'id' attribute may indicate an ID of the component fragment. This attribute value may be globally unique.

The version attribute may indicate version information of the component fragment.

The validFrom attribute may indicate an initial time at which the component fragment is valid.

The validTo attribute may denote the last time at which the component fragment is valid.

The ComponentType element may indicate the type of content to be described by the component fragment. If several types are mixed, the ComponentType may indicate the type using one or more ComponentType elements.

The ComponentData element may indicate Component Content contained in the component fragment. This element may indicate video, audio or CC (Closed Caption) data.

The PrivateExt element may indicate a container for proprietary or application-specified extension. (The PrivateExt element may serve as a container for proprietary or application specific extensions).

FIG. 32 illustrates an XML schema of a ComponentType element according to an embodiment of the present invention.

Referring to FIG. 32, the component may indicate all ComponentType information capable of being transmitted through hybrid broadcasting. For this purpose, the embodiment of the present invention may indicate the range of type as an integer value.

In accordance with the embodiment, not all the components include data (ComponentData), such that the reception apparatus can first recognize the type value of the component fragment, and then recognize information regarding component data.

The relationship between subordinates and superiors of the components or the subordinate relationship of the respective components will hereinafter be given.

In accordance with the embodiment, the ComponentRangeType indicating the ComponentType element type may be set to zero as a minimum value, and may be set to 13 as a maximum value.

As shown in FIG. 32, if the ComponentType element value is set to zero, this means 'Unspecified'. If the ComponentType element value is set to 1, this means a Continuous component. If the ComponentType element value is set to 2, this means an Elementary component. If the ComponentType element value is set to 3, this means a Composite component. If the ComponentType element value is set to 4, this means a PickOne component. If the ComponentType element value is set to 5, this means a Complex component. If the ComponentType element value is set to 6, this means a Presentable component. If the ComponentType element value is set to 7, this means an NRT File. If the ComponentType element value is set to 8, this means an NRT Content Item. If the ComponentType element value is set to 9, this means an Application. If the ComponentType element value is set to 10, this means 'ATSC3.0 Application'. If the ComponentType element value is set to 11, this means an On Demand component. If the ComponentType element value is set to 12, this means a Notification Stream. If the ComponentType element value is set to 13, this means an AppBased Enhancement. If the ComponentType element value is set to any one of 14 to 25, this means 'Reserved'.

The Continuous component may indicate a content component represented in one continuous stream. For example, the Continuous component may correspond to Audio, Video, or Closed Caption.

The Elementary component may indicate a Continuous component corresponding to single encoding. That is, the Elementary component may indicate a Continuous component encoded by a separate encoder. For example, single encoding of the sound sequence, single encoding of the picture sequence, or the single closed caption track may correspond to the Elementary component.

The Composite component may indicate a content component constructing the set of continuous components which have the same content type, represent the same scene, and can be combined to construct one presentation. For example, the Composite component may be implemented as music, dialogue, and sound effect, which are to be mixed to provide high-quality audio. In addition, a left-eye image and a right-eye image to be combined to construct a three dimensional (3D) image may also correspond to the composite component.

The PickOne component may indicate a content component constructing the set of continuous components capable of being selected to have the same content type, display the same scene, and construct one presentation. For example, the set of audio components encoded by bit rates different from those of the same sound sequence, the set of video components encoded by bit rates different from those of the same picture sequence, or the set of general closed caption tracks and easy reader closed caption tracks for the same dialogue may correspond to the PickOne component.

The Complex component may indicate the Composite component or the PickOne component.

The Presentable component may denote the Continuous component displayed for the user. This component may include the Elementary component or Complex component.

The NRT File may indicate a non-realtime transmission file.

The NRT Content Item may indicate the set of one or more NRT files to be package-consumed by users who will purchase the set of NRT files.

The Application may indicate the set of constituent documents of the complete enhanced or interactive service. The above-mentioned documents may include HTML, JavaScript, CSS, XML, and/or multimedia files. The Application may access other data instead of the part of the application. This Application may correspond to a special case of NRT Content Item.

The ATSC3.0 Application may indicate Application based on ATSC 3.0 Application Runtime Environment Specification.

The On Demand component may indicate a content component transmitted on demand.

The Notification Stream may indicate a stream capable of transmitting a notification message configured to synchronize actions of the application under Linear Time Base.

The AppBased Enhancement may include zero or more Notification Streams to transmit synchronized notification of the actions, one or more applications, zero or more different NRT Content Items used by the application, and zero or more On Demand components managed by the application.

FIG. 33 illustrates an XML schema of a ComponentData element according to an embodiment of the present invention.

Referring to FIG. 33, the embodiment of the present invention may define the ComponentData element as the schema so as to direct or guide characteristics of the actual Component Data.

The ComponentData element according to the embodiment may represent the Component Data according to the combination or relationship between respective types, when the ComponentType element value of the above-mentioned component fragment is set to 2, 3, 4 or 6.

In accordance with the embodiment, each component may have the ContentType attribute. The ContentType attribute may have Video, Audio, and/or CC (Closed Caption) values.

As can be seen from the schema of FIG. 33, the embodiment of the present invention can provide a method for describing the Component Data according to each ContentType attribute. That is, the ComponentData element according to the embodiment may have the VideoComponent element as a lower element, when the ContentType attribute value is denoted by 'Video'. If the ContentType attribute value is denoted by 'Audio', the AudioComponent element may be used as a lower element. If the ContentType attribute value is denoted by CC, the CCComponent element may be used as a lower element. In addition, each Component Data may be described (or written) in the lower element.

FIG. 34 illustrates an XML schema of a VideoComponent element and a VideoRole element according to an embodiment of the present invention.

The embodiment of the present invention can provide a method for describing a Video Component used in hybrid broadcasting.

The VideoComponent element according to the embodiment may include a VideoRole element, a TargetUserProfile element, and/or a TargetDevice element as lower elements. (L34010).

The VideoRole element may indicate the role of the corresponding Video Component. In accordance with the embodiment, the VideoRole element may have an integer value in consideration of future extensibility. In addition, this embodiment can provide the range of the above VideoRole element in such a manner that not only the role achieved when the Video Component is denoted by 'presentable', but also the other role achieved when the Video Component is denoted by 'composite' can be displayed.

The TargetUserProfile element and the TargetDevice element may correspond to the common element of all the presentable components. These elements may indicate attributes of the target.

If the VideoRole element according to the embodiment is denoted by 0, this means 'Unspecified'. If the VideoRole element is denoted by 1, this means 'Primary (default) video'. If the VideoRole element is denoted by 2, this means 'Alternative camera view'. If the VideoRole element is denoted by 3, this means 'Other alternative video component'. If the VideoRole element is denoted by 4, this means 'Sign language (e.g., ASL) inset'. If the VideoRole element is denoted by 5, this means 'Follow subject video'. If the VideoRole element is denoted by 6, this means 'Base layer for scalable video encoding'. If the VideoRole element is denoted by 7, this means 'Enhancement layer for scalable video encoding with level'. If the VideoRole element is denoted by 8, this means '3D video left view'. If the VideoRole element is denoted by 9, this means '3D video right view'. If the VideoRole element is denoted by 10, this means '3D video depth information'. If the VideoRole element is denoted by 11, this means 'Part of video array, <x,y> of <n,m>. If the VideoRole element is denoted by 12, this means 'FollowSubject metadata'. If the VideoRole element is denoted by 13~25, this means 'Reserved'. If the VideoRole element is denoted by 0~5, this means the role of Presentable Video Component. If the VideoRole element is denoted by 6~12, this means the role of Composite Video Component. If the VideoRole element is denoted by 13~255, this means the role of 'Other Video Component'. (L34020)

FIG. 35 illustrates an XML schema of an AudioComponent element and an AudioRole element according to an embodiment of the present invention.

The embodiment of the present invention can provide a method for describing Audio Component used in hybrid broadcasting.

The AudioComponent element according to the embodiment may have the associatedTo attribute and/or the NumberOfAudioChannels attribute. The AudioComponent element may have the AudioRole element, the TargetUserProfile element, and/or the TargetDevice element as lower elements. (L35010)

The associatedTo attribute may indicate whether the corresponding Audio Component is associated with the Presentable Video Component. This attribute may have an id value of the component fragment.

The NumberOfAudioChannels attribute may indicate the number of Audio Component channels.

The AudioRole element may indicate the role of the corresponding Audio Component. In accordance with the embodiment, the AudioRole element may have an integer value in consideration of future extensibility.

The TargetUserProfile and the TargetDevice element may correspond to the common element of all the presentable components. These elements may represent target attributes.

The AudioRole element according to the embodiment may have the values of 0~7. If the AudioRole element is set to zero '0', this means 'Unspecified'. If the AudioRole element is set to 1, this means 'Complete main'. If the AudioRole element is set to 2, this means 'Music'. If the AudioRole element is set to 3, this means 'Dialog'. If the AudioRole element is set to 4, this means 'Effects'. If the AudioRole element is set to 5, this means 'Visually impaired'. If the AudioRole element is set to 6, this means 'Hearing impaired'. If the AudioRole element is set to 7, this means 'Commentary'. If the AudioRole element is set to the values of 8 to 255, this means 'Reserved'. (L35020)

FIG. 36 illustrates an XML schema of a CCComponent element and a CCRole element according to an embodiment of the present invention.

Referring to FIG. 36, the embodiment can provide a method for describing a CC Component used in hybrid broadcasting.

The CCComponent element according to the embodiment may have an associatedTo attribute, a CCRole element, a TargetUserProfile element, and/or a TargetDevice element as lower elements. (L36010)

The associatedTo attribute may indicate whether the corresponding CC Component is associated with the Presentable Video Component. The associatedTo attribute may have an 'id' value of the component fragment.

The associatedTo attribute may indicate the role of the corresponding CC Component. In accordance with the embodiment, the associatedTo attribute may have an integer value in consideration of the future extensibility.

The TargetUserProfile element and the TargetDevice element may correspond to the common element of all the presentable components. The TargetUserProfile and TargetDevice elements may indicate target attributes.

The CCRole element according to the embodiment may have the values of 0 to 2. If the CCRole element is set to zero (0), this means 'unspecified'. If the CCRole element is set to 1, this means 'normal'. If the CCRole element is set to 2, this means the easy reader. (L36020)

Figure 37:
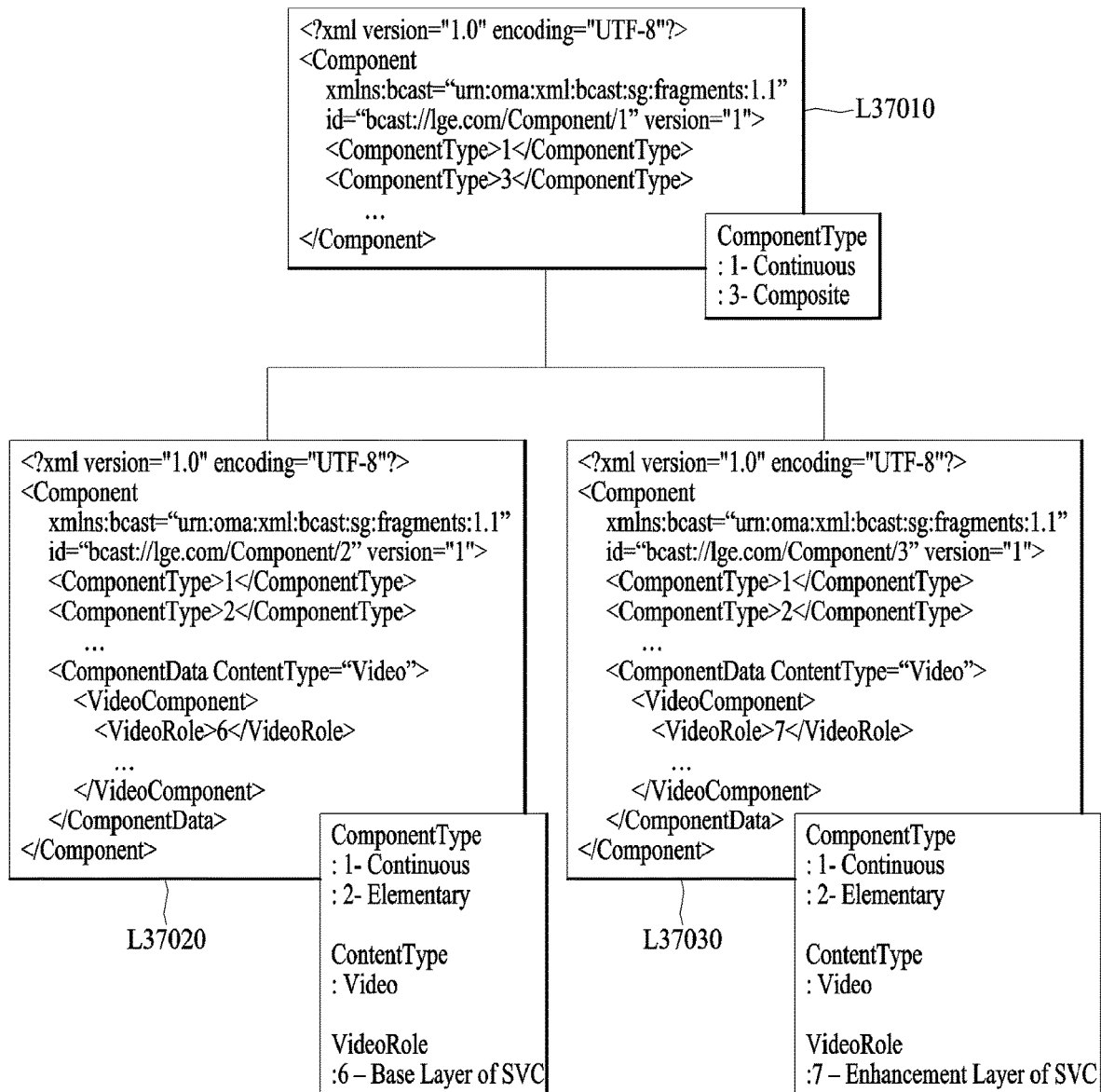
FIG. 37 illustrates an XML schema of component fragments regarding a Composite Video Component including one base layer and two enhancement layers in scalable video coding according to an embodiment of the present invention.

FIG. 37 illustrates an XML schema of component fragments regarding a Composite Video Component including one base layer and two enhancement layers in scalable video coding according to an embodiment of the present invention.

In accordance with this embodiment, the component fragment (L37010) located at the top of FIG. 37 may have the ID value "bcast://lge.com/Component/1", and may indicate that the corresponding component is any of the Continuous and Composite components using the ComponentType element.

The Component fragment (L37020) located to the left of FIG. 37 may have "bcast://lge.com/Component/2" as the ID value, and may indicate that the corresponding component is any of the Continuous and Elementary components using the ComponentType element. In addition, the Component fragment (L37020) may indicate that the corresponding component relates to the Video component using the ComponentData element, the ContentType attribute, the VideoComponent element, and the VideoRole element, and may indicate that the corresponding element is a "Base Layer of SVC" component.

The Component fragment (L37030) located to the right of FIG. 37 may have "bcast://lge.com/Component/3" as the ID value, and may indicate that the corresponding component is any of the Continuous and Elementary components using the ComponentType element. In addition, the Component fragment (L37030) may indicate that the corresponding component relates to the Video component using the ComponentData element, the ContentType attribute, the VideoComponent element, and the VideoRole element, and may indicate that the corresponding element is an "Enhancement Layer of SVC" component.

Figure 38:
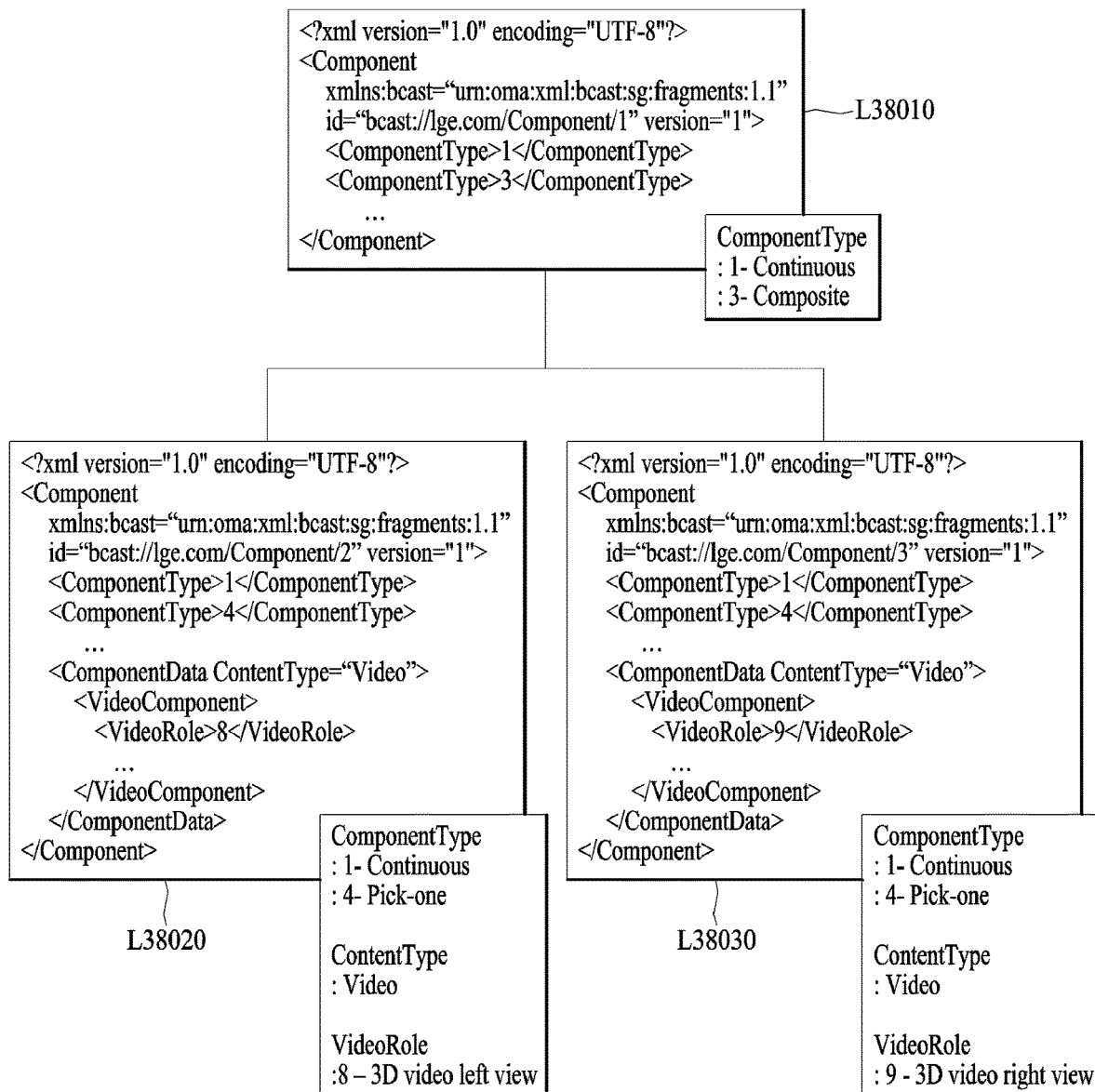
FIG. 38 illustrates an XML schema of component fragments regarding a Composite Component including a 3D video left view and a 3D video right view according to an embodiment of the present invention.

FIG. 38 illustrates an XML schema of component fragments regarding a Composite Component including a 3D video left view and a 3D video right view according to an embodiment of the present invention.

In accordance with the embodiment, the Component fragment (L38010) located to the top of FIG. 38 may have "bcast://lge.com/Component/1" as the ID value, and may indicate that the corresponding component is any of the Continuous and Composite components using the ComponentType element.

The Component fragment (L38020) located to the left of FIG. 38 may have "bcast://lge.com/Component/2" as the ID value, and may indicate that the corresponding component is any of the Continuous and PickOne components using the ComponentType element. In addition, the Component fragment (L38020) may indicate that the corresponding component relates to the Video component using the ComponentData element, the ContentType attribute, the VideoComponent element, and the VideoRole element, and may indicate that the corresponding element is a "3D video left view" component.

The Component fragment (L38030) located to the right of FIG. 38 may have "bcast://lge.com/Component/3" as the ID value, and may indicate that the corresponding component is any of the Continuous and PickOne components using the ComponentType element. In addition, the Component fragment (L38030) may indicate that the corresponding component relates to the Video component using the ComponentData element, the ContentType attribute, the VideoComponent element, and the VideoRole element, and may indicate that the corresponding element is a "3D video right view" component.

FIG. 39 illustrates an XML schema of component fragments configured to describe a Complete Audio Component according to an embodiment of the present invention.

In accordance with the embodiment, the Component fragment (L39010) located at the uppermost part of FIG. 39 may have "bcast://lge.com/Component/1" as the ID value, and may indicate that the corresponding component is any of the Continuous and PickOne components using the ComponentType element.

The Component fragment (L39020) located to the left side of the second column of FIG. 39 may have "bcast://lge.com/Component/2" as the ID value, and may indicate that the corresponding component is any of the Continuous and PickOne components using the ComponentType element. In addition, the Component fragment (L39020) may indicate that the corresponding component relates to the Audio component using the ComponentData element, the ContentType attribute, the AudioComponent element, and the AudioRole element, and may indicate that the corresponding element is a Completely Main component.

The Component fragment (L39030) located to the right part of the second column of FIG. 39 may have "bcast://lge.com/Component/3" as the ID value, and may indicate that the corresponding component is any of the Continuous and Composite components using the ComponentType element.

The Component fragment (L39040) located to the left side of the third column of FIG. 39 may have "bcast:// lge.com/Component/4" as the ID value, and may indicate that the corresponding component is any of the Continuous and PickOne components using the ComponentType element. In addition, the Component fragment (L39040) may indicate that the corresponding component relates to the Audio component using the ComponentData element, the ContentType attribute, the AudioComponent element, and the AudioRole element, and may indicate that the corresponding element is a Music component.

The Component fragment (L39050) located to the right side of the third column of FIG. 39 may have "bcast://lge.com/Component/5" as the ID value, and may indicate that the corresponding component is any of the Continuous and PickOne components using the ComponentType element. In addition, the Component fragment (L39050) may indicate that the corresponding component relates to the Audio component using the ComponentData element, the ContentType attribute, the AudioComponent element, and the AudioRole element, and may indicate that the corresponding element is a Dialogue component.

FIG. 40 illustrates an XML schema of a component element contained in a content fragment according to an embodiment of the present invention.

Referring to FIG. 40, the component contained in the content may be constructed as the sub-element. The Component element may be contained in the Content fragment. In this case, the sub-element may have the same meaning as the lower element.

The Component element according to one embodiment may indicate component information contained in the content.

The Component element type according to one embodiment may be denoted by ComponentElementType. The ComponentElementType may define component information contained in the content in the form of a sequence. Therefore, all types of components contained in the content may be written in the ComponentElementType.

The Component element according to one embodiment may have a VideoData element, an AudioData element, and/or a CCData element as the sub-elements. In addition, the VideoData element may have a VideoRole element, a TargetUserProfile element, and/or a TargetDevice element as the sub-elements. The AudioData element may have an AudioRole element, a TargetUserProfile element, and/or a TargetDevice element as the sub-elements. The CCData element may have a CCRole element, a TargetUserProfile element, and/or a TargetDevice element as the sub-elements. Detailed description of the above-mentioned elements has already been disclosed above.

FIG. 41 illustrates an XML schema of a content fragment regarding a Linear Service including Video, Audio, and CC Components according to an embodiment of the present invention.

Referring to FIG. 41, assuming that the Component element is constructed in the content fragment according to one embodiment, the Reference rules between the plurality of Components need not be used, resulting in increased efficiency. Therefore, assuming that the receiver according to one embodiment receives the content fragment, it can be recognized which component is used as the constituent element of the corresponding content, and it may be possible to intuitively recognize the role of the recognized component.

In accordance with the embodiment, the Component element may be defined in the PrivateExt element contained in the Content fragment.

Referring to the left side of FIG. 41 and the schema thereof, the 2D tennis broadcast content may include Video, Audio and CC components. The Video component may indicate a Primary (default) video. The Audio component may indicate a Complete main. The CC component may indicate a normal.

Referring to the right side of FIG. 41 and the schema thereof, the 3D tennis broadcast content may include 2 Video components, the Audio component, and a CC component. The first Video component of the 3D tennis broadcast content may indicate a 3D video left view. The second Video component may indicate a 3D video right view. The Audio component may indicate a Complete main. The CC component may indicate a normal.

FIG. 42 illustrates an XML schema of a component element when the component element is defined in the content fragment so as to describe the association relationship among Video, Audio, and CC components.

In accordance with the embodiment, it may be necessary to define the association relationship between constituent components of the single content.

In accordance with the embodiment, assuming that the Component element is constructed in the Content fragment, all the components (i.e., Video, Audio and/or CC components) contained in the corresponding content are described in the Content fragment, such that the association relationship between the components need not be independently described.

FIG. 43 is a conceptual diagram illustrating an exemplary case in which AssociatedTo attributes are used to describe the association relationship among Video, Audio, and CC components.

In accordance with one embodiment of the present invention, the associatedTo attribute may be described as the Audio and CC component attributes so as to describe the association relationship between Presentable Video, Audio and CC Components. As a result, if the receiver according to one embodiment receives the Audio component, the receiver may recognize the Video component associated with the received Audio component. Likewise, if the receiver receives the CC component, the receiver may recognize the Video component associated with the received CC component.

Referring to FIG. 43, the embodiment of the present invention may define the associatedTo attribute as the attribute of the AudioComponent element located below the ComponentData element, and may define the associatedTo attribute as the attribute of the CCComponent element.

FIG. 44 is a conceptual diagram illustrating an exemplary case in which associatedAudio and associatedCC attributes are used to describe the association relationship among Video, Audio, and CC components.

In order to define the association relationship between Presentable Video, Audio and CC Components, the associatedAudio and associatedCC attributes may be described (or written) as the Video component. As a result, if the receiver according to one embodiment receives the Video component, the receiver may recognize all the Audio and/or CC components associated with the received Video component.

Referring to FIG. 44, the embodiment of the present invention may define the associatedAudio and/or associatedCC attributes as the attribute of the VideoComponent element located below the ComponentData element, and may define the associatedAudio and/or associatedCC attributes as the attribute of the VideoComponent element.

FIG. 45 is a conceptual diagram illustrating the association relationship among Video, Audio, and CC components using AssociatedTo attributes.

Referring to FIG. 45, the associatedTo attribute is defined in the AudioComponent element in the Component fragment describing the Presentable Audio Component, and refers to "bcast://lge.com/Component/1", such that the Component fragment describing the Presentable Video Component associated with the corresponding Presentable Audio Component may be signaled.

In accordance with the embodiment, the associatedTo attribute is defined in the CCComponent element in the Component fragment describing the Presentable CC Component, and refers to "bcast://lge.com/Component/1", such that the Component fragment describing the Presentable Video Component associated with the corresponding Presentable CC Component may be signaled.

Figure 46:
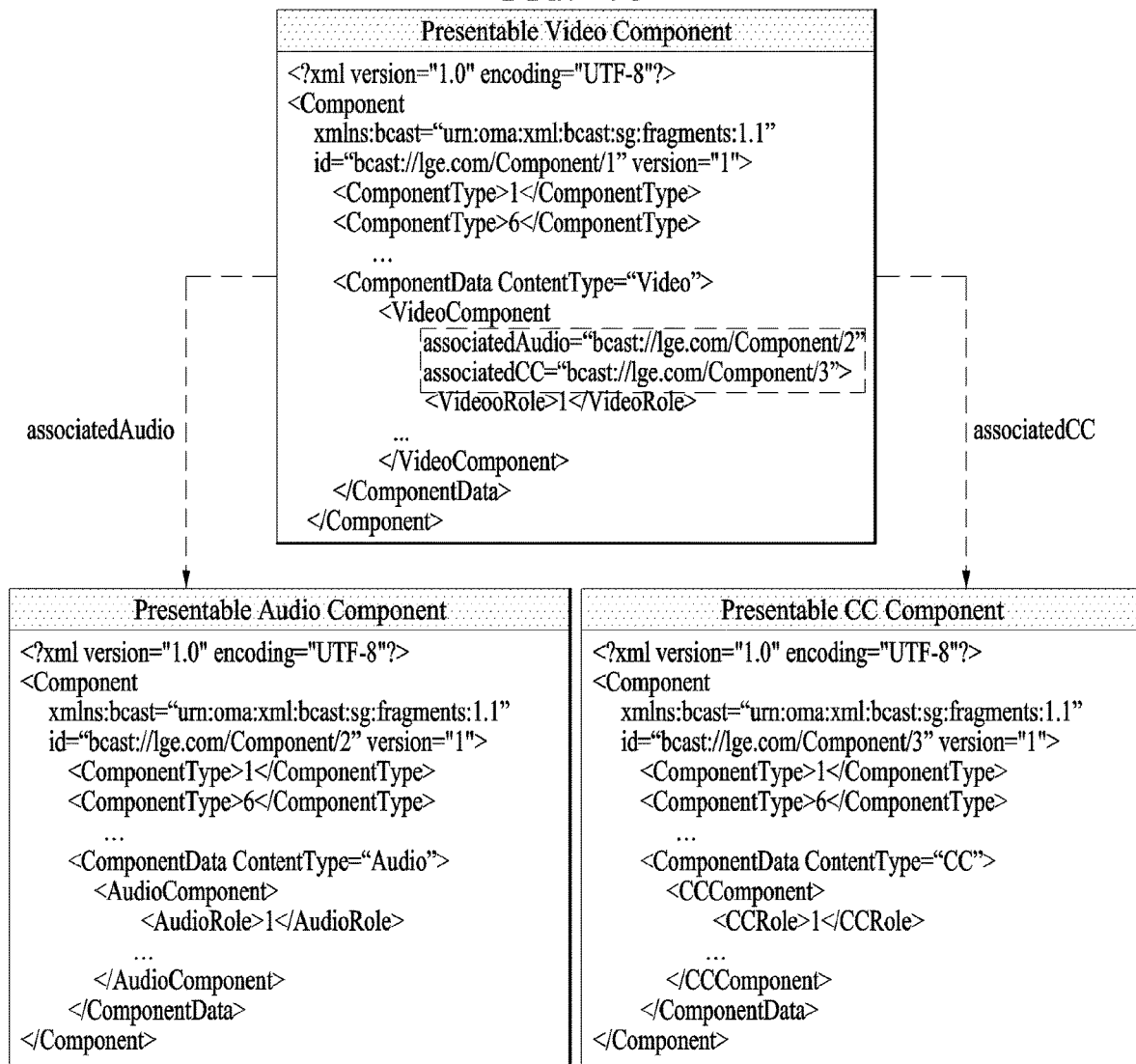
FIG. 46 is a conceptual diagram illustrating the association relationship among Video, Audio, and CC components using associatedAudio and/or associatedCC attributes.

FIG. 46 is a conceptual diagram illustrating the association relationship among Video, Audio, and CC components using associatedAudio and/or associatedCC attributes.

In accordance with the embodiment, the associatedAudio attribute and the associatedCC attribute are defined in the VideoComponent element in the Component fragment describing the Presentable Video Component, and respectively refers to "bcast://lge.com/Component/2" and "bcast://lge.com/Component/3", such that the Component fragments describing not only the Presentable Audio component associated with the corresponding Presentable Video Component but also the Presentable CC Component may be signaled.

FIG. 47 is a conceptual diagram illustrating the reference relationship between fragments according to an embodiment of the present invention.

In accordance with one embodiment, the method for defining Service, Content, and Component fragments to provide the service guide of the next-generation broadcast system has been disclosed.

The relationship between the above-mentioned fragments is defined, such that the embodiment of the present invention can provide a method for performing announcement of the service guide for use in the next generation hybrid broadcast system.

In accordance with the embodiment, the Component fragment may refer to the Service fragment and/or the Content fragment.

Referring to FIG. 47, the Component fragment may refer to the Service fragment and the Content fragment. The Component fragment may refer to the Service fragment. The Schedule fragment may refer to the Service, Content, and Component fragments.

FIG. 48 illustrates an XML schema of a Component fragment including an element indicating the reference relationship between fragments according to an embodiment of the present invention.

Referring to FIG. 48, the Component fragment may refer to the ServiceReference element, the ContentReference element, and/or the ComponentReference element. Each of the above-mentioned elements may have the idRef attribute indicating each ID.

The ServiceReference element may represent the Service fragment in the corresponding Component fragment, and may have the ID value of the referenced Service fragment.

The ContentReference element may represent the Content fragment referenced by the corresponding Component fragment, and may have an ID value of the referenced Content fragment.

The ComponentReference element may represent a higher Component fragment referenced by the corresponding Component fragment, and may have an ID value of the referenced higher Component fragment. In this case, the cross-reference relationship between the Component fragments or the relationship between subordinates and superiors between the Component fragments may be established according to classification of type values denoted by the above-mentioned ComponentType elements.

FIG. 49 illustrates an XML schema of a Schedule fragment including an element indicating the reference relationship between fragments according to an embodiment of the present invention.

Referring to FIG. 49, the Schedule fragment according to one embodiment may include the ServiceReference element, the ContentReference element, and/or the ComponentReference element. Each of the above-mentioned elements may have the idRef attribute indicating each ID.

The ServiceReference element may represent the referenced Service fragment, and may have an ID value of the referenced Service fragment. As a result, the Schedule fragment may provide time information of the corresponding service.

The ContentReference element may indicate the referenced Content fragment, and may have the ID value of the referenced Content fragment. As a result, the Schedule fragment may provide time information of the corresponding Content.

The ComponentReference element may indicate the referenced Component fragment, and may have the ID value of the referenced Component fragment. As a result, the Schedule fragment may provide time information of the corresponding Component.

Figure 50:
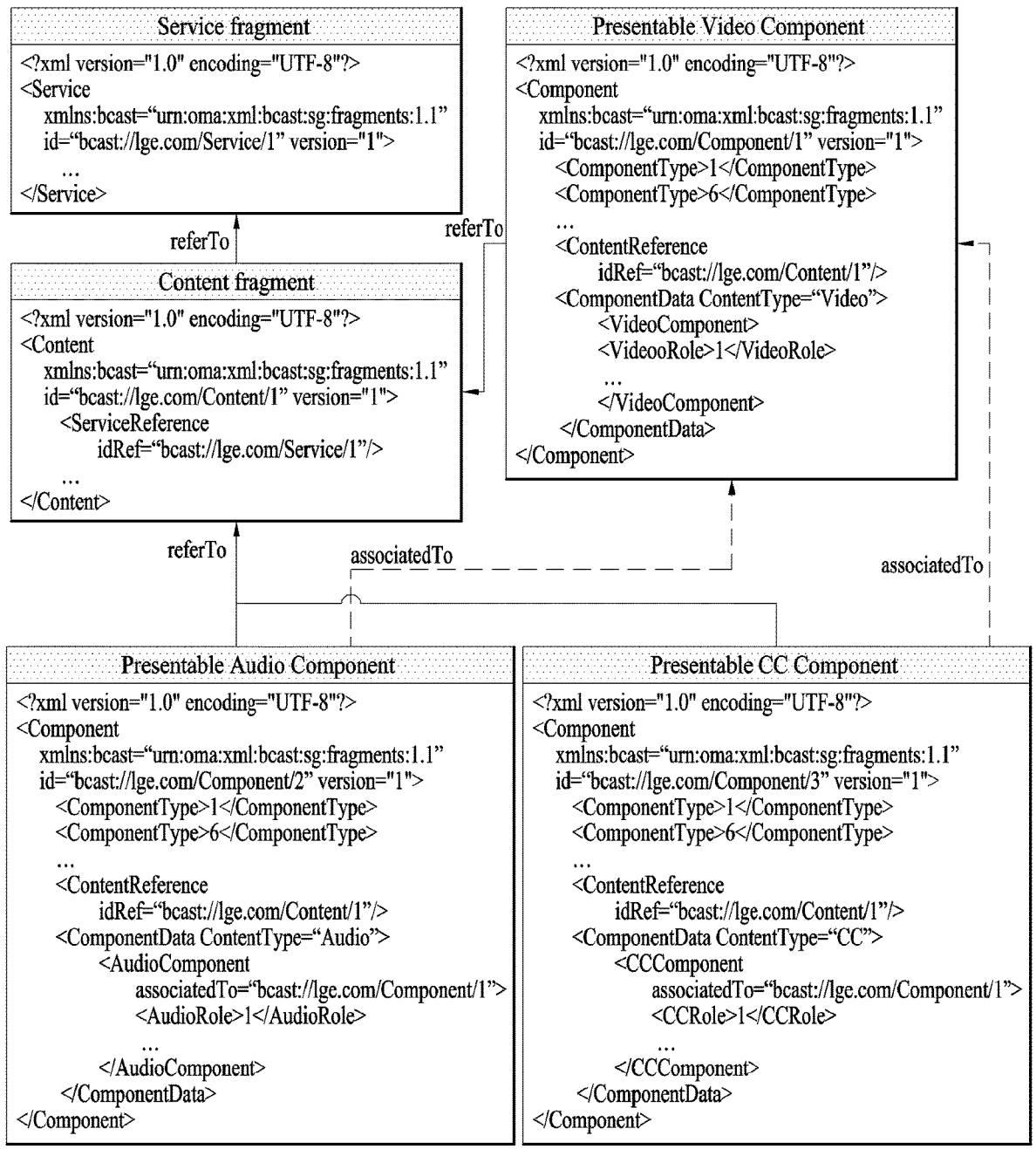
FIG. 50 illustrates the reference relationship among Service, Content, and Component fragments according to an embodiment of the present invention.

FIG. 50 illustrates the reference relationship among Service, Content, and Component fragments according to an embodiment of the present invention.

Referring to FIG. 50, the Component fragment describing the Presentable Audio Component and the Component fragment describing the Presentable CC Component may refer to the other Component fragment describing the Presentable Video Component using the associatedTo attribute.

In addition, the Component fragment describing the Presentable Audio Component, the Component fragment describing the Presentable CC Component, and the Component fragment describing the Presentable Video Component may refer to the Content fragment using the ContentReference element. Here, the Content fragment may have the ID value denoted by "bcast://lge.com/Content/1".

The Content fragment in which the ID value is denoted by "bcast://lge.com/Content/1" may refer to the Service fragment in which the ID value is denoted by "bcast://lge.com/Service/1", using the ServiceReference element.

As described above, the embodiment of the present invention defines the cross-reference relationship between the fragments, and can construct the service guide model capable of being provided from the hybrid broadcast system.

Figure 51:
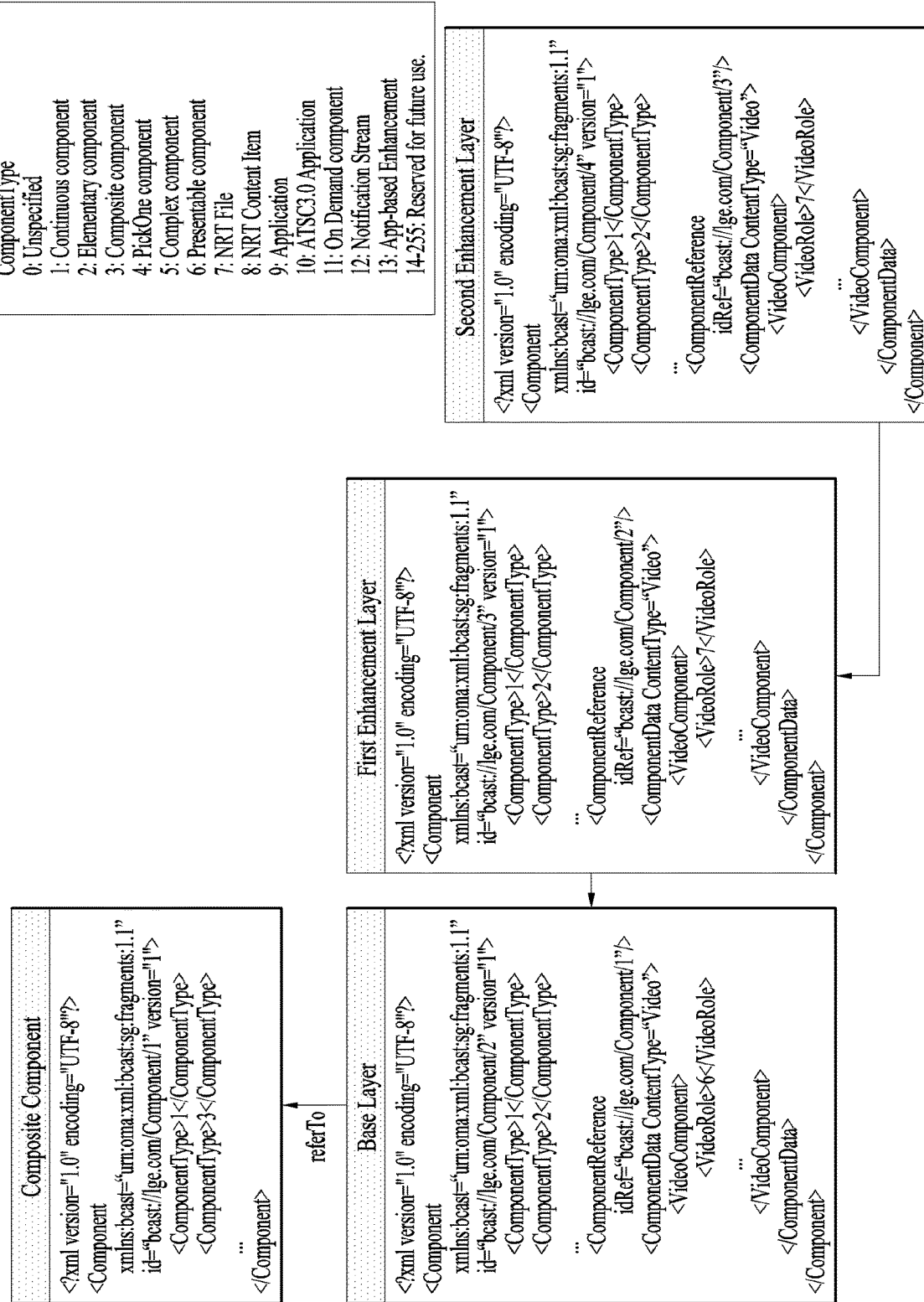
FIG. 51 illustrates the reference relationship among Component fragments configured to describe a Continuous Component according to an embodiment of the present invention.

FIG. 51 illustrates the reference relationship among Component fragments configured to describe a Continuous Component according to an embodiment of the present invention.

The embodiment of the present invention defines the cross-reference relationship between the component fragments, and can describe the cross-reference relationship between the Continuous Components capable of being provided from the hybrid broadcast system.

In accordance with the embodiment of the present invention, the Continuous Component may correspond to any of various components having the ComponentType values of 1~6 (i.e., the Continuous component, the Elementary component, the Composite component, the PickOne component, the Complex component, and/or the Presentable component). As can be seen from FIG. 51, the cross-reference relationship between the above-mentioned Continuous Components can be represented.

In accordance with one embodiment of the present invention, the Component fragment (id="bcast://lge.com/Component/4") describing the Second Enhancement Layer may include "bcast://lge.com/Component/3" in the ComponentReference element, such that the Component fragment (id="bcast://lge.com/Component/4") may refer to the Component fragment (id="bcast://lge.com/Component/3") describing the First Enhancement Layer.

As described above, since the Component fragment (id="bcast://lge.com/Component/3") describing the First Enhancement Layer includes "bcast://lge.com/Component/2" in the ComponentReference element, the Component fragment (id="bcast://lge.com/Component/3") may refer to the component fragment (id="bcast://lge.com/Component/2") describing the Base layer.

In this way, the Component fragment (id="bcast://lge.com/Component/2") describing the Base Layer includes ("bcast://lge.com/Component/1") in the ComponentReference element, such that the Component fragment (id="bcast://lge.com/Component/2") may refer to the Component fragment (id="bcast://lge.com/Component/1") describing the Composite Component.

Figure 52:
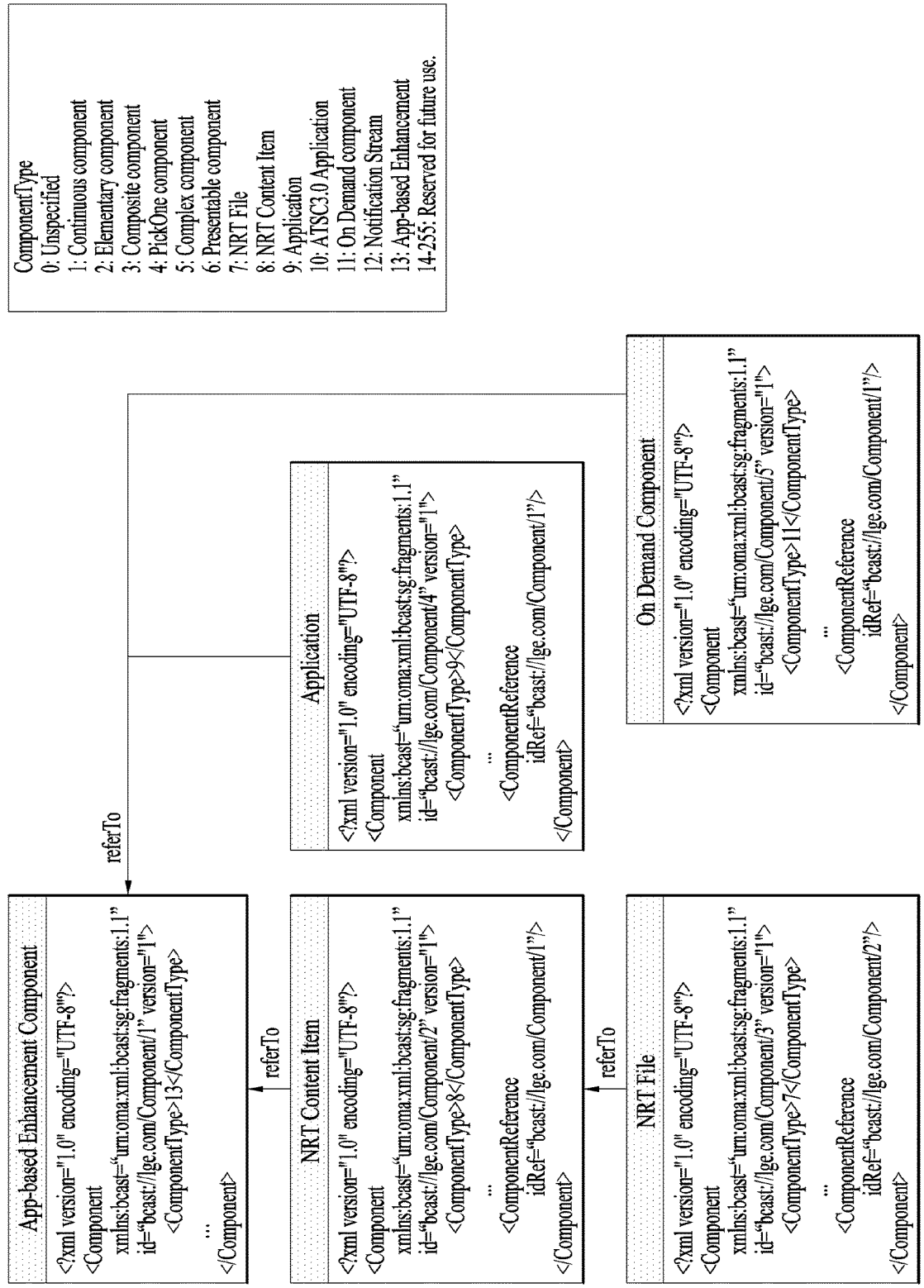
FIG. 52 illustrates the reference relationship between Component fragments configured to describe a component associated with AppBased Enhancement according to an embodiment of the present invention.

FIG. 52 illustrates the reference relationship between Component fragments configured to describe a component associated with AppBased Enhancement according to an embodiment of the present invention.

The embodiment of the present invention defines the cross-reference relationship between the component fragments, such that it can describe the cross-reference relationship between the AppBased Enhancement associated components capable of being received from the hybrid broadcast system.

In accordance with the embodiment, the components corresponding to the ComponentType values of 7~13, i.e., NRT File, NRT Content Item, Application, ATSC3.0 Application, On Demand component, Notification Stream and/or AppBased Enhancement, may correspond to the AppBased Enhancement associated Components. As can be seen from FIG. 52, the cross-reference relationship between the above-mentioned AppBased Enhancement associated components can be described.

In accordance with the embodiment, the component fragment (id="bcast://lge.com/Component/3") describing the NRT File may include "bcast://lge.com/Component/2" in the ComponentReference element, such that the component fragment (id="bcast://lge.com/Component/3") may refer to the component fragment (id="bcast://lge.com/Component/2") describing the NRT Content Item.

The component fragment (id="bcast://lge.com/Component/2") describing the NRT Content Item includes "bcast://lge.com/Component/1" in the ComponentReference element, such that the component fragment (id="bcast://lge.com/Component/2") may refer to the component fragment (id="bcast://lge.com/Component/1") describing the AppBased Enhancement.

The component fragment (id="bcast://lge.com/Component/5") describing the On Demand component includes "bcast://lge.com/Component/1" in the ComponentReference element, such that the component fragment (id="bcast://lge.com/Component/5") may refer to the component fragment (id="bcast://lge.com/Component/1") describing the AppBased Enhancement.

The component fragment (id="bcast://lge.com/Component/4") describing the Application includes "bcast://lge.com/Component/1" in the ComponentReference element, such that the component fragment (id="bcast://lge.com/Component/4") may refer to the component fragment (id="bcast://lge.com/Component/1") describing the AppBased Enhancement.

FIG. 53 illustrates functions to be used when a content fragment refers to the associated service fragment according to an embodiment of the present invention.

When describing the Service fragment to be referenced by the Content fragment, the embodiment of the present invention can provide a service guide method for describing detailed functions supported in the hybrid broadcast network.

The Content fragment according to the embodiment may have the ServiceReference element. The ServiceReference element may include the idRef attribute, the weigh attribute, and/or the relationship attribute.

The idRef attribute may indicate the ID of the reference Service fragment.

The weigh attribute may indicate importance or significance of the Service fragment to be referred.

When the relationship attribute refers to the Service fragment, the relationship may indicate the relationship between the Content fragment and the Service fragment. Further, this attribute value may be represented by an integer value for future extensibility. If this attribute value is set to zero '0', this means 'unspecified'. If this attribute value is set to 1, this means 'ProgramOf'. If this attribute value is set to 2, this means 'ContentItemOf'. If this attribute value is set to 3, this means 'OnDemandComponentOf'. If this attribute value is set to any of the values of 4~255, this means 'reserved'. ProgramOf may indicate that the corresponding content corresponds to the referenced service program. ContentItemOf may indicate that the corresponding content corresponds to ContentItem of the referenced service. OnDemandComponentOf may indicate that the corresponding content corresponds to OnDemandComponent of the referenced service.

Figure 54:
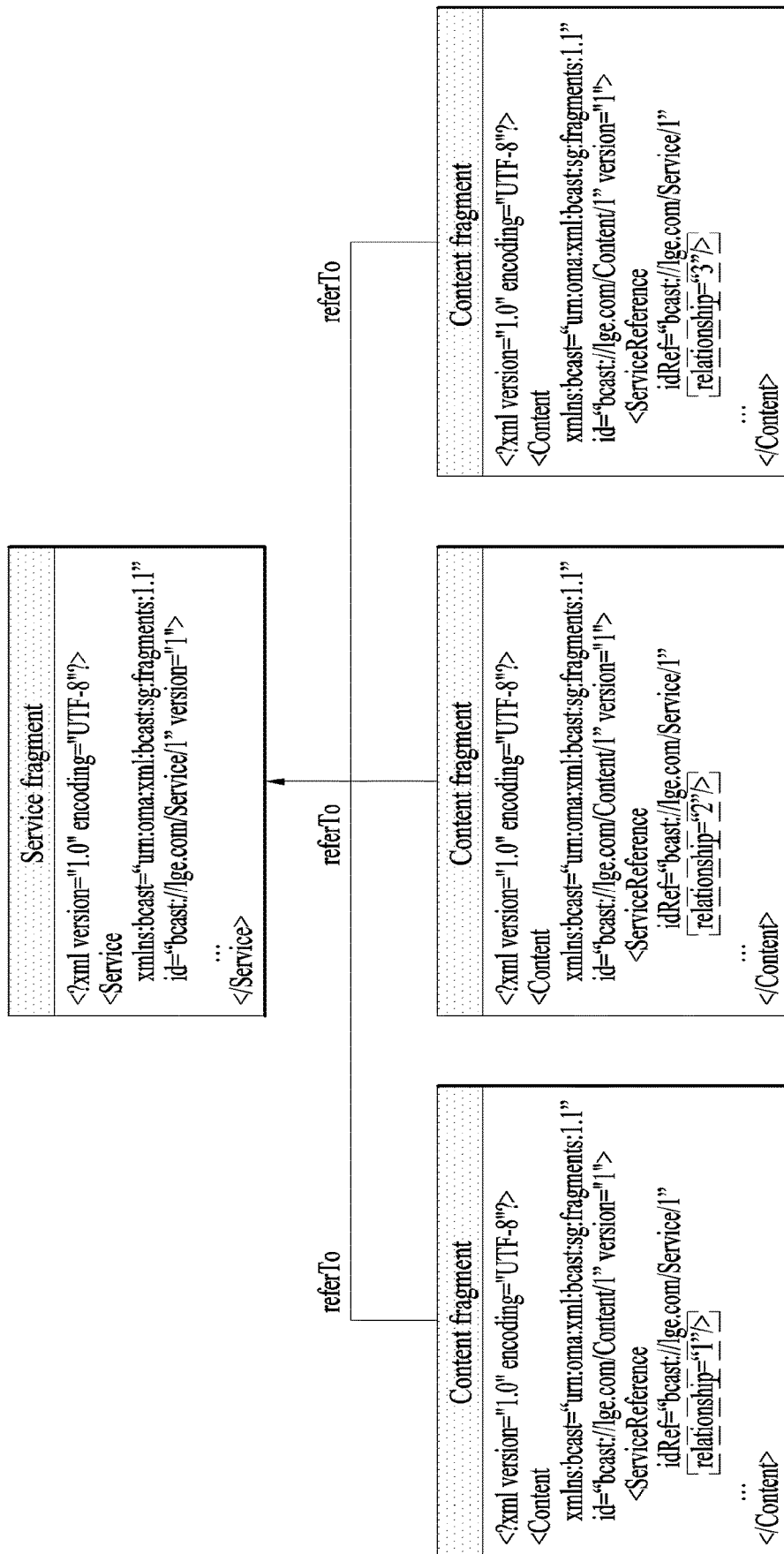
FIG. 54 is a conceptual diagram illustrating an exemplary case in which the content fragment refers to the associated service fragment using the relationship attributes according to an embodiment of the present invention.

FIG. 54 is a conceptual diagram illustrating an exemplary case in which the content fragment refers to the associated service fragment using the relationship attributes according to an embodiment of the present invention.

When the receiver according to one embodiment of the present invention refers to the Service fragment using the relationship attribute, it may be possible to recognize the relationship between both fragments. Therefore, although the embodiment does not analyze the scope extending to the component level using the relationship attribute, the embodiment may recognize which attribute is assigned to the content belonging to the corresponding service, and then inform the user of the recognized attribute information using the service guide.

Referring to FIG. 54, a total of 3 Content fragments may refer to the Service fragment having the ID value denoted by "bcast://lge.com/Service/1" using the ServiceReference element. The left content fragment may have the value of 1 as the relationship attribute value, such that this means the Program of the referenced service fragment. The intermediate content fragment has the value of 2 as the relationship attribute value, such that ContentItem of the referenced service fragment can be indicated. The right content fragment has the relationship attribute value of 3, such that OnDemandComponent of the referenced service fragment can be indicated.

Figure 55:
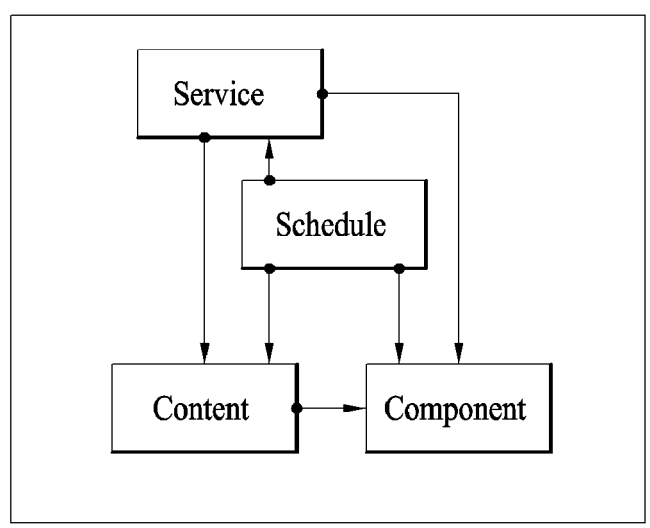
FIG. 55 is a conceptual diagram illustrating the reference relationship between fragments according to another embodiment of the present invention.

FIG. 55 is a conceptual diagram illustrating the reference relationship between fragments according to another embodiment of the present invention.

In accordance with one embodiment, the method for defining Service, Content, and Component fragments to provide the service guide of the next-generation broadcast system has been disclosed.

The relationship between the above-mentioned fragments is defined, such that the embodiment of the present invention can provide a method for performing announcement of the service guide for use in the next generation hybrid broadcast system.

In accordance with the embodiment, the Service fragment may refer to the Content fragment and/or the Component fragment.

Referring to FIG. 55, the Service t fragment may refer to the Content fragment and the Component fragment. The Content fragment may refer to the Component fragment. The Schedule fragment may refer to the Service, Content, and Component fragments.

The embodiment may reduce the amount of resources needed to search not only for the constituent content of a specific service but also for the component element.

FIG. 56 is a conceptual diagram illustrating a service fragment including not only elements indicating the reference relationship between fragments, but also a content fragment and an XML schema of the component fragment according to another embodiment of the present invention.

Referring to FIG. 56, the cross-reference relationship may be achieved between the respective fragments of the service guide according to the embodiment.

The service fragment according to one embodiment may include the ContentReference element and/or the ComponentReference element. Each of the above-mentioned elements may have the idRef attribute indicating each ID. (L56010)

The ContentReference element may represent the Content fragment in the corresponding Component fragment, and may have the ID value of the referenced Content fragment.

The ContentReference element may represent the Component fragment referenced by the corresponding Service fragment, and may have an ID value of the referenced Component fragment.

The Content fragment according to the embodiment may include the ComponentReference element. The ComponentReference element may have the idRef attribute indicating the ID of this element. (L56020)

The ComponentReference element may represent the Component fragment referenced by the corresponding content fragment, and may have the ID value of the referenced component fragment.

The Component fragment according to the embodiment may include the ComponentReference element. This Component fragment may have the idRef attribute indicating the ID of this element. (L56030)

The ComponentReference element may represent a lower Component fragment referenced by the corresponding Component fragment, and may have an ID value of the referenced lower Component fragment. In this case, the cross-reference relationship between the Component fragments or the relationship between subordinates and superiors between the Component fragments may be established according to classification of type values denoted by the above-mentioned ComponentType elements.

The Schedule fragment according to one embodiment may include the ServiceReference element, the ContentReference element, and/or the ComponentReference element.

Each of the above-mentioned elements may have the idRef attribute indicating each ID. (not shown)

The ServiceReference element may represent the referenced Service fragment, and may have an ID value of the referenced Service fragment. As a result, the Schedule fragment may provide time information of the corresponding service.

ContentReference element may indicate the referenced Content fragment, and may have the ID value of the referenced Content fragment. As a result, the Schedule fragment may provide time information of the corresponding Content.

The ComponentReference element may indicate the referenced Component fragment, and may have the ID value of the referenced Component fragment. As a result, the Schedule fragment may provide time information of the corresponding Component.

Figure 57:
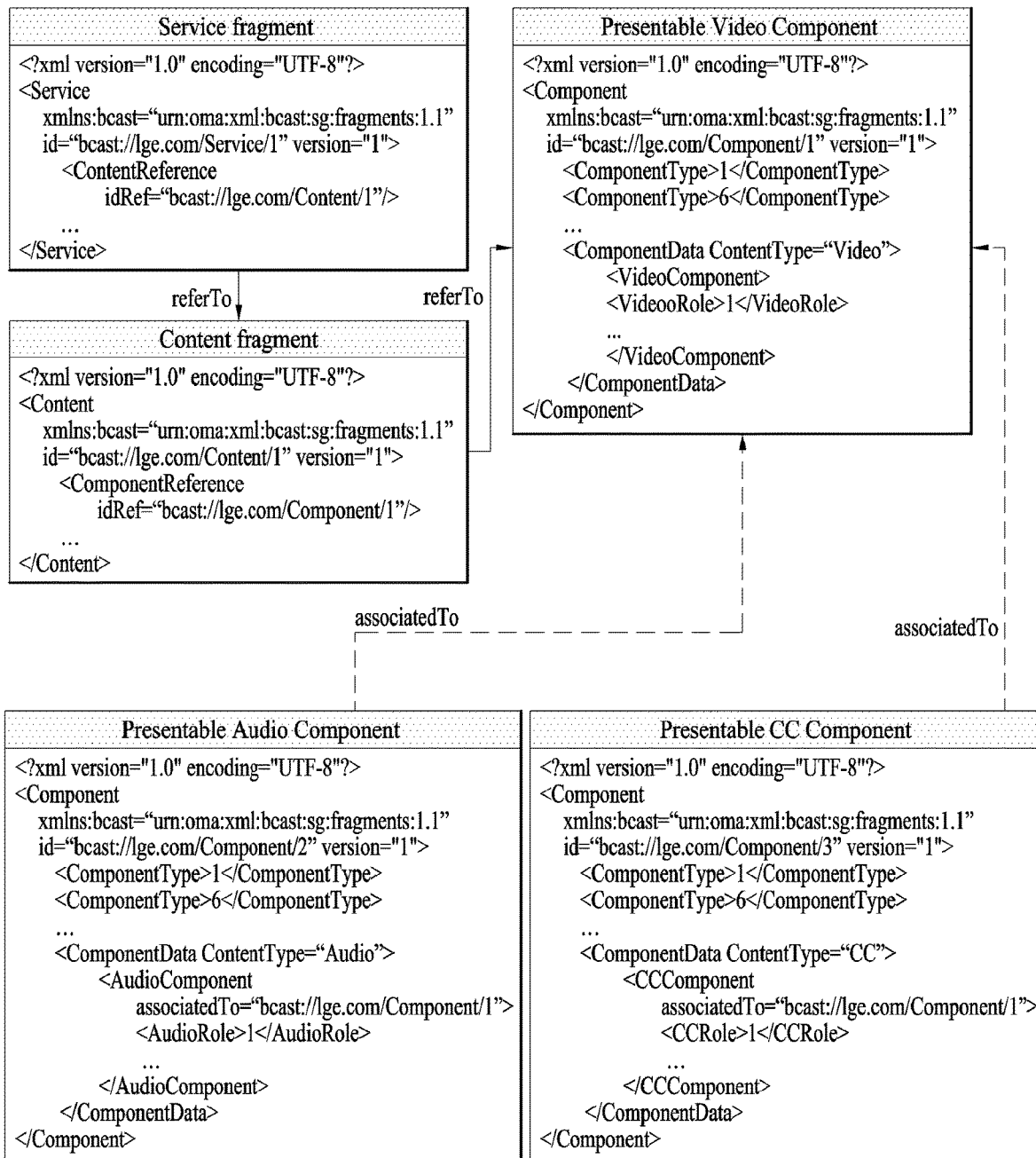
FIG. 57 is a conceptual diagram illustrating the reference relationship between Service, Content and Component fragments according to another embodiment of the present invention.

FIG. 57 is a conceptual diagram illustrating the reference relationship between Service, Content and Component fragments according to another embodiment of the present invention.

Referring to FIG. 57, the Component fragment describing the Presentable Audio Component and the Component fragment describing the Presentable CC Component may refer to the other component describing the Presentable Video Component using the associatedTo attribute.

The Service fragment in which the ID value is denoted by "bcast://lge.com/Service/1" may refer to the Content fragment in which the ID value is denoted by "bcast://lge.com/Content/1", using the ContentReference element.

The Service fragment in which the ID value is denoted by "bcast://lge.com/Content/1" may refer to the Content fragment in which the ID value is denoted by "bcast://lge.com/Component/1", using the ComponentReference element.

As described above, the embodiment of the present invention defines the cross-reference relationship between the fragments, and can construct the service guide model capable of being provided from the hybrid broadcast system.

The embodiment of the present invention uses the reference direction ranging from the higher layer to the lower level in the same manner as in the above-mentioned method in which the Service fragment refers to the content fragment and the Content fragment refers to the component fragment, such that the embodiment shown in FIG. 57 can greatly reduce the amount of resources to be consumed.

Figure 58:
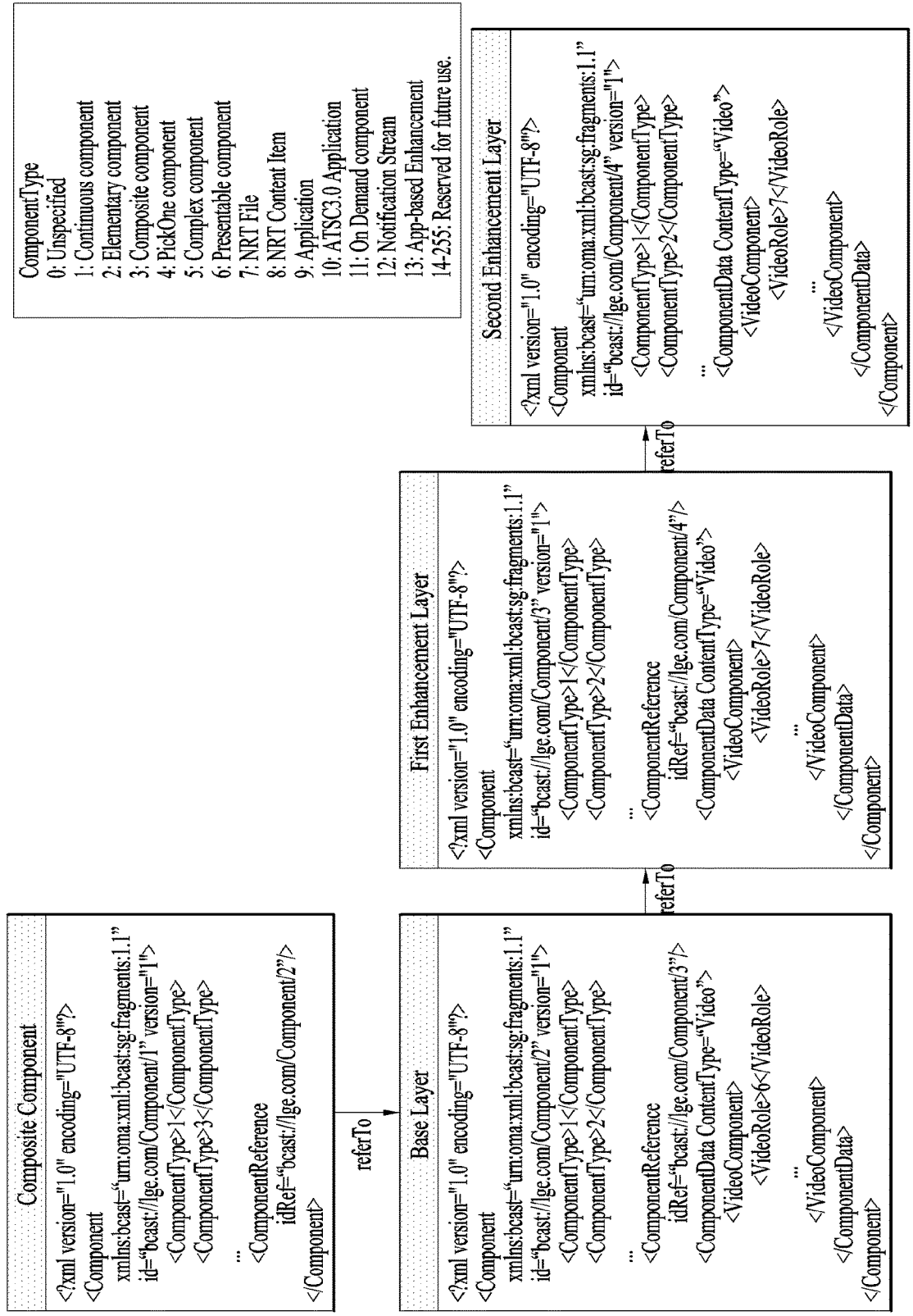
FIG. 58 is a conceptual diagram illustrating the reference relationship between Component fragments describing a Continuous Component according to another embodiment of the present invention.

FIG. 58 is a conceptual diagram illustrating the reference relationship between Component fragments describing a Continuous Component according to another embodiment of the present invention.

The embodiment of the present invention defines the cross-reference relationship between the component fragments, and can describe the cross-reference relationship between the Continuous Components capable of being provided from the hybrid broadcast system.

In accordance with the embodiment of the present invention, the Continuous Component may correspond to any of various components having the ComponentType values of 1~6 (i.e., the Continuous component, the Elementary component, the Composite component, the PickOne component, the Complex component, and/or the Presentable component). As can be seen from FIG. 58, the cross-reference relationship between the above-mentioned Continuous Components can be represented.

In accordance with one embodiment of the present invention, the Component fragment (id="bcast://lge.com/Component/1") describing the Composite Component may include "bcast://lge.com/Component/2" in the ComponentReference element, such that the Component fragment (id="bcast://lge.com/Component/1") may refer to the Component fragment (id="bcast://lge.com/Component/2") describing the Base Layer.

As described above, since the Component fragment (id="bcast://lge.com/Component/2") describing the Base Layer includes "bcast://lge.com/Component/2" in the ComponentReference element, the Component fragment (id="bcast://lge.com/Component/2") may refer to the component fragment (id="bcast://lge.com/Component/3") describing the First Enhancement layer.

Likewise, the Component fragment (id="bcast://lge.com/Component/3") describing the First Enhancement Layer includes ("bcast://lge.com/Component/4") in the ComponentReference element, such that the Component fragment (id="bcast://lge.com/Component/3") may refer to the Component fragment (id="bcast://lge.com/Component/4") describing the Second Enhancement Layer.

Figure 59:
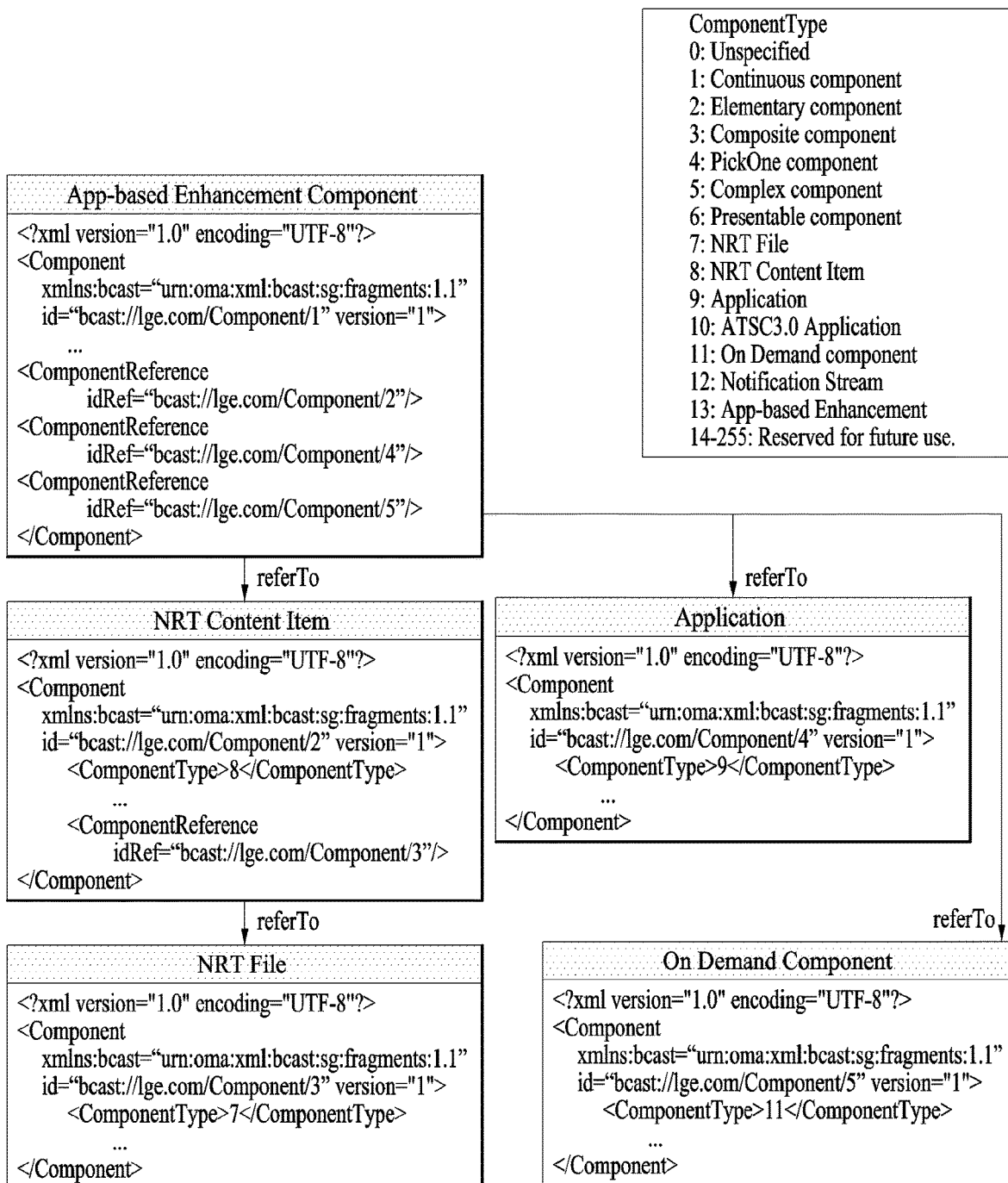
FIG. 59 is a conceptual diagram illustrating the reference relationship between Component fragments describing a component associated with AppBased Enhancement according to another embodiment of the present invention.

FIG. 59 is a conceptual diagram illustrating the reference relationship between Component fragments describing a component associated with AppBased Enhancement according to another embodiment of the present invention.

The embodiment of the present invention defines the cross-reference relationship between the component fragments, such that it can describe the cross-reference relationship between the AppBased Enhancement associated components capable of being received from the hybrid broadcast system.

In accordance with the embodiment, the components corresponding to the ComponentType values of 7~13, i.e., NRT File, NRT Content Item, Application, ATSC3.0 Application, On Demand component, Notification Stream and/or AppBased Enhancement, may correspond to the AppBased Enhancement associated Components. As can be seen from FIG. 59, the cross-reference relationship between the above-mentioned AppBased Enhancement associated components can be described.

In accordance with the embodiment, the Component fragment (id="bcast://lge.com/Component/1") describing the AppBased Enhancement may include "bcast://lge.com/Component/2", "bcast://lge.com/Component/4", and "bcast://lge.com/Component/5" in the ComponentReference element, such that the Component fragment (id="bcast://lge.com/Component/1") may refer to the component fragment (id="bcast://lge.com/Component/2") describing the NRT Content Item, the component fragment (id="bcast://lge.com/Component/4") describing the Application, and the component fragment (id="bcast://lge.com/Component/5") describing the OnDemand component.

The component fragment (id="bcast://lge.com/Component/2") describing the NRT Content Item includes "bcast://lge.com/Component/3" in the ComponentReference element, such that the component fragment (id="bcast://lge.com/Component/2") may refer to the component fragment (id="bcast://lge.com/Component/3") describing the NRT File.

FIGS. 60 and 61 illustrate the Component fragments according to an embodiment of the present invention.

It should be noted that Table of FIG. 60 and Table of FIG. 61 are grouped into one table such that two tables shown in FIGS. 60 and 61 may correspond to one table.

The component fragment according to the embodiment may include an id attribute, a version attribute, a validFrom attribute, a validTo attribute, a ServiceReference element, a ContentReference element, ComponentReference element, a ComponentType element, a ComponentRole element, a PrivateExt element, and/or a ProprietaryElements element. Each of the ServiceReference element, the ContentReference element, and the ComponentReference element may include the idRef attribute. The above-mentioned id attribute and/or the idRef attribute may include the URI format, and the above-mentioned attribute and/or elements will hereinafter be described.

FIG. 62 illustrates an XML schema of a Component fragment according to another embodiment of the present invention.

Referring to FIG. 62, the Component fragment according to one embodiment may describe some parts of content to be referenced by the component, or may describe some parts of the service to be referenced by the component. (The 'Component' fragment describes a component that is a part of a service or a content that the component refers to.)

The Component fragment according to the embodiment may include an id attribute, a version attribute, a validFrom attribute, a validTo attribute, a ServiceReference element, a ContentReference element, a ComponentReference element, a ComponentType element, a ComponentRole element, a PrivateExt element, and/or a ProprietaryElements element.

The 'id' attribute may indicate an ID of the component fragment. This attribute value may be globally unique.

The version attribute may indicate version information of the component fragment.

The validFrom attribute may indicate an initial time at which the component fragment is valid.

The validTo attribute may denote the last time at which the component fragment is valid.

The ServiceReference element may refer to the service fragment including the corresponding component.

The ContentReference element may refer to the Content fragment including the corresponding component.

The ComponentReference element may refer to the component fragment including the corresponding component.

The ComponentType element may indicate the content type denoted by the Component fragment. If the types are mixed with each other, the ComponentType element may indicate the type using one or more ComponentType element.

The ComponentRole element may indicate the role of the corresponding component. In accordance with the embodiment of the present invention, if the corresponding component is set to the Presentable Video, the Composite Video, the Presentable Audio, or the Presentable CC component, the ComponentRole element may include the Component Role, and a detailed description of the ComponentRole is as follows.

The PrivateExt element may indicate a container for proprietary or application-specified extension. (The PrivateExt element may serve as a container for proprietary or applicationspecific extensions).

The ProprietaryElements element may indicate proprietary or application-specific elements. The ProprietaryElements element may include one or more sub-elements or one or more attributes.

FIG. 63 illustrates an XML schema of a ComponentType element according to another embodiment of the present invention.

Referring to FIG. 63, the component according to the embodiment may represent all the ComponentType elements capable of being transmitted through hybrid broadcasting. For this purpose, the range of the type may be represented by an integer value.

In accordance with the embodiment, not all the components include data (ComponentData), such that the reception apparatus can first recognize the type value of the component fragment, and then recognize information regarding component data.

The relationship between subordinates and superiors of the components or the subordinate relationship of the respective components will hereinafter be given.

In accordance with the embodiment, the ComponentRangeType indicating the ComponentType element type may be set to zero as a minimum value, and may be set to 15 as a maximum value.

As shown in FIG. 63, if the ComponentType element value is set to zero, this means 'Unspecified'. If the ComponentType element value is set to 1, this means a Continuous component. If the ComponentType element value is set to 2, this means an Elementary component. If the ComponentType element value is set to 3, this means a Composite component. If the ComponentType element value is set to 4, this means a PickOne component. If the ComponentType element value is set to 5, this means a Complex component. If the ComponentType element value is set to 6, this means a Presentable Audio component. If the ComponentType element value is set to 7, this means a Presentable Audio component. If the ComponentType element value is set to 8, this means a Presentable CC component. If the ComponentType element value is set to 9, this means an NRT File. If the ComponentType element value is set to 10, this means an NRT Content Item. If the ComponentType element value is set to 11, this means an Application. If the ComponentType element value is set to 12, this means an ATSC3.0 Application. If the ComponentType element value is set to 13, this means an On Demand component. If the ComponentType element value is set to 14, this means a Notification Stream. If the ComponentType element value is set to 15, this means an AppBased Enhancement. If the ComponentType element value is set to any one of 16 to 255, this means 'Reserved'.

The Continuous component may indicate a content component represented in one continuous stream. For example, the Continuous component may correspond to Audio, Video, or Closed Caption.

The Elementary component may indicate a Continuous component corresponding to single encoding. That is, the Elementary component may indicate a Continuous component encoded by a separate encoder. For example, single encoding of the sound sequence, single encoding of the picture sequence, or the single closed caption track may correspond to the Elementary component.

The Composite component may indicate a content component constructing the set of continuous components which have the same content type, represent the same scene, and can be combined to construct one presentation. For example, the Composite component may be implemented as music, dialogue, and sound effect, which are to be mixed to provide high-quality audio. In addition, a left-eye image and a right-eye image to be combined to construct a three dimensional (3D) image may also correspond to the composite component.

The PickOne component may indicate a content component constructing the set of continuous components capable of being selected to have the same content type, display the same scene, and construct one presentation. For example, the set of audio components encoded by bit rates different from those of the same sound sequence, the set of video components encoded by bit rates different from those of the same picture sequence, or the set of general closed caption tracks and easy reader closed caption tracks for the same dialogue may correspond to the PickOne component.

The Complex component may indicate the Composite component or the PickOne component.

The Presentable component may denote the Continuous component displayed for the user. The Presentable component may include the Elementary component or Complex component.

The Presentable Video component may denote the Video Continuous component displayed for the user.

The Presentable Audio component may denote the Audio Continuous component displayed for the user.

The Presentable CC component may denote the CC Continuous component displayed for the user.

The NRT File may indicate a non-realtime transmission file.

The NRT Content Item may indicate the set of one or more NRT files to be package-consumed by users who will purchase the set of NRT files.

The Application may indicate the set of constituent documents of the complete enhanced or interactive service. The above-mentioned documents may include HTML, JavaScript, CSS, XML, and/or multimedia files. The Application may access another data instead of the part of the application. This Application may correspond to a special case of NRT Content Item.

The ATSC3.0 Application may indicate Application based on ATSC 3.0 Application Runtime Environment Specification.

The On Demand component may indicate a content component transmitted on demand.

The Notification Stream may indicate a stream capable of transmitting a notification message configured to synchronize actions of the application under Linear Time Base.

The AppBased Enhancement may include zero or more Notification Streams to transmit synchronized notification of the actions, one or more applications, zero or more different NRT Content Items used by the application, and zero or more On Demand components managed by the application.

FIG. 64 illustrates an XML schema of a ComponentRole element according to an embodiment of the present invention.

Referring to FIG. 64, the component may indicate the role of all the components capable of being transmitted through hybrid broadcasting. For this purpose, the ComponentRole element may be denoted by an integer value.

The ComponentRole element may range from 0 to 21.

The Component element ranges from 0 to 21 such that it can indicate not only the role obtained when the Component element is 'Presentable', but also the role obtained when the Component element is 'Composite'.

If the ComponentRole element according to the embodiment is denoted by 0, this means 'Unspecified'. If the ComponentRole element is denoted by 1, this means 'Primary (default) video'. If the ComponentRole element is denoted by 2, this means 'Alternative camera view'. If the ComponentRole element is denoted by 3, this means 'Other alternative video component'. If the ComponentRole element is denoted by 4, this means 'Sign language (e.g., ASL) inset'. If the ComponentRole element is denoted by 5, this means 'Follow subject video'. If the ComponentRole element is denoted by 6, this means 'Base layer for scalable video encoding'. If the ComponentRole element is denoted by 7, this means 'Enhancement layer for scalable video encoding with level'. If the ComponentRole element is denoted by 8, this means '3D video left view'. If the ComponentRole element is denoted by 9, this means '3D video right view'. If the ComponentRole element is denoted by 10, this means '3D video depth information'. If the ComponentRole element is denoted by 11, this means 'Part of video array, <x,y> of <n,m>'. If the ComponentRole element is denoted by 12, this means 'FollowSubject metadata'. If the ComponentRole element is denoted by 13, this means 'Complete main'. If the ComponentRole element is denoted by 14, this means 'Music'. If the ComponentRole element is denoted by 15, this means 'Dialogue'. If the ComponentRole element is denoted by 16, this means 'Effects'. If the ComponentRole element is denoted by 17, this means 'Visually impaired'. If the ComponentRole element is denoted by 18, this means 'Hearing impaired'. If the ComponentRole element is denoted by 19, this means 'Commentary'. If the ComponentRole element is denoted by 20, this means 'Normal'. If the ComponentRole element is denoted by 21, this means 'Easy reader'. If the ComponentRole element is denoted by 22~255, this means 'Reserved'. If the ComponentRole element is denoted by 1~5, this means the role of a presentable Video Component. If the ComponentRole element is denoted by 6~12, this means the role of a Composite Video Component. If the ComponentRole element is denoted by 13~19, this means the role of a presentable Audio Component. If the ComponentRole element is denoted by 20~21, this means the role of a presentable CC Component.

FIG. 65 illustrates an XML schema of component fragments regarding a Composite Video Component including one base layer and two enhancement layers in scalable video coding according to another embodiment of the present invention.

In accordance with the embodiment, the Component fragment (L65010) located at the top of FIG. 65 may have the ID value "bcast://lge.com/Component/1", may refer to the Service1 using the ServiceReference element, may refer to the Content1 using the ContentReference element, and may indicate that the corresponding component is any of the Continuous and Composite components using the ComponentType element.

The Component fragment (L65020) located to the left of FIG. 65 may have "bcast://lge.com/Component/2" as the ID value, may refer to the Service1 using the ServiceReference element, may refer to the Content1 using the ContentReference element, may refer to "bcast://lge.com/Component/1" using the ComponentReference element, and may indicate that the corresponding element is Continuous, Elementary, and Base Layer of SVC components using the ComponentType element.

The Component fragment (L65030) located to the right of FIG. 65 may have "bcast://lge.com/Component/3" as the ID value, may refer to the Service1 using the ServiceReference element, may refer to the Content1 using the ContentReference element, may refer to "bcast://lge.com/Component/1" using the ComponentReference element, and may indicate that the corresponding element is Continuous, Elementary, and Enhancement Layer of SVC components using the ComponentType element.

Figure 66:
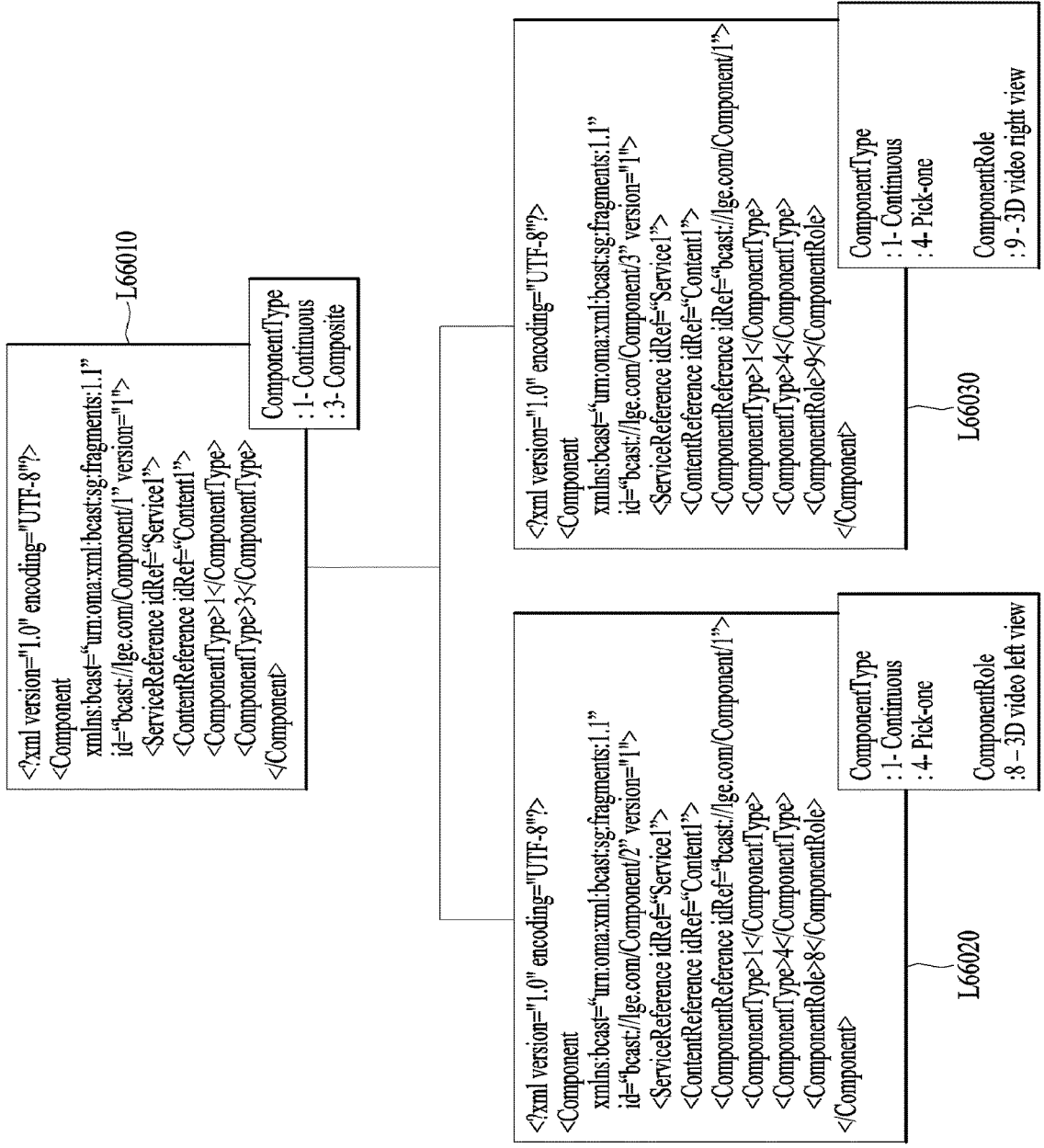
FIG. 66 illustrates an XML schema of component fragments regarding a Composite Component including a 3D video left view and a 3D video right view according to an embodiment of the present invention.

FIG. 66 illustrates an XML schema of component fragments regarding a Composite Component including a 3D video left view and a 3D video right view according to an embodiment of the present invention.

In accordance with the embodiment, the Component fragment (L66010) located at the top of FIG. 66 may have the ID value "bcast://lge.com/Component/1", may refer to the Service1 using the ServiceReference element, may refer to the Content1 using the ContentReference element, and may indicate that the corresponding component is any of the Continuous and Composite components using the ComponentType element.

The Component fragment (L66020) located to the left of FIG. 66 may have "bcast://lge.com/Component/2" as the ID value, may refer to the Service1 using the ServiceReference element, may refer to the Content1 using the ContentReference element, may refer to "bcast://lge.com/Component/1" using the ComponentReference element, and may indicate that the corresponding element is Continuous, PickOne, and 3D video left view components using the ComponentType element.

The Component fragment (L66030) located to the right of FIG. 66 may have "bcast://lge.com/Component/3" as the ID value, may refer to the Service1 using the ServiceReference element, may refer to the Content1 using the ContentReference element, may refer to "bcast://lge.com/Component/1" using the ComponentReference element, and may indicate that the corresponding element is Continuous, PickOne, and 3D video right view components using the ComponentType element.

FIG. 67 illustrates an XML schema of component fragments configured to describe a Complete Audio Component according to another embodiment of the present invention.

In accordance with the embodiment, the Component fragment (L67010) located at the uppermost part of FIG. 67 may have the ID value "bcast://lge.com/Component/1", may refer to the Service1 using the ServiceReference element, may refer to the Content1 using the ContentReference element, and may indicate that the corresponding component is any of the Continuous and PickOne components using the ComponentType element.

The Component fragment (L67020) located to the left side of the second column of FIG. 67 may have "bcast://lge.com/Component/2" as the ID value, may refer to the Service1 using the ServiceReference element, may refer to the Content1 using the ContentReference element, may refer to "bcast://lge.com/Component/1" using the ComponentReference element, and may indicate that the corresponding element is Continuous, PickOne, and Audio Completely Main components using the ComponentType element.

The Component fragment (L67030) located to the right side of the second column of FIG. 67 may have "bcast://lge.com/Component/3" as the ID value, may refer to the Service1 using the ServiceReference element, may refer to the Content1 using the ContentReference element, may refer to "bcast://lge.com/Component/1" using the ComponentReference element, and may indicate that the corresponding element is Continuous and Composite components using the ComponentType element.

The Component fragment (L67040) located to the left side of the third column of FIG. 67 may have "bcast://lge.com/Component/4" as the ID value, may refer to the Service1 using the ServiceReference element, may refer to the Content1 using the ContentReference element, may refer to "bcast://lge.com/Component/3" using the ComponentReference element, and may indicate that the corresponding element is Continuous, PickOne, and Audio Music components using the ComponentType element.

The Component fragment (L67050) located to the right side of the third column of FIG. 67 may have "bcast://lge.com/Component/5" as the ID value, may refer to the Service1 using the ServiceReference element, may refer to the Content1 using the ContentReference element, may refer to "bcast://lge.com/Component/3" using the ComponentReference element, and may indicate that the corresponding element is Continuous, PickOne, and Audio Music components using the ComponentType element.

FIG. 68 is a structural view illustrating a Content fragment according to an embodiment of the present invention.

Referring to FIG. 68, the embodiment of the present invention can provide a method for defining the component as a lower element of the Content fragment, and announcing the defined result to the device and user.

In accordance with the embodiment of the present invention, the component fragment is constructed separately, such that it can reduce the number of unavoidable overlapping or repeated use times of the constituent elements and/or attributes. In addition, the embodiment can intuitively provide the user with announcement information.

The Content fragment according to the embodiment may include the id attribute, the version attribute, the validFrom attribute, validTo attribute, the globalContentID attribute, the emergency attribute, the baseCID attribute, the ServiceReference element, the ProtectionKeyID element, the Name element, the Description element, the StartTime element, the EndTime element, the AudioLanguage element, the TextLanguage element, the Length element, the ParentalRating element, the TargetUserProfile element, the Genre element, the Extension element, the PreviewDataReference element, the Broadcast Area element, the TermsOfUse element, and/or the PrivateExt element.

The id attribute may indicate an ID of the Content fragment.

The version attribute may indicate version information of the component fragment.

The validFrom attribute may indicate an initial time at which the component fragment is valid.

The validTo attribute may denote the last time at which the component fragment is valid.

The globalContentID attribute may indicate the ID for identifying the content describing the corresponding content fragment.

The emergency attribute may indicate whether the content described by the corresponding content fragment is an emergency content.

The baseCID attribute may indicate the CID information of the service or program.

The ServiceReference element may indicate the service referenced by the corresponding content fragment.

The ProtectionKeyID element may indicate the Key identifier needed to access the protected content.

The Name element may indicate the name of the corresponding content fragment.

The Description element may indicate Description of the corresponding content fragment.

The StartTime element may indicate the start time information of the corresponding content presentation.

The EndTime element may indicate the end time information for presentation of the corresponding content.

The AudioLanguage element may allow the corresponding content to be used along with the audio stream. In this case, the AudioLanguage element may indicate language information of the used audio.

The TextLanguage element may allow the corresponding content of be used along with the text component. In this case, the TextLanguage element may indicate language information of the used text.

The Length element may represent the duration time of the corresponding A/V content.

The ParentalRating element may represent reference information indicating whether the corresponding content is appropriate for children.

The TargetUserProfile element may represent information regarding the target user.

The Genre element may represent genre information of the corresponding content.

The Extension element may represent additional information related to the corresponding content fragment.

The PreviewDataReference element may represent the PreviewData fragment referenced by the corresponding component fragment.

The BroadcastArea element may represent broadcast regional information including the position information for the broadcast content.

The TermsOfUse element may represent 'Terms of User' related to the corresponding fragment.

The PrivateExt element may represent a container for proprietary or application specific extensions. (An element serving as a container for proprietary or application-specific extensions.) The PrivateExt element may include the ProprietaryElements element as the sub-element. The ProprietaryElements element may represent the proprietary element or the application specific element. The ProprietaryElements element may include one or more sub-elements or one or more attributes.

Since the PrivateExt element of the content fragment according to one embodiment is an element having an E1 level, the component element acting as the sub-element of the PrivateExt element may correspond to the E2 level. In this case, the component element may correspond to the above-mentioned ProprietaryElements element.

FIGS. 69, 70, 71, and 72 are structural views illustrating Component elements according to an embodiment of the present invention.

It should be noted that Tables of FIGS. 69 to 72 are grouped into one table such that four tables shown in FIGS. 69 to 72 may correspond to one table.

The component element according to the embodiment may correspond to the E2-level element, and can describe detailed information of the component. As a result, as many component elements as the number of component may be present or absent. Accordingly, the above-mentioned component element may have cardinality ranging from 0 to N.

The Component element according to one embodiment may include the ComponentType element, the ComponentRole element, the StartTime element, the EndTime element, the Language element, the Length element, the ParentalRating element, the DeviceCapability element, and/or the TargetDevice element, as the sub-elements.

The ComponentType element may describe the component type. This ComponentType element is located below the component element, such that it may correspond to the E3 level. The ComponentType element is an essential element indicating the type of the component element, such that the ComponentType element may be set to 1. If the ComponentType element is set to zero, this means an unspecified component. If the ComponentType element is set to 1, this means a Presentable Video component. If the ComponentType element is set to 2, this means a Presentable Audio component. If the ComponentType element is set to 3, this means a Presentable CC component. If the ComponentType element is set to 4, this means an AppBased Enhancement element. If the ComponentType element is set to 2, this means an AppBased Enhancement. If the ComponentType element is set to the values of 5 to 22, this means a Reserved for future use.

The ComponentRole element may be used to describe the role of each component. The ComponentRole element is located below the component element, such that it may correspond to an E3 level. Since the ComponentRole element is an essential element describing the type of the component element, it has the cardinality of 1. Each component has the role according to the above-mentioned ComponentType element type, and may have the role corresponding to the ComponentRole element value. If the ComponentRole element is set to zero, this means an Unspecified. If the ComponentRole element is set to 1, this means a Primary (default) video. If the ComponentRole element is set to 2, this means an Alternative camera view. If the ComponentRole element is set to 3, this means an Alternative video component. If the ComponentRole element is set to 4, this means a Sign language (e.g., ASL) inset. If the ComponentRole element is set to 5, this means a Follow subject video. If the ComponentRole element is set to 6, this means a Complete main. If the ComponentRole element is set to 7, this means 'Music'. If the ComponentRole element is set to 8, this means 'Dialogue'. If the ComponentRole element is set to 9, this means 'Effects'. If the ComponentRole element is set to 10, this means 'Visually impaired'. If the ComponentRole element is set to 1, this means 'Hearing impaired'. If the ComponentRole element is set to 12, this means 'Commentary'. If the ComponentRole element is set to 13, this means 'Normal'. If the ComponentRole element is set to 14, this means an Easy reader. If the ComponentRole element is set to 15, this means 'App'. If the ComponentRole element is set to 16, this means an NRT Content Item. If the ComponentRole element is set to 17, this means an On Demand component. If the ComponentRole element is set to 18, this means a Notification Stream. If the ComponentRole element is set to 19, this means a StartOver. If the ComponentRole element is set to 20, this means a Companion Screen. If the ComponentRole element is set to the values of 21 to 255, this means a Reserved for future use.

The StartTime element may represent a start time at which the display of the corresponding component starts displaying.

The EndTime element may represent the end time of the display operation of the corresponding component.

The Language element may represent expression language of the corresponding component. The Language element may have the languageSDPTag attribute as the attribute value. The languageSDPTag attribute may represent a value tagged to achieve consistency of languages described in the session description.

The Length element may represent the duration time during which displaying of the corresponding component is performed.

The ParentalRating element may represent the rating display information of the corresponding component.

The DeviceCapability element may represent throughput or performance information of the device configured to perform rendering of the corresponding component. The embodiment may provide capability information of the device configured to perform rendering of the component using the DeviceCapability element. The DeviceCapability element having the values of 2 to 8 may represent Video Rendering Capability information of the device. The DeviceCapability element having the values of 9 to 15 may represent Audio Surround Sound Capability information of the device. The DeviceCapability element having the value of 16 may represent the Audio Surround Sound Capability. The DeviceCapability element having the values of 17 to 21 may represent the Input Capability information. If the DeviceCapability element is set to zero '0', this means an Unspecified. If the DeviceCapability element is set to 1, this means Broadband connection. If the DeviceCapability element is set to 2, this means 'SD'. If the DeviceCapability element is set to 3, this means 'HD'. If the DeviceCapability element is set to 4, this means 'UHD'. If the DeviceCapability element is set to 5, this means '8K'. If the DeviceCapability element is set to 6, this means '3D video'. If the DeviceCapability element is set to 7, this means 'High Dynamic Range Imaging'. If the DeviceCapability element is set to 8, this means 'Wide Color Gamut'. If the DeviceCapability element is set to 9, this means '2.0 channels'. If the DeviceCapability element is set to 10, this means '2.1 channels'. If the DeviceCapability element is set to 11, this means '5.1 channels'. If the DeviceCapability element is set to 12, this means '6.1 channels'. If the DeviceCapability element is set to 13, this means '7.1 channels'. If the DeviceCapability element is set to 14, this means '22.1 channels'. If the DeviceCapability element is set to 15, this means 3D audio. If the DeviceCapability element is set to 16, this means Dialog Level adjustment. If the DeviceCapability element is set to 17, this means a magic remote control input. If the DeviceCapability element is set to 18, this means a touch screen input. If the DeviceCapability element is set to 19, this means a mouse input. If the DeviceCapability element is set to 20, this means a keyboard use. In this case, the above-mentioned broadband connection may indicate whether broadband connection is needed to deliver the corresponding component. The Video Rendering Capability information may represent Resolution, 2D, 3D and/or other rendering associated information. The Audio Surround Sound Capability information may represent audio channel information. Dialog level adjustment of the Audio Mixing/Rendering Capability information may indicate whether the audio dialogue level can be adjusted. The Input Capability information may indicate a broadcast program manufactured according to a specific input device. The 'app rendering' information may indicate whether the app rendering is needed.

The TargetDevice element may represent information of the target device on which the component is displayed. If the TargetDevice element is set to zero, this means 'Unspecified'. If the TargetDevice element is set to 1, this means 'Primary'. If the TargetDevice element is set to 2, this means 'Companion'. If the TargetDevice element is set to 3, this means 'Inset on Primary Screen ("PictureinPicture")'. If the TargetDevice element is set to 4, this means 'Reserved for future use'.

FIG. 73 illustrates an XML schema of a Component element according to an embodiment of the present invention.

Referring to FIG. 73, the Component element according to one embodiment of the present invention may include, as the sub-elements, the ComponentType element, the ComponentRole element, the StartTime element, the EndTime element, the Language element, the Length element, the ParentalRating element, the DeviceCapability element, and/or the TargetDevice element. Detailed description of the above-mentioned elements has already been disclosed.

FIG. 74 illustrates an XML schema of a Language element and a ComponentType element according to an embodiment of the present invention.

The Language element according to one embodiment may represent expression language of the corresponding component. The Language element may have the languageSDPTag attribute as the attribute. The languageSDPTag attribute may represent a specific value tagged to achieve consistency of languages described in the session description. (L74010)

The ComponentType element according to one embodiment may be an element to describe the component type. The ComponentType element is located below the component element, such that it may correspond to an E3 level. Since the ComponentType element is an essential element to describe the type of the component element, the ComponentType element may have cardinality of 2. If the ComponentType element is set to zero, this means an Unspecified. If the ComponentType element is set to 1, this means a Presentable Video component. If the ComponentType element is set to 2, this means a Presentable Audio component. If the ComponentType element is set to 3, this means a Presentable CC component. If the ComponentType element is set to 4, this means an AppBased Enhancement. If the ComponentType element is set to the values of 5 to 255, this means a Reserved for future use.

FIG. 75 illustrates an XML schema of a ComponentRole element according to an embodiment of the present invention.

Referring to FIG. 75, the ComponentRole element may be an element to describe the Role of the component. Since the ComponentRole element is located below the component element, it may correspond to an E3 level. Since the ComponentRole element is an essential element to describe the type of the component element, the ComponentRole element may have cardinality of 1. Each component may have the role according to the above-mentioned ComponentType element types, and may also have the role corresponding to the ComponentRole element value. If the ComponentRole element is set to zero, this means an unspecified. If the ComponentRole element is set to 1, this means a Primary (default) video. If the ComponentRole element is set to 2, this means an Alternative camera view. If the ComponentRole element is set to 3, this means other alternative video component. If the ComponentRole element is set to 4, this means a Sign language (e.g., ASL) inset. If the ComponentRole element is set to 5, this means a Follow subject video. If the ComponentRole element is set to 6, this means a Complete main. If the ComponentRole element is set to 7, this means a Music. If the ComponentRole element is set to 8, this means a Dialogue. If the ComponentRole element is set to 9, this means Effects. If the ComponentRole element is set to 10, this means a Visually impaired. If the ComponentRole element is set to 11, this means a Hearing impaired. If the ComponentRole element is set to 12, this means a Commentary. If the ComponentRole element is set to 13, this means a Normal. If the ComponentRole element is set to 14, this means an Easy reader. If the ComponentRole element is set to 15, this means 'App'. If the ComponentRole element is set to 16, this means an NRT Content Item. If the ComponentRole element is set to 17, this means an On Demand component. If the ComponentRole element is set to 18, this means a Notification Stream. If the ComponentRole element is set to 19, this means a StartOver. If the ComponentRole element is set to 20, this means a Companion Screen. If the ComponentRole element is set to the values of 21 to 255, this means a Reserved for future use.

FIG. 76 illustrates an XML schema of a DeviceCapability element and a TargetDevice element according to an embodiment of the present invention.

Referring to FIG. 76, the DeviceCapability element may represent throughput or performance information of the device configured to perform rendering of the corresponding component. The embodiment may provide capability information of the device configured to perform rendering of the component using the DeviceCapability element. The DeviceCapability element having the values of 2 to 8 may represent Video Rendering Capability information of the device. The DeviceCapability element having the values of 9 to 15 may represent Audio Surround Sound Capability information of the device. The DeviceCapability element having the value of 16 may represent the Audio Surround Sound Capability. The DeviceCapability element having the values of 17 to 21 may represent the Input Capability information. If the DeviceCapability element is set to zero '0', this means an Unspecified. If the DeviceCapability element is set to 1, this means Broadband connection. If the DeviceCapability element is set to 2, this means 'SD'. If the DeviceCapability element is set to 3, this means 'HD'. If the DeviceCapability element is set to 4, this means 'UHD'. If the DeviceCapability element is set to 5, this means '8K'. If the DeviceCapability element is set to 6, this means '3D video'. If the DeviceCapability element is set to 7, this means 'High Dynamic Range Imaging'. If the DeviceCapability element is set to 8, this means 'Wide Color Gamut'. If the DeviceCapability element is set to 9, this means '2.0 channels'. If the DeviceCapability element is set to 10, this means '2.1 channels'. If the DeviceCapability element is set to 11, this means '5.1 channels'. If the DeviceCapability element is set to 12, this means '6.1 channels'. If the DeviceCapability element is set to 13, this means '7.1 channels'. If the DeviceCapability element is set to 14, this means '22.1 channels'. If the DeviceCapability element is set to 15, this means 3D audio. If the DeviceCapability element is set to 16, this means Dialog Level adjustment. If the DeviceCapability element is set to 17, this means a magic remote control input. If the DeviceCapability element is set to 18, this means a touch screen input. If the DeviceCapability element is set to 19, this means a mouse input. If the DeviceCapability element is set to 20, this means a keyboard use. In this case, the above-mentioned broadband connection may indicate whether broadband connection is needed to deliver the corresponding component. The Video Rendering Capability information may represent Resolution, 2D, 3D and/or other rendering associated information. The Audio Surround Sound Capability information may represent audio channel information. Dialog level adjustment of the Audio Mixing/Rendering Capability information may indicate whether the audio dialogue level can be adjusted. The Input Capability information may indicate a broadcast program manufactured according to a specific input device. The 'app rendering' information may indicate whether the app rendering is needed. (L76010)

The TargetDevice element may represent information of the target device on which the component is displayed. If the TargetDevice element is set to zero, this means 'Unspecified'. If the TargetDevice element is set to 1, this means 'Primary'. If the TargetDevice element is set to 2, this means 'Companion'. If the TargetDevice element is set to 3, this means 'Inset on Primary Screen ("PictureinPicture")'. If the TargetDevice element is set to 4, this means 'Reserved for future use'. (L76020)

Figure 77:
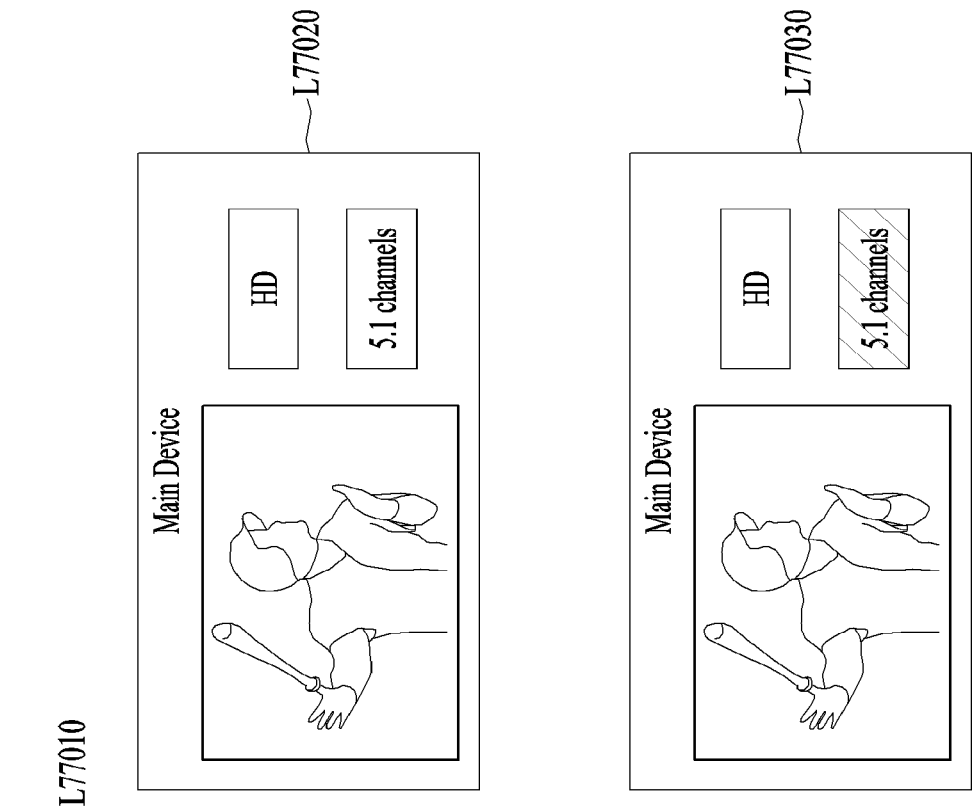
FIG. 77 illustrates an XML schema of a Component element when a Presentable Video Component (2D/HD) and a Presentable Audio Component (5.1 channels) are transmitted.

FIG. 77 illustrates an XML schema of a Component element when a Presentable Video Component (2D/HD) and a Presentable Audio Component (5.1 channels) are transmitted.

Referring to FIG. 77, according to one embodiment, if the Presentable Video Component (2D/HD) and presentable Audio Component (5.1 channels) are transmitted, the announcement function may use two Component elements as the sub-element of the PrivateExt element contained in the Content fragment. (L77010)

The component element for the Presentable Video Component (2D/HD) may have the value of 1 (i.e., Video) as the ComponentType element value, may have the value of 1 (i.e., Primary Video) as the ComponentRole element value, may have the value of 3 (i.e., HD) as the DeviceCapability element value, and may have the value of 1 (i.e., Primary Device) as the TargetDevice element value. (L77010)

The component element for the Presentable Audio Component (5.1 channels) may have the value of 2 (i.e., Audio) as the ComponentType element value, may have the value of 6 (i.e., Completely Main) as the ComponentRole element value, may have KOR (i.e., Korean) as the Language element value, may have the value of 11 (i.e., 5.1 channels) as the DeviceCapability element value, and may have the value of 1 (i.e., Primary Device) as the TargetDevice element value. (L77010)

The receiver (Device) according to one embodiment may acquire the DeviceCapability element value, may determine whether the corresponding function can be supported, and may provide the user with the Capability information.

As can be seen from the upper right part of FIG. 77, a screen image displayed on the device configured to support HD and 5.1 channels is shown as shown in FIG. 77. In this case, the embodiment of the present invention can display specific information indicating that the corresponding device can support HD and 5.1 channels on the screen. (L77020)

Although the lower right part of FIG. 77 can support the HD function, it should be noted that a screen image of the device not supporting 5.1 channels may also be shown in FIG. 77 as necessary. In this case, according to one embodiment, when the receiver not supporting 5.1 channels obtains the Capability information, the non-supported 5.1 channels audio information may be grayed out such that the grayout-processed result may be displayed on the screen. (L77030)

FIG. 78 illustrates an XML schema of a Component element when a Presentable Video component (UHD) and Presentable ENG audio component are transmitted as broadcast signals and a Presentable SPA audio component is transmitted as a broadband signal.

Referring to FIG. 78, according to one embodiment of the present invention, if the Presentable Video component (UHD) and the Presentable ENG audio component are transmitted through broadcast, and if the Presentable SPA audio component is transmitted through broadband, the announcement function may use three Components as the sub-element of the PrivateExt element contained in the Content fragment. (L78010)

The component element for the Presentable Video component (UHD) may have the value of 1 (i.e., Video) as the ComponentType element value, may have the value of 1 (i.e., Primary Video) as the ComponentRole element value, may have the value of 4 (i.e., UHD) as the DeviceCapability element value, and may have the value of 1 (i.e., Primary Device) as the TargetDevice element value. (L78010)

The component element for the Presentable ENG audio component (through Broadcast) may have the value of 2 (i.e., Audio) as the ComponentType element value, may have the value of 6 (i.e., Completely Main) as the ComponentRole element value, may have ENG (English) as the Language element value, and may have the value of 1 (i.e., Primary Device) as the TargetDevice element value. (L78010)

The component element for the Presentable SPA audio component (through Broadband) may have the value of 2 (i.e., Audio) as the ComponentType element value, may have the value of 6 (i.e., Completely Main) as the ComponentRole element value, may have SPA (Spanish) as the Language element value, and may have the value of 1 (indicating that the component is transmitted through broadcast) as the DeviceCapability element value, and may have the value of 1 (i.e., Primary Device) as the TargetDevice element value. (L78010)

The receiver (Device) according to one embodiment obtains the DeviceCapability element value, determines whether the corresponding function can be supported, and provides the user with the Capability information.

Assuming that the right part of FIG. 78 does not support broadband connection, or assuming that the right part of FIG. 78 is in a non-connection state whereas it can support broadband connection, it may be possible to display the screen displayed on the receiver (Device). (L78020)

The receiver according to one embodiment of the present invention may recognize that the corresponding component is transmitted through broadband, when the DeviceCapability element is set to 1. In this case, the device not supporting broadband connection or the other device being in a non-connection whereas it can support broadband connection can perform grayout processing of the broadband transmission component, and can display the processed result on the screen. In this case, the SPA audio information is grayed out and then displayed on the screen. (78020)

Figure 79:
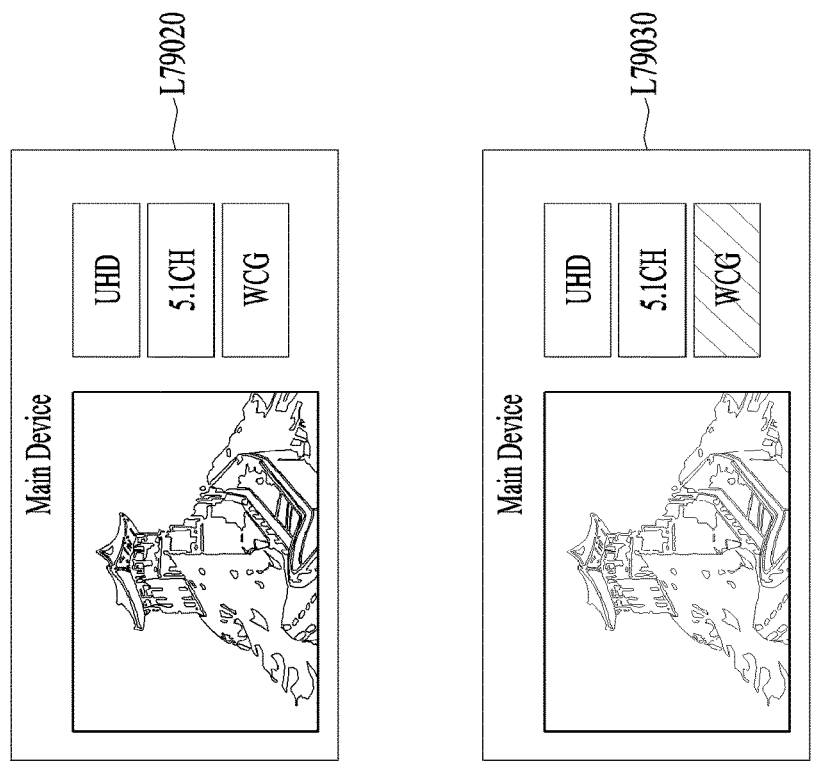
FIG. 79 illustrates an XML schema of a Component element when a Presentable Video Component (UHD/Wide Color Gamut) and a Presentable Audio Component (5.1 channels) are transmitted.

FIG. 79 illustrates an XML schema of a Component element when a Presentable Video Component (UHD/Wide Color Gamut) and a Presentable Audio Component (5.1 channels) are transmitted.

Referring to FIG. 79, according to one embodiment of the present invention, when the Presentable Video Component (UHD/Wide Color Gamut) and the Presentable Audio Component (5.1 channels) are transmitted, the announcement function may use two Components as the sub-element of the PrivateExt element contained in the Content fragment. (L79010)

The component element for the Presentable Video Component (UHD/Wide Color Gamut) may have the value of 1 (Video) as the ComponentType element value, may have the values of 4 (UHD) and 8 (WCG) as the DeviceCapability element values, and may have the value of 1 (i.e., Primary Video) as the TargetDevice element value. (L79010)

The component element for the Presentable Audio Component (5.1 channels) may have the value of 2 (i.e., Audio) as the ComponentType element value, may have the value of 6 (i.e., Completely Main) as the ComponentRole element value, may have KOR (i.e., Korean) as the Language element value, may have the value of 11 (i.e., 5.1 channels) as the DeviceCapability element value, and may have the value of 1 (i.e., Primary Device) as the TargetDevice element value. (L79010)

The receiver (Device) according to one embodiment may acquire the DeviceCapability element value, may determine whether the corresponding function can be supported, and may provide the user with the Capability information.

As can be seen from the upper right part of FIG. 79, a screen image displayed on the device configured to support UHD, WCG (Wide Color Gamut) and 5.1 channels is shown as shown in FIG. 79. In this case, the embodiment of the present invention can display specific information indicating that the corresponding device can support UHD, WCG and 5.1 channels on the screen. (L79020)

Although the lower right part of FIG. 79 can support UHD and 5.1 channels, it should be noted that a screen image of the device not supporting WCG may also be shown in FIG. 79 as necessary. In this case, according to one embodiment, when the receiver not supporting 5.1 channels obtains the Capability information, the non-supported WCG information may be grayed out such that the grayout-processed result may be displayed on the screen. (L79030)

FIG. 80 illustrates a component element according to another embodiment of the present invention.

Referring to FIG. 80, the component element may be a root element of the component sub-element. The component element may start from the E3 level. Since the component element describes detailed content of the component, as many elements as the number of components may be described. In association with some components, the component element may also be omitted as necessary. Therefore, the component element may have cardinality of 0 . . . N. The component element may include the ComponentType attribute, the ComponentRole element, the Language element, and/or the EssentialCapabilities element.

The ComponentType field may include attribute information indicating the component type. That is, the ComponentType field indicates the attribute indicating the component type. The ComponentType field is an essential element indicating the component type, such that the ComponentType field may be set to 1. The ComponentTypinfield may identify that the component corresponds to Presentable Video, Presentable Audio, Presentable CC (closed caption) and/or Presentable App according to the value thereof.

The message shown in FIG. 80 may include one or more fields therein. Each field may include unique meaning or information. Type information may be allocated to each field. The type information may have the value of 'E', 'A', 'E1', 'E2', or 'E[n]'. The E value may indicate that the corresponding field relates to the element. The A value may indicate that the corresponding field relates to the attribute information. The E1 value may indicate that the corresponding field relates to the sub element. The sub-element may correspond to a lower element defined in the element. The E2 value may represent a lower sub-element of the sub-element. That is, the E[n] element may represent the [n1]-th lower element.

FIG. 81 illustrates a ComponentRol element according to an embodiment of the present invention.

Referring to FIG. 81, the ComponentRole element is an element to describe the role of the component. The ComponentRole element is defined as a lower element of the component. The ComponentRole element may start from the E3 level. The ComponentRole element may have a String value. The ComponentRole element value may be designated as the arbitrary valid string value decided by a broadcast station manufacturing the Announcement Data. The ComponentRole element value may be an extensible string value, such that it can describe all kinds of the Capability Strings without difficulty. The target device (e.g., receiver) may display information available for the end user (e.g., a TV viewer) using the ComponentRole element value.

In association with the component, the ComponentRole element may include specific information providing letter-shaped information capable of being recognized by the TV viewer.

The ComponentRole element may represent various kinds of components. For example, in association with the presentable video component, the ComponentRole element may include "Primary video", "Alternative camera view", "Other alternative video component", "Sign language inset", and/or "Follow subject video".

The ComponentRole element may represent various kinds of components. For example, in association with the presentable audio component, the ComponentRole element may include "Complete main", "Music", "Dialogue", "Effects", "Visually impaired", "Hearing impaired" and/or "Commentary".

The ComponentRole element may represent various kinds of components. For example, in association with the presentable CC component, the ComponentRole element may include "Normal" and/or "Easy reader".

The ComponentRole element may represent various kinds of components. For example, in association with the Presentable App (application) component, the ComponentRole element may include "On Demand", "Startover", and/or "CompanionScreen".

FIG. 82 illustrates an XML-formatted component element according to another embodiment of the present invention.

Referring to FIG. 82, the component element according to one embodiment may perform signaling of each component when the component is composed of various kinds of media, such that a viewer-desired component or a receiver-desired component can be identified in advance in the reception end. In addition, the role of the component can be provided in the form of letters, such that the component desired by the viewer who consumes the corresponding information may be easily recognized or selected.

The component element according to one embodiment may be extended and then contained in the Service Guide Content Fragment pre-defined in OMA BCAST as necessary.

FIG. 83 is a conceptual diagram illustrating a Component element according to another embodiment of the present invention.

Referring to FIG. 83, the component element is a root element of the Component Sub-element. The component element may start from the E2 level. Since the component element describes detailed content of each component, as many elements as the number of components may be described. In association with some components, the component element may also be omitted as necessary. Therefore, the component element may have cardinality of 0 . . . N. The component element may include the Presentable VideoComponent element, the PresentableAudioComponent element, the PresentableCCComponent element, and/or the PresentableAppComponent element.

The PresentableVideoComponent element may be an element to describe the Presentable Video Component. The Presentable VideoComponent element is a lower element of the component element, and may start from the E3 level. The Presentable VideoComponent element may have a string value, and may describe the role of the video component. In association with the component, the Presentable VideoComponent element may include specific information to provide letter-shaped description capable of being recognized by the TV viewer. The role of the component capable of being represented by the Presentable VideoComponent element may include "Primary video", "Alternative camera view", "Other alternative video component", "Sign language inset", and/or "Follow subject video".

The PresentableAudioComponent element may be an element to describe the Presentable Audio Component. The PresentableAudioComponent element acting as a lower element of the component element may start from the E3 level. The PresentableAudioComponent element may have the string value, and may describe the role of the audio component. In association with the component, the PresentableAudioComponent element may provide specific information to provide letter-shaped description capable of being recognized by the TV viewer. The role of the component capable of being represented by the PresentableAudioComponent element may include "Complete main", "Music", "Dialog", "Effects", "Visually impaired", "Hearing impaired" and/or "Commentary".

FIG. 84 illustrates a PresentableCCComponent element and a PresentableAppComponent element according to another embodiment of the present invention.

Referring to FIG. 84, the element shown in FIG. 84 may be contained in the above-mentioned component element shown in FIG. 83.

The PresentableCCComponent element may be an element to describe the Presentable CC Component. The PresentableCCComponent element acting as a lower element of the component element may start from the E3 level. The PresentableCCComponent element may have the string value, and may describe the role of the CC component. In association with the component, the PresentableCCComponent element may include specific information to provide letter-shaped description capable of being recognized by the viewer. The component capable of being denoted by the PresentableCCComponent element may include "Normal" and/or "Easy reader".

The PresentableAppComponent element may be an element to describe the Presentable App Component. The PresentableAppComponent element acting as a lower element of the component element may start from the E3 level. The PresentableAppComponent element may have the string value, and may describe the role of the App Component. In association with the component, the PresentableAppComponent element may include specific information to provide letter-shaped description capable of being recognized by the TV viewer. The component capable of being denoted by the PresentableAppComponent element may include "On Demand", "Startover", and/or "CompanionScreen".

If the component element is constructed according to the embodiment of the present invention, the number of repeated use times of the constituent elements and/or attribute values needed to construct the new component fragments can be greatly reduced, and announcement information can be effectively and intuitively provided to the End User.

FIG. 85 illustrates an XML-formatted component element according to another embodiment of the present invention.

Referring to FIG. 85, if the component element according to another embodiment of the present invention is comprised of various kinds of media, the component element may perform signaling of each component type, such that a viewer-desired component or a receiver-desired component can be identified in advance in the reception end. In addition, the role of the component can be provided in the form of letters, such that the component desired by the viewer who consumes the corresponding information may be easily recognized or selected. In addition, the role of the component may be provided in the form of letters, such that the component desired by the viewer who consumes the corresponding information can be readily recognized and selected. In addition, according to another embodiment of the present invention, the component element may be constructed in different ways according to component types, and may describe the role of each component using the string, resulting in acquisition of the extensibility.

The component element according to one embodiment may also be extended in the Service Guide Content Fragment pre-defined in OMA BCAST as necessary.

FIG. 86 illustrates Essential Capabilities elements according to an embodiment of the present invention.

Referring to FIG. 86, according to one embodiment of the present invention, the component element may include the Capability item. The Capability item may correspond to specific information indicating the receiver throughput needed when the receiver can properly decode the corresponding component. The Capability item may be comprised of the combination of the Capability code and the String. The embodiment of the present invention may provide a method for additionally defining a new value in the Capability code and Capability category.

Referring to FIG. 86, the Capability item may be defined as a lower element of the component element. The Capability item may include the EssentialCapabilities element, the CapabilityCodes element, the CapabilityString element, and/or the Category attribute information.

The EssentialCapabilities element may describe the capability required for the meaningful presentation of the service (Media, Broadcast Service). The EssentialCapabilities element may include the CapabilityCodes element and/or the CapablityString element. The EssentialCapabilities element may be defined as a lower element of the component element, and may start from the E3 level.

The CapabilityCodes element may have the value regarding the code identifying the capability category. The CapabilityCodes element may indicate one or more capabilities.

The Capability String element may include a string to describe the capability. The CapabilityString element may include information to describe the capability using letters. The CapabilityString element may include Category attribute information.

The Category attribute information may indicate category of the capability described by the Capability String element.

FIG. 87 illustrates the meaning of Capability in response to a CapabilityCode element value according to an embodiment of the present invention.

As shown in FIG. 87, the CapabilityCode element may have different meanings according to different values thereof.

In accordance with the embodiment, a new value is defined in the Download Protocols item, and the capability denoted by the corresponding value may be established to correspond to "IP via Broadband". That is, data may be received through Broadband IP in the next generation broadcast system, and the received result may be added, as one capability type, to the Download Protocol corresponding to IP via Broadband.

In accordance with the embodiment of the present invention, the CapabilityCode element may identify the Rendering Capability. In accordance with the CapabilityCode element value, the Rendering Capability requisite for the receiver may be signaled to use the component. The Rendering Capability denoted by the CapabilityCode element may indicate which video, audio, application, and/or CC can be rendered by the receiver.

FIG. 88 illustrates a Capability Category dependent upon a Category attribute information value.

Referring to FIG. 88, the value of the Category attribute information may be additionally defined in a manner that the capability is contained in the Rendering Capability category. For example, assuming that the Category attribute information is set to 0x06, this means that the capability is contained in the Rendering Capability category.

Figure 89:
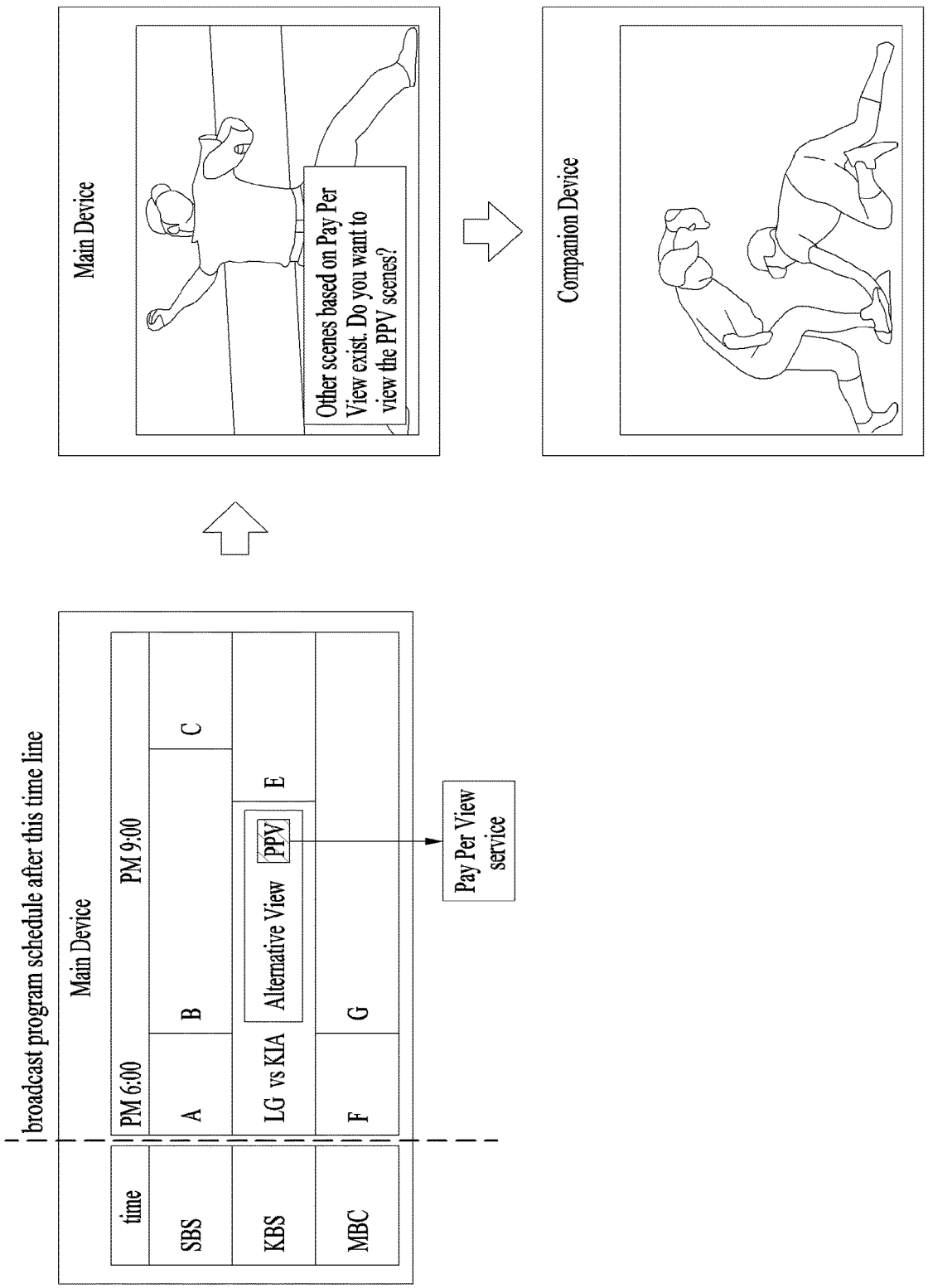
FIG. 89 is a conceptual diagram illustrating a method for providing a PPV (Pay Per View) program to each component according to an embodiment of the present invention.

FIG. 89 is a conceptual diagram illustrating a method for providing a PPV (Pay Per View) program to each component according to an embodiment of the present invention.

Referring to FIG. 89, the PayPerView service per component may be provided. That is, according to one embodiment of the present invention, within one service or content, a specific component can be provided to the user through a pay per view. For example, according to the embodiment of the present invention, the component is defined in the announcement, such that the PayPerView service can be provided according to the component.

For this purpose, attribute and/or element information regarding the component element may be described in the content and then transmitted. Each component may have pay-for-use information. The broadcast program (media, broadcast service, or broadcast content) may be provided free of charge, and the broadcast station may impose a predetermined charge to each component according to the quality and amount of additional information of each component of the broadcast program. For example, in order to allow the TV viewer to view the UHD video component but not the free-of-charge HD video component, the broadcast station may provide the TV viewer with the UHD video component through Pay Per View. Alternatively, the broadcast station may impose a predetermined charge to each audio component for stereoscopic sound of the Audio component. Alternatively, the broadcast station may impose a predetermined charge to a component requisite for the voting application configured to activate the voting broadcast program, such that the TV viewer who desires to participate in the voting must pay for the requisite component. The above-mentioned scheme is referred to as a Pay Per View scheme implemented by ESG transmitted per component.

In order to establish the PPV function per component, the component element may include PPV related information in association with each component. Alternatively, the ComponentRole element may include PPV related information in association with each component role. PPV related information may include ID information for identifying whether PPV is applied to the component or the component role; PPV payment information; PPV cost information; authentication related information after completion of PPV payment; and/or duration information through which the corresponding component can be validly used after completion of PPV payment.

Referring to FIG. 89, according to the embodiment of the present invention, it can be recognized that PPV elements are present in the broadcast program through the ESG (Electronic Service Guide). The receiver may display the item of the PPV components through ESG. If the TV viewer selects a broadcast program having PPV elements, the receiver may indicate the presence of one or more PPV elements in the corresponding program, may display a User Interface (UI) for querying the TV viewer whether to view the PPV element, and may thus receive the selection command from the TV viewer. This embodiment illustrates an exemplary case in which not only basic images of the broadcast program but also additional images are present. If the TV viewer pays for the PPV Video Component corresponding to the Alternative View, the TV viewer can view the Alternative View images. In this case, the above-mentioned control unit may construct a broadcast program schedule using the PPV related information. The broadcast program schedule includes a specific mark indicating whether PPV is applied to a specific component. The above-mentioned display unit may display the broadcast program schedule thereon.

The TV viewer may select the Alternative View images, and view the same at a later time as necessary. In this case, if a current display image stops displaying, the Alternative View images may be displayed. Alternatively, the Alternative View images may be displayed at a specific time desired by the TV viewer. Alternatively, the TV viewer may view in real time not only basic images provided from the main device but also the Alternative View images using the Companion Device.

Figure 90:
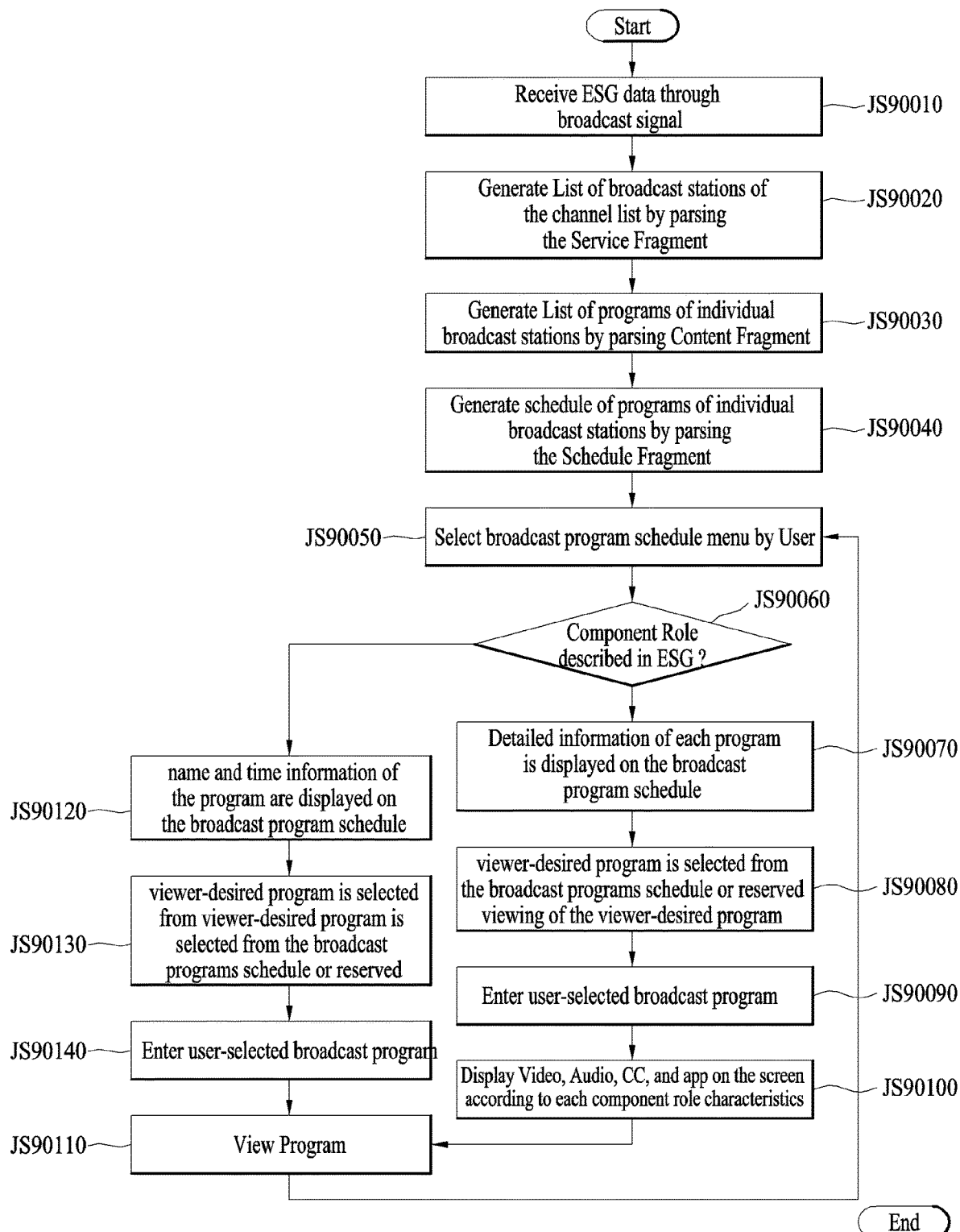
FIG. 90 is a flowchart illustrating a method for providing media to each component of a broadcast program according to an embodiment of the present invention.

FIG. 90 is a flowchart illustrating a method for providing media to each component of a broadcast program according to an embodiment of the present invention.

Referring to FIG. 90, the receiver may receive ESG (Electronic Service Guide) data through broadcast signals (J590010). The ESG data may include the above-mentioned elements, the Service fragment, the Content fragment, the Schedule fragment, and/or the Component Fragment.

The receiver may parse the Service fragment, and may thus generate the list of broadcast stations to be displayed on the channel list (J590020).

The receiver may parse the Content fragment, and may thus provide the list of broadcast programs per broadcast station (J590030).

The receiver may parse the schedule fragment, and may thus generate a schedule of the broadcast programs per broadcast station (J590040).

The receiver may receive a command for displaying a broadcast program schedule from the TV viewer or the user (J590050).

The receiver may determine whether the role of the component contained in the broadcast service or the broadcast program is displayed on the ESG (J590060).

If the role of the component contained in the broadcast service or the broadcast program is displayed on the ESG, the receiver may display detailed information of each program contained in the broadcast programs schedule (J590070). The receiver may obtain information regarding the component role from the above-mentioned component element and the sub-element thereof.

The receiver may receive a selection command of a specific program or a reserved viewing command of the specific program from the TV viewer or the user (J590080).

The receiver may enter (or decode) the broadcast programs elected by the TV viewer or the user (J590090).

The receiver may display the Video, Audio, CC, and/or App Components on the display screen according to the role of each component contained in the broadcast program (J590100). The receiver may receive the command for selecting any one of the Video, Audio, CC, and/or App Components from the TV viewer or the user. In this case, assuming that the PPV policy for each component is present, the PPV program can be processed as described above. A specific message indicating the presence or absence of the PPV policy for each component may be displayed on the ESG.

The TV viewer or the user may view the media displayed by the receiver (JS90100).

In the meantime, if the role of component contained in the broadcast service or the broadcast program is not displayed on the ESG, the receiver may display time information of the program and/or the name of the program contained in the broadcast program schedule (JS90120).

The receiver may receive a selection command of a specific program contained in the broadcast program schedule or the reserved viewing command of the specific program from the TV viewer or the user (JS90130).

The receiver may enter (decode) the broadcast program selected by the TV viewer/user (JS90140).

In the meantime, if the TV viewer or the user who views the broadcast program inputs a command for displaying the broadcast program schedule, the receiver may perform the procedures starting from the step JS90050.

Figure 91:
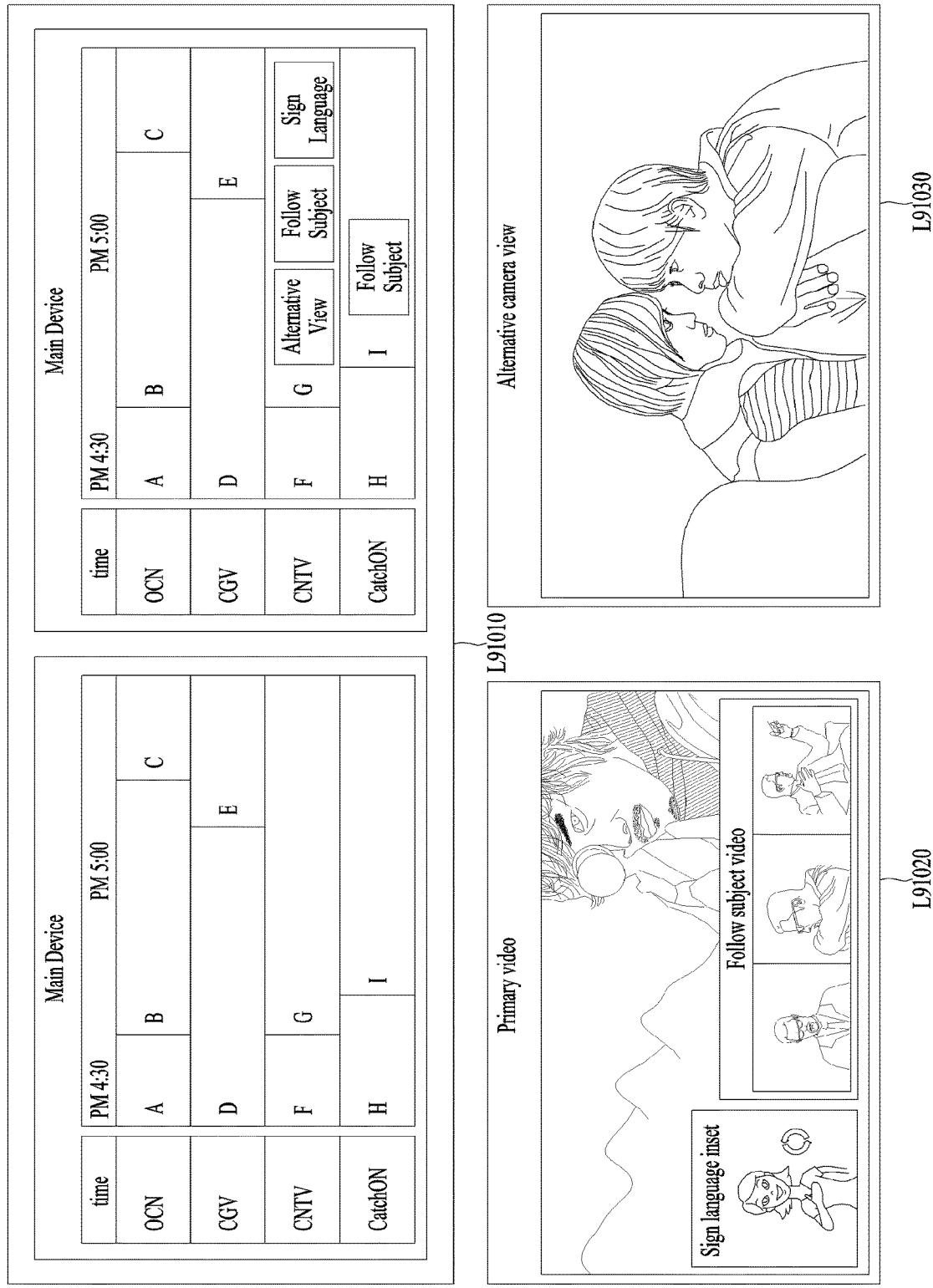
FIG. 91 exemplarily illustrates screen images through which media is supplied to each component of a broadcast program according to an embodiment of the present invention.

FIG. 91 exemplarily illustrates screen images through which media is supplied to each component of a broadcast program according to an embodiment of the present invention.

Referring to the step (L91010) shown in FIG. 91, in association with the program (G) manufactured by the broadcast station (CNTV) displayed on the ESG, the role of each component is shown in FIG. 91. If necessary, the role of each component may not be shown in FIG. 91. For example, if the component role is displayed on the ESG, the ESG may indicate that the components capable of providing the 'Alternative View', 'Follow Subject' and 'Sign Language' elements are present in relation to the G program.

Referring to the step (L91020), if the G program is displayed, the receiver may display not only 'Sign language' but also 'follow subject video' at the same time, or may display thumbnail images related to these components. In this case, 'Sign language' may correspond to sign language, and 'follow subject video' may correspond to images related to a current program.

Referring to the step (L91030), assuming that the TV viewer or the user selects the 'Alternative View' function in relation to the G program, not only basic images of the current program but also the remaining images other than the basic images may be displayed.

Figure 92:
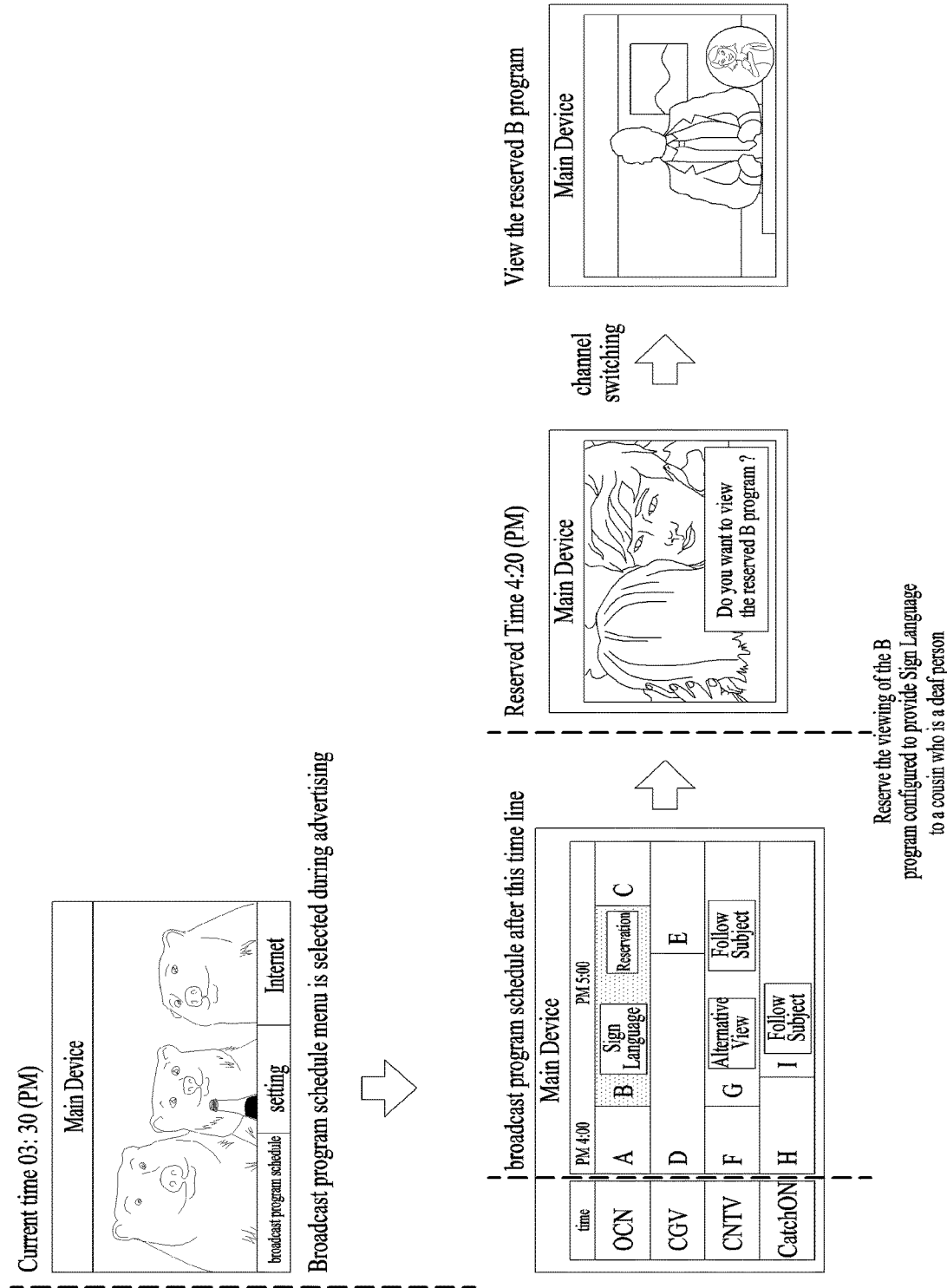
FIG. 92 exemplarily illustrates screen images through which the role of a video component is displayed on ESG according to an embodiment of the present invention.

FIG. 92 exemplarily illustrates screen images through which the role of a video component is displayed on ESG according to an embodiment of the present invention.

The receiver receives a request of the broadcast program schedule from the TV viewer, and displays the requested broadcast program schedule. Information regarding the broadcast program located after the current time may be displayed on the broadcast program schedule. Specific information indicating that the component corresponding to a specific role related to a specific program may be displayed on the ESG. For example, the sing language content may be provided to the program (B). Therefore, the TV viewer who desires to view the sign language content may select a broadcast program in which the letters 'sign language' are displayed, may perform channel switching of the corresponding program, or may perform reserved viewing of the corresponding program. The receiver may provide the TV viewer with queries indicating whether to view the corresponding program when a current time reaches the start time of the reserved broadcast program, and then display the corresponding program.

Figure 93:
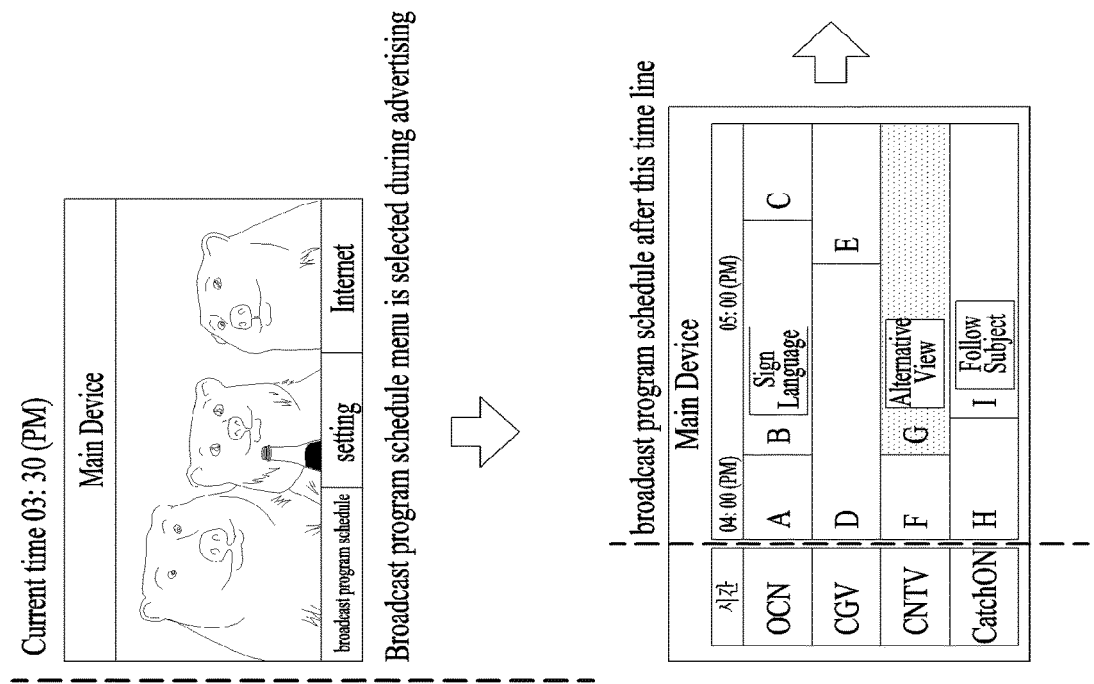
FIG. 93 exemplarily illustrates screen images through which the role of a video component is displayed on ESG according to another embodiment of the present invention.

FIG. 93 exemplarily illustrates screen images through which the role of a video component is displayed on ESG according to another embodiment of the present invention.

Referring to FIG. 93, the receiver may receive a request for the broadcast program schedule from the TV viewer, and may display the broadcast program schedule. Information regarding the broadcast program located after the current time may be displayed on the broadcast program schedule. Specific information indicating that the component corresponding to a specific role related to a specific program may be displayed on the ESG. For example, the broadcast program schedule may indicate the presence of the Alternative View element in the G program. If the user selects the G program, the receiver may provide the TV viewer with queries whether to view the corresponding program. If the receiver receives an indication command of the Alternative View element from the TV viewer, the receiver may replace the current image with those of the 'Alternative View' element, and then display the replaced result. Alternatively, the receiver transmits the 'Alternative View' related information to the companion device, and thus allows the companion device to display the Alternative View images.

Figure 94:
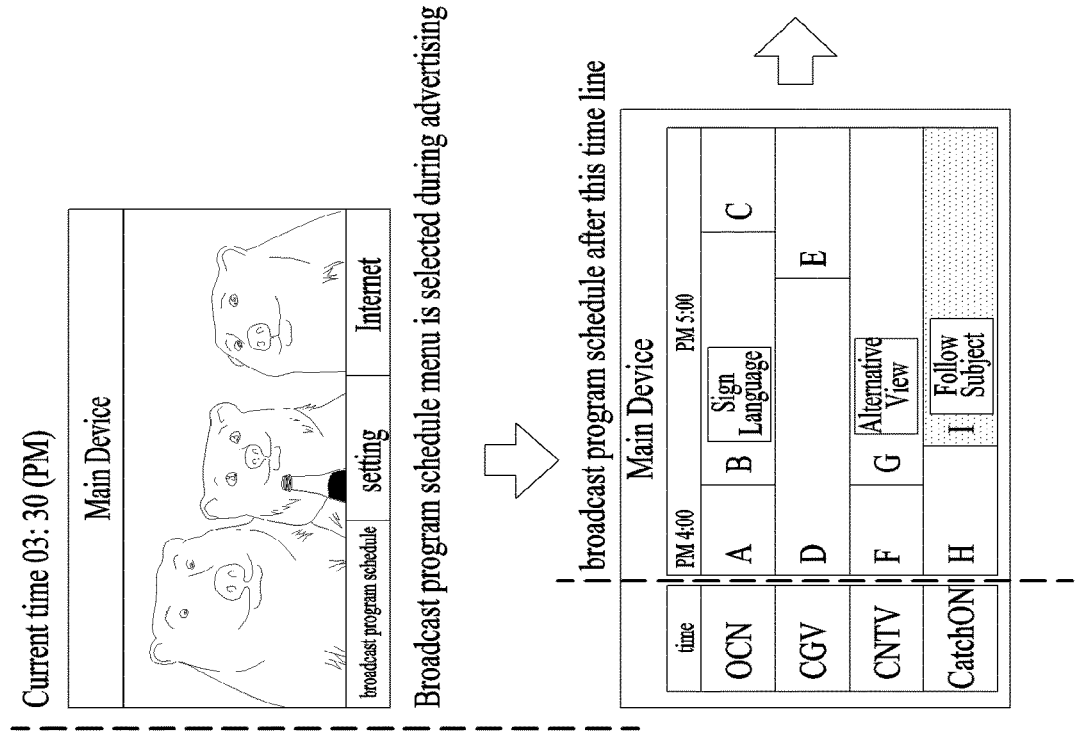
FIG. 94 exemplarily illustrates screen images through which the role of a video component is displayed on ESG according to another embodiment of the present invention.

FIG. 94 exemplarily illustrates screen images through which the role of a video component is displayed on ESG according to another embodiment of the present invention.

Referring to FIG. 94, the receiver may receive a request for the broadcast program schedule from the TV viewer, and may display the broadcast program schedule. Information regarding the broadcast program located after the current time may be displayed on the broadcast program schedule. Specific information indicating that the component corresponding to a specific role related to a specific program may be displayed on the ESG. For example, the broadcast program schedule may indicate the presence of the Follow Subject Video element in the program (I). If the user selects the I program, the receiver may provide the TV viewer with queries whether to confirm the Follow Subject Video element. If the receiver receives an indication command of the Follow Subject Video element from the TV viewer, the receiver may replace the current image with those of the Follow Subject Video element, and then display the replaced result. Alternatively, the receiver transmits the 'Follow Subject Video' related information to the companion device, and thus allows the companion device to display the Follow Subject Video images.

Figure 95:
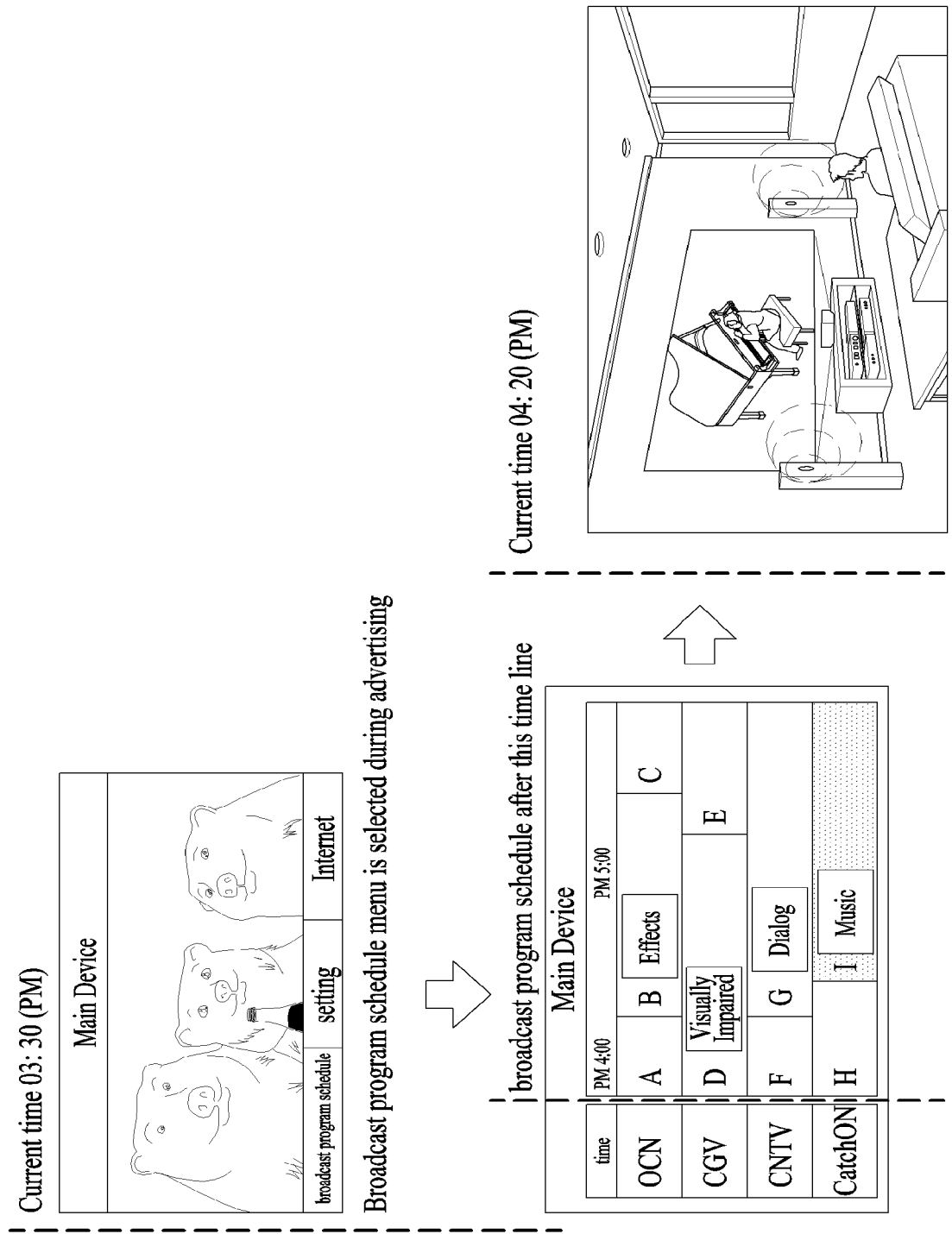
FIG. 95 exemplarily illustrates screen images through which the role of an audio component is displayed on ESG according to an embodiment of the present invention.

FIG. 95 exemplarily illustrates screen images through which the role of an audio component is displayed on ESG according to an embodiment of the present invention.

Referring to FIG. 95, the receiver may receive a request for the broadcast program schedule from the TV viewer, and may display the broadcast program schedule. Information regarding the broadcast program located after the current time may be displayed on the broadcast program schedule. Specific information indicating that the component corresponding to a specific role related to a specific program may be displayed on the ESG. For example, the broadcast program schedule may indicate the presence of the Music component element in the program (I). The Music component may correspond to a component configured to provide high-quality sound audio data for the corresponding program. As a result, the TV viewer who desires to receive high-quality sound audio data selects the I program, and can thus simultaneously consume the corresponding program and the Music component.

Figure 96:
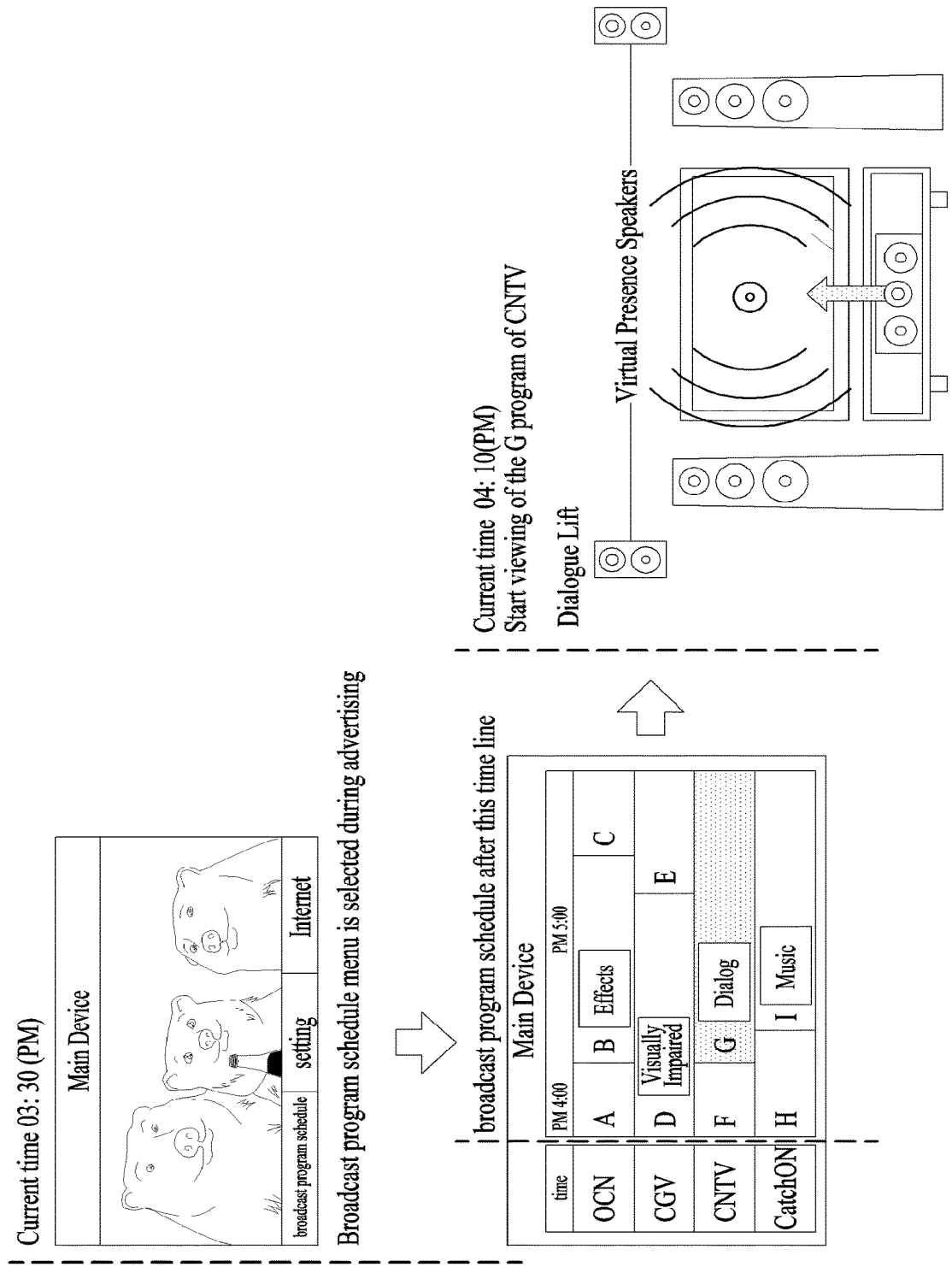
FIG. 96 exemplarily illustrates screen images through which the role of an audio component is displayed on ESG according to another embodiment of the present invention.

FIG. 96 exemplarily illustrates screen images through which the role of an audio component is displayed on ESG according to another embodiment of the present invention.

Referring to FIG. 96, the receiver may receive a request for the broadcast program schedule from the TV viewer, and may display the broadcast program schedule. Information regarding the broadcast program located after the current time may be displayed on the broadcast program schedule. Specific information indicating that the component corresponding to a specific role related to a specific program may be displayed on the ESG. For example, the broadcast program schedule may indicate the presence of the Dialogue component element in the G program. The Dialogue component may correspond to an additional component related to speech (or lines) of a specific actor or actress of the corresponding program. The TV viewer may select the G program providing the Dialogue component, may reproduce the dialogue of the actor or actress of the corresponding program through a separate speaker, and may consume the corresponding content. If the Dialogue component is separately provided, the receiver may also separately adjust the level of the Dialogue component.

Figure 97:
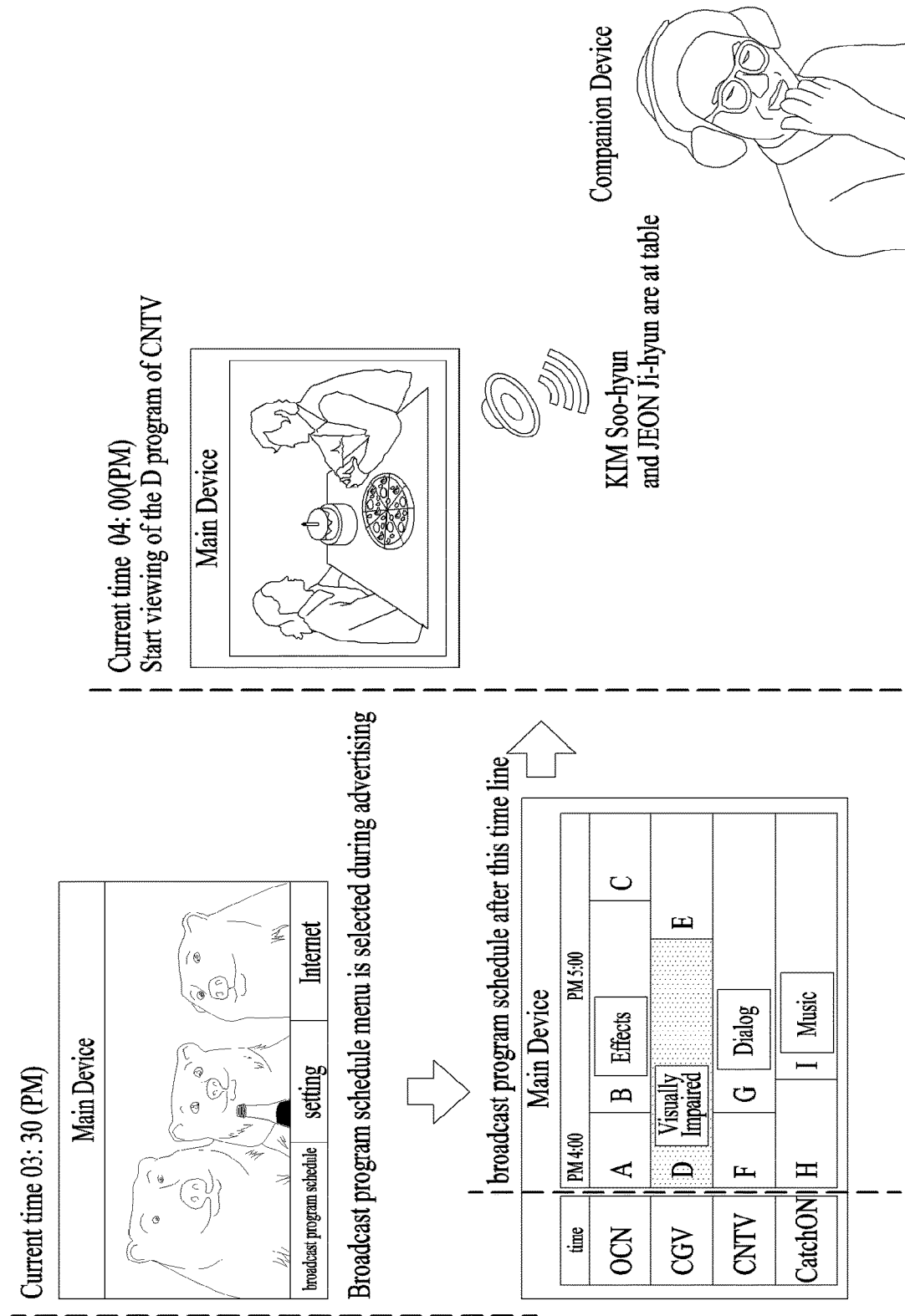
FIG. 97 exemplarily illustrates screen images through which the role of an audio component is displayed on ESG according to another embodiment of the present invention.

FIG. 97 exemplarily illustrates screen images through which the role of an audio component is displayed on ESG according to another embodiment of the present invention.

Referring to FIG. 97, the receiver may receive a request for the broadcast program schedule from the TV viewer, and may display the broadcast program schedule. Information regarding the broadcast program located after the current time may be displayed on the broadcast program schedule. Specific information indicating that the component corresponding to a specific role related to a specific program may be displayed on the ESG. For example, the broadcast program schedule may indicate the presence of the Visually Impaired component element in the D program. The Visually Impaired component may correspond to the component configured to audibly provide visual content provided from the corresponding program. The Visually Impaired component may be used to provide the visually handicapped person (blind) with audible description related to the corresponding program. The TV viewer may select the program D configured to provide the Visually Impaired component, and thus consume the content corresponding to the Visually Impaired component. In this case, the receiver may reproduce the Visually Impaired component through the main device, may transmit the Visually Impaired component to the companion device, and may thus allow the companion device to reproduce the corresponding component.

Figure 98:
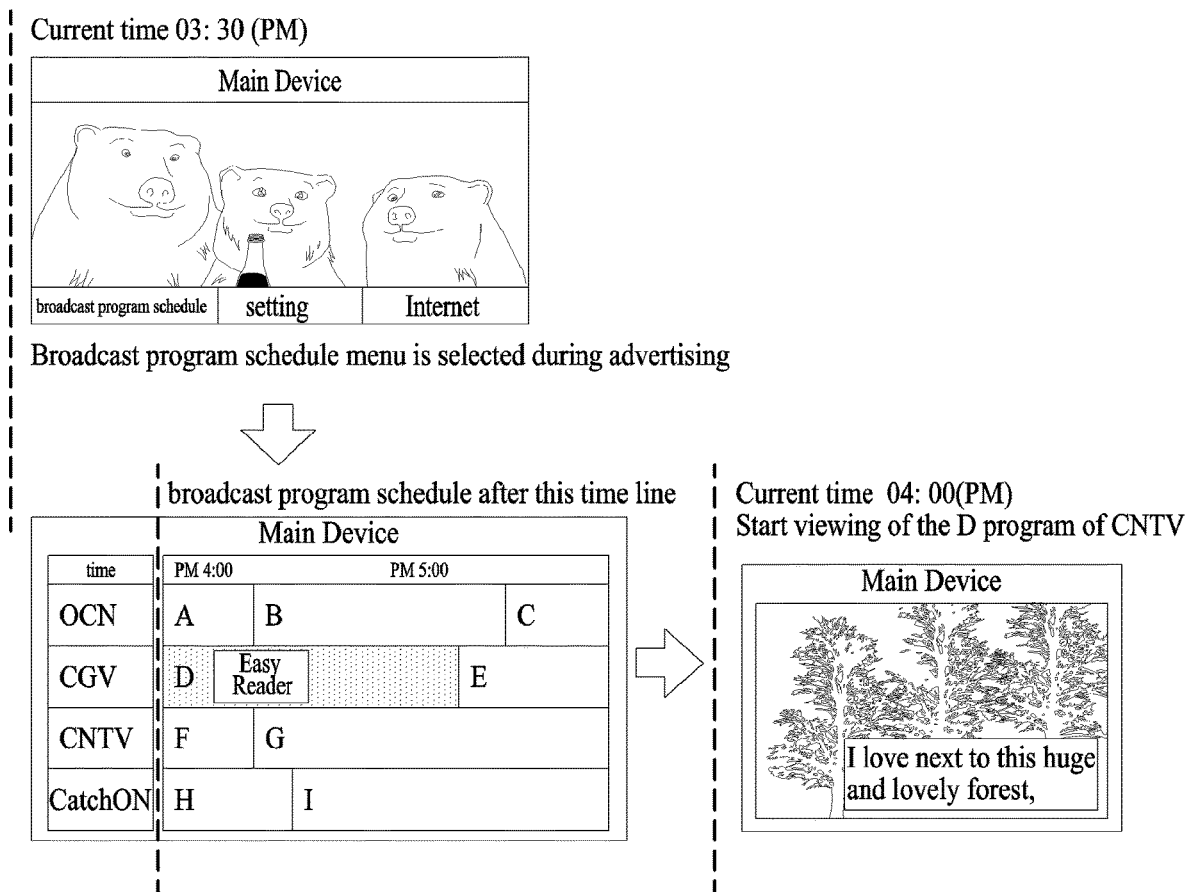
FIG. 98 illustrates an exemplary case in which the role of a Closed Caption (CC) component is displayed on ESG according to an embodiment of the present invention.

FIG. 98 illustrates an exemplary case in which the role of a Closed Caption (CC) component is displayed on ESG according to an embodiment of the present invention.

Referring to FIG. 98, the receiver may receive a request for the broadcast program schedule from the TV viewer, and may display the broadcast program schedule. Information regarding the broadcast program located after the current time may be displayed on the broadcast program schedule. Specific information indicating that the component corresponding to a specific role related to a specific program may be displayed on the ESG. For example, the broadcast program schedule may indicate the presence of the Easy Reader component element in the D program. The Easy Reader component may correspond to the component configured to provide caption or subtitles of the content of the corresponding broadcast program. The caption or subtitles may be constructed in one or more languages. The TV viewer may select the D program configured to provide the Easy Reader component, and may consume the content corresponding to the Easy Reader component. In this case, the receiver may reproduce the Easy Reader component through the main device, and may transmit the Easy Reader component to the companion device, such that the companion device can reproduce the corresponding component.

Figure 99:
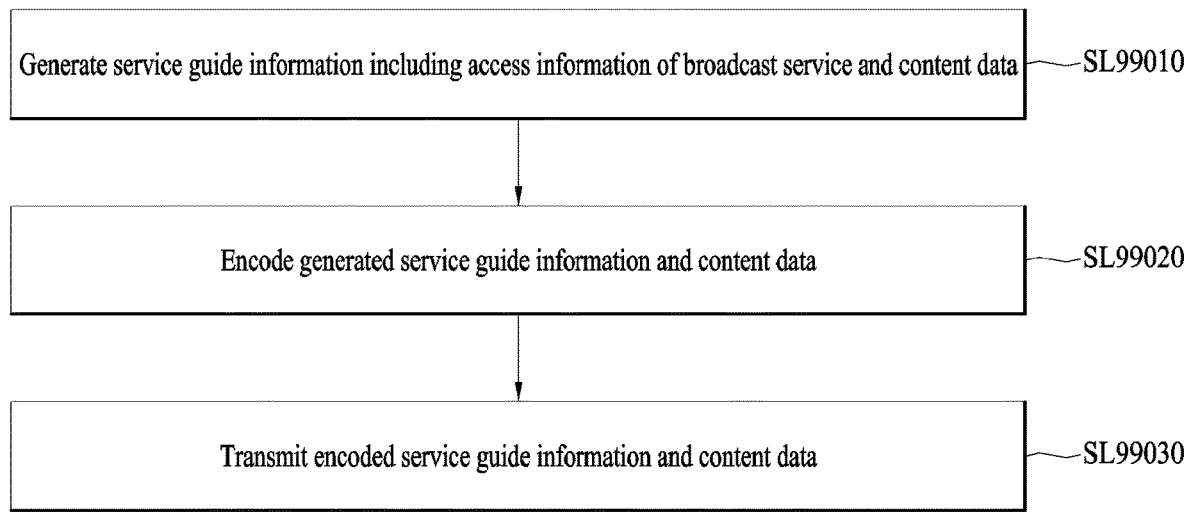
FIG. 99 is a diagram illustrating a broadcast signal transmission method according to an embodiment of the present invention.

FIG. 99 is a flowchart illustrating a method for receiving and processing broadcast signals according to an embodiment of the present invention.

The broadcast signal transmission method according to an embodiment of the present invention may include generating service guide information including access information of a broadcast service and content data (SL99010), encoding the generated service guide information and content data (SL99020), and/or transmitting the encoded service guide information and content data (SL99030). The service guide information may include a service fragment indicating information about the broadcast service. In this case, the service guide information may indicate a service guide and the service fragment may indicate a Service fragment.

According to another embodiment of the present invention, the service fragment may include service type information indicating the type of the broadcast service. In this case, the type of the broadcast service indicated by the service type information may include a linear service (Linear Service) that provides broadcast schedule information as well, an application based service (Appbased Service), and/or a companion screen service (CompanionScreen Service) using a companion device. In this case, the service type information may indicate information included in a ServiceType element. A detailed description thereof has been given with reference to FIGS. 27, 28, 29, and 30.

According to another embodiment of the present invention, the service guide information may include a component fragment indicating information about a component included in the broadcast service. The component fragment may include information that identifies the component fragment, component type information indicating the type of the component, and/or component role information indicating the role of the component. In this case, the component fragment may indicate a Component fragment. The information that identifies the component fragment may indicate information included in an id attribute. The component type information may indicate information included in a ComponentType element and the component role information may indicate information included in a ComponentRole element. A detailed description thereof has been given with reference to FIGS. 31, 32, 60, 61, and 62.

According to another embodiment of the present invention, the type of the component indicated by the component type information may include a continuous component (Continuous component) indicating a component represented in one continuous stream, an elementary component (Elementary component) indicating an independently encoded component, a composite component (Composite component) indicating a component that can be combined for one presentation, and/or a pick-one component (PickOne component) indicating a component selected for one presentation. A detailed description thereof has been given with reference to FIG. 63.

According to another embodiment of the present invention, the component role information may indicate that the component performs the role of a base layer for scalable video encoding, an enhancement layer for scalable video encoding, a left-eye image of 3D video, a right-eye image of 3D video, depth information of 3D video, music audio, dialog audio, and/or caption for children. In this case, the base layer for scalable video encoding may indicate a Base layer for scalable video encoding, the enhancement layer for scalable video encoding may indicate an Enhancement layer for scalable video encoding with level, the left-eye image of 3D video may indicate a 3D video left view, the right-eye image of 3D video may indicate a 3D video right view, the depth information of 3D video may indicate 3D video depth information, the music audio may indicate Music, the dialog audio may indicate Dialog, and the caption for children may indicate Easy reader. A detailed description thereof will be given with reference to FIG. 64.

Figure 100:
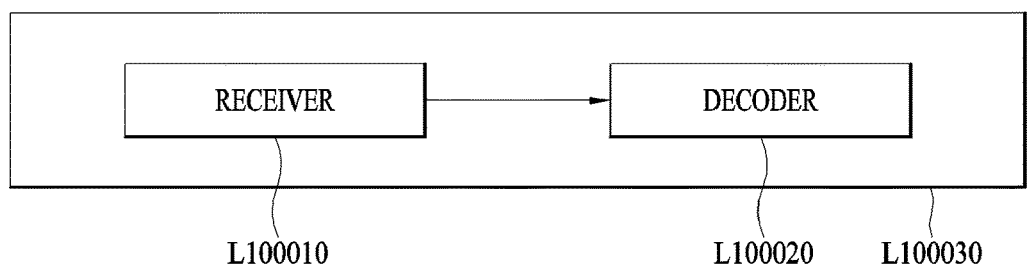
FIG. 100 is a diagram illustrating a broadcast signal reception apparatus according to an embodiment of the present invention.

FIG. 100 is a diagram illustrating a broadcast signal reception apparatus according to an embodiment of the present invention.

A broadcast signal reception apparatus L100030 according to an embodiment of the present invention may include a receiver L100010 and/or a decoder L100020.

The receiver may receive service guide information including access information of a broadcast service and/or content data. The service guide information may include a service fragment indicating information about the broadcast service.

The decoder may decode the received service guide information and/or content data.

According to another embodiment of the present invention, the service fragment may include service type information indicating the type of the broadcast service. In this case, the type of the broadcast service indicated by the service type information may include a linear service (Linear Service) that provides broadcast schedule information, an application based service (Appbased Service), and/or a companion screen service (CompanionScreen Service) using a companion device. In this case, the service type information may indicate information included in a ServiceType element. A detailed description thereof has been given with reference to FIGS. 27, 28, 29, and 30.

According to another embodiment of the present invention, the service guide information may include a component fragment indicating information about a component included in the broadcast service. The component fragment may include information that identifies the component fragment, component type information indicating the type of the component, and/or component role information indicating the role of the component. In this case, the component fragment may indicate a Component fragment. The information that identifies the component fragment may indicate information included in an id attribute. The component type information may indicate information included in a ComponentType element and the component role information may indicate information included in a ComponentRole element. A detailed description thereof has been given with reference to FIGS. 31, 32, 60, 61, and 62.

According to another embodiment of the present invention, the type of the component indicated by the component type information may include a continuous component (Continuous component) indicating a component represented in one continuous stream, an elementary component (Elementary component) indicating an independently encoded component, a composite component (Composite component) indicating a component that can be combined for one presentation, and/or a pick-one component (PickOne component) indicating a component selected for one presentation. A detailed description thereof has been given with reference to FIG. 63.

According to another embodiment of the present invention, the component role information may indicate that the component performs the role of a base layer for scalable video encoding, an enhancement layer for scalable video encoding, a left-eye image of 3D video, a right-eye image of 3D video, depth information of 3D video, music audio, dialog audio, and/or caption for children. In this case, the base layer for scalable video encoding may indicate a Base layer for scalable video encoding, the enhancement layer for scalable video encoding may indicate an Enhancement layer for scalable video encoding with level, the left-eye image of 3D video may indicate a 3D video left view, the right-eye image of 3D video may indicate a 3D video right view, the depth information of 3D video may indicate 3D video depth information, the music audio may indicate Music, the dialog audio may indicate Dialog, and the caption for children may indicate Easy reader. A detailed description thereof will be given with reference to FIG. 64.

Figure 101:
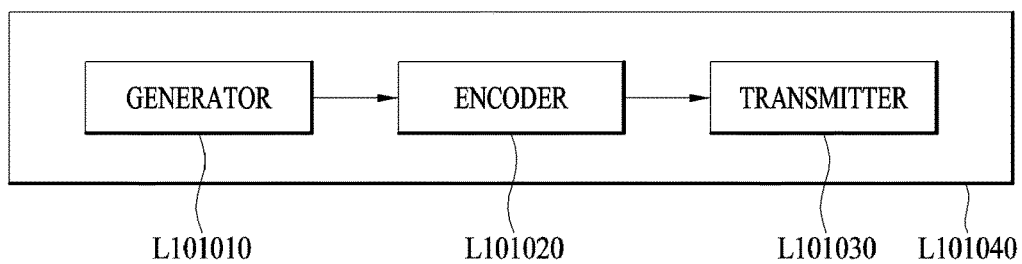
FIG. 101 is a diagram illustrating a broadcast signal transmission apparatus according to an embodiment of the present invention.

FIG. 101 is a diagram illustrating a broadcast signal transmission apparatus according to an embodiment of the present invention.

A broadcast signal transmission apparatus L101040 according to an embodiment of the present invention may include a generator L101010, an encoder L101020, and/or a transmitter L101030.

The generator may generate service guide information including access information of a broadcast service and content data. The service guide information may include a service fragment indicating information about the broadcast service.

The encoder may encode the generated service guide information and content data.

The transmitter may transmit the encoded service guide information and content data.

According to another embodiment of the present invention, the service fragment may include service type information indicating the type of the broadcast service. In this case, the type of the broadcast service indicated by the service type information may include a linear service (Linear Service) that provides broadcast schedule information, an application based service (Appbased Service), and/or a companion screen service (CompanionScreen Service) using a companion device. In this case, the service type information may indicate information included in a ServiceType element. A detailed description thereof has been given with reference to FIGS. 27, 28, 29, and 30.

Figure 102:
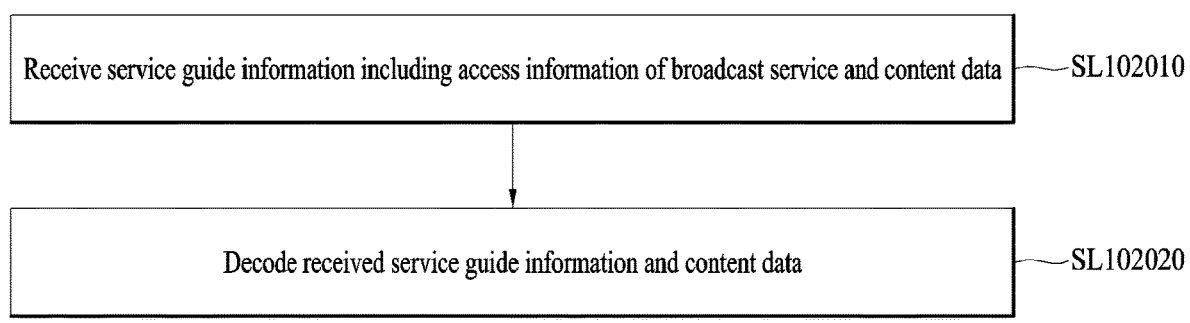
FIG. 102 is a diagram illustrating a broadcast signal reception method according to an embodiment of the present invention.

FIG. 102 is a diagram illustrating a broadcast signal reception method according to an embodiment of the present invention.

The broadcast signal reception method according to an embodiment of the present invention may include receiving service guide information including access information of a broadcast service and content data (SL102010) and/or decoding the received service guide information and content data (SL102020). The service guide information may include a service fragment indicating information about the broadcast service.

Figure 103:
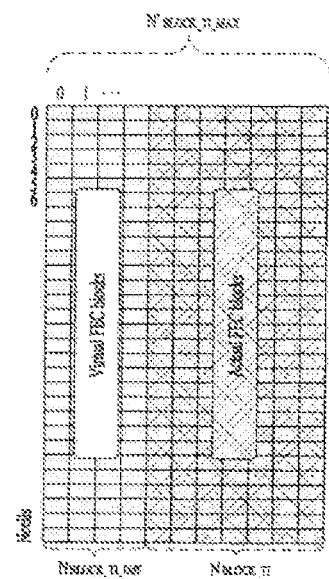
FIG. 103 illustrates virtual FEC blocks in accordance with some embodiments.

FIG. 103 illustrates virtual FEC blocks in accordance with some embodiments. Here, for a TI block having a smaller number of FEC blocks than the maximum number of FEC blocks, one or more virtual FEC blocks corresponding to a difference between the number of FEC blocks and the maximum number of FEC blocks can be added. In some embodiments, one or more virtual FEC blocks are inserted before actual FEC blocks. Subsequently, the time interleaver performs interleaving on the TI block using one twisted row-column block interleaving rule in consideration of the one or more virtual FEC blocks. In addition, the time interleaver performs the aforementioned skip operation when a memory-index corresponding to one or more virtual FEC blocks is generated during reading operation. In the following writing operation, the number of FEC blocks of input TI blocks is matched to the number of FEC blocks of output TI blocks. Thus, loss of data rate of data actually transmitted may be prevented through skip operation even if one or more virtual FEC blocks are inserted in order to perform efficient single-memory deinterleaving in the receiver.

FIG. 103 illustrates virtual FEC blocks in accordance with some embodiments. The left side of the figure shows parameters indicating a maximum number of FEC blocks in a TI block, the actual number of FEC blocks included in a TI block and a difference between the maximum number of FEC blocks and the actual number of FEC blocks, and equations for deriving the number of one or more virtual FEC blocks.

The right side of the figure shows an embodiment of inserting one or more virtual FEC blocks into a TI block. In some embodiments, the one or more virtual FEC blocks can be inserted before actual FEC blocks, as described above.

Figure 104:
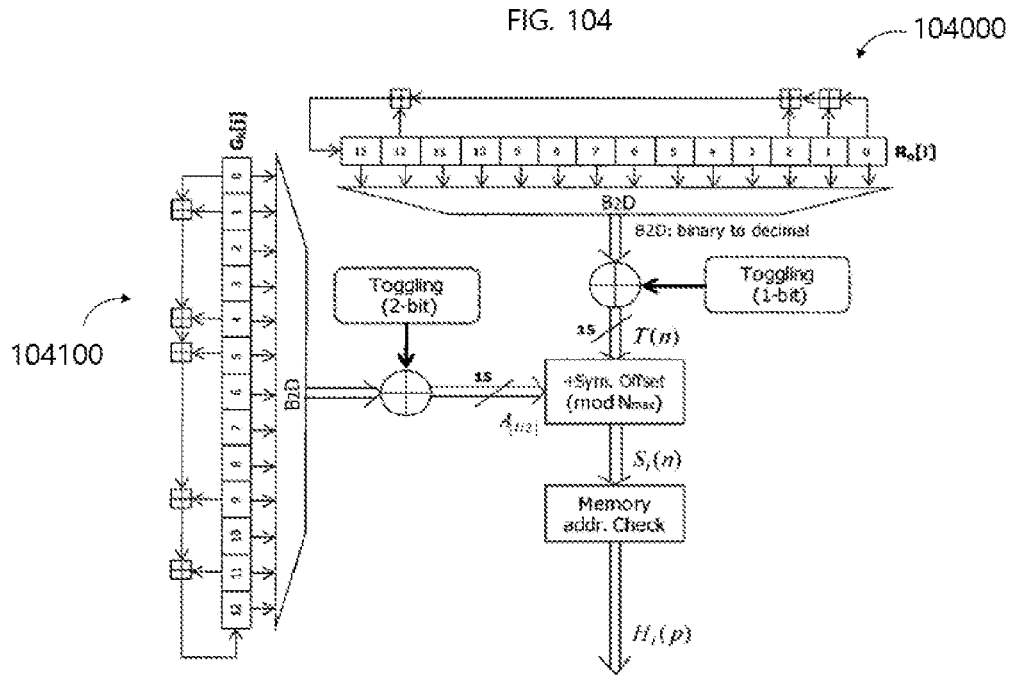
FIG. 104 is a view of a 32K FFT mode random interleaving-sequence generator according to an embodiment of the present invention.

FIG. 104 is a view of a 32K FFT mode random interleaving-sequence generator according to an embodiment of the present invention.

The 32K FFT mode random interleaving-sequence generator according to an embodiment of the present invention may include a spreader (1-bit toggling), a randomizer (104000), a random symbol-offset generator(104100), a modulo operator and a memory-index check. As described above, the random main-seuence generator may include a spreader and a randomizer.

As shown in FIG. 104, the locations of the modulo operator and the memory-index check is changed as compared with the 32K FFT mode random main-seed generator as described above.

The locations of the modulo operator and the memory-index check as shown in FIG. 104 is to increase a frequency deinterleaving performance of the frequency deinterleaver having single memo. As above described, a signal frame (or frame) according to the present invention may have normal data symbol (normal data symbol), frame edge symbol and frame signaling symbol and a length of the frame edge symbol and the frame signaling symbol may be shorter than the normal data symbol. For this reason, a frequency deinterleaving performance of the frequency deinterleaver having single memory can be decreased. In order to increase the frequency deinterleaving performance of the frequency deinterleaver with a single memory, the present invention may provide the location of the memory-index check.

The (cell) spreader may be operated using an upper portion of n-bit of total 15-bit and may function as a multiplexer based on a look-up table. The case of 32K FFT mode, the (cell) spreader may be a 1-bit multiplexer (or toggling).

The randomizer may be operated via a PN generator and may provide full randomness during interleaving. As described above, in the case of 32K FFT mode, the randomizer may be a PN generator that considers 14-bit. This can be changed according to a designer's intention. Also the spreader and the randomizer are operated through multiplexer and PN generator, respectively.

The random symbol-offset generator may generate a symbol-offset for cyclic-shifting main-interleaving-sequence generated by the main-interleaving sequence generator for each pair-wise OFDM symbol. A detailed operation is the same as those describe above and thus are not described here.

The modulo operator may be operated when input value exceeds Ndata or Nmax. The maximum value of the Ndata (Nmax) for 32K FFT mode may be 32768.

The memory-index check may not use output from the modulo operator when a memory-index generated by the spreader and the randomizer is greater than Ndata or the maximum value of the Ndata (Nmax) and may repeatedly operate the spreader and the randomizer to adjust the output memory-index such that the output memory-index does not exceed Ndata or the maximum value of the Ndata (Nmax).

According to another embodiment of the present invention, the service fragment may include service type information indicating the type of the broadcast service. In this case, the type of the broadcast service indicated by the service type information may include a linear service (Linear Service) that provides broadcast schedule information, an application based service (Appbased Service), and/or a companion screen service (CompanionScreen Service) using a companion device. In this case, the service type information may indicate information included in a Service-Type element. A detailed description thereof has been given with reference to FIGS. 27, 28, 29, and 30.

According to another embodiment of the present invention, the service guide information may include a component fragment indicating information about a component included in the broadcast service. The component fragment may include information that identifies the component fragment, component type information indicating the type of the component, and/or component role information indicating the role of the component. In this case, the component fragment may indicate a Component fragment. The information that identifies the component fragment may indicate information included in an id attribute. The component type information may indicate information included in a ComponentType element and the component role information may indicate information included in a ComponentRole element. A detailed description thereof has been given with reference to FIGS. 31, 32, 60, 61, and 62.

The module or unit may be one or more processors designed to execute a series of execution steps stored in the memory (or the storage unit). Each step described in the above-mentioned embodiments may be implemented by hardware and/or processors. Each module, each block, and/or each unit described in the above-mentioned embodiments may be realized by hardware or processor. In addition, the above-mentioned methods of the present invention may be realized by codes written in recoding media configured to be read by a processor so that the codes can be read by the processor supplied from the apparatus.

Although the description of the present invention is explained with reference to each of the accompanying drawings for clarity, it is possible to design new embodiment (s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both the product invention and the process invention are described in the specification and the description of both inventions may be supplementarily applied as needed.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Various embodiments have been described in the best mode for carrying out the invention.

The embodiments of the present invention is available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A device for processing a broadcast signal, the device comprising:
   a tuner to receive the broadcast signal,
   a time deinterleaver to deinterleave the received broadcast signal including DP (Data Pipe) data interleaved by time interleaving operation, the time interleaving operation including:
   linear writing data in a TI (Time interleaving) block including FEC blocks and one or more virtual FEC blocks, wherein the one or more virtual FEC blocks are ahead of FEC blocks in the TI block; and
   diagonal wise reading the written data by skipping cells of the written one or more virtual FEC blocks;
   a decoder to decode the deinterleaved broadcast signal to obtain content data and service guide information,
   the service guide information including a service fragment including information about a broadcast service and one or more content fragments,
   a content fragment including information about a program of the broadcast service and role information representing a role of a component for the program, the content fragment including preview information for the program; and
   a display screen to display program information representing one or more programs based on the service guide information, the program information including first information representing a first role of a first component and second information representing a second role of a second component.

2. The device of claim 1, wherein the display screen is further configured to display the first information on a first portion of the display screen, and to display the second information on a second portion of the display screen.

3. The device of claim 2, wherein the first portion is distinct from the second portion.

4. The device of claim 1, wherein the first component is for a first program and the second component is for a second program that is different from the first program.

5. The device of claim 1, wherein the first component and the second component are for a same program.

6. The device of claim 1, wherein:
   in response to a user input signal for selecting a program of the one or more programs, the display screen is further configured to display content data for the selected program based on the role information related to the selected program.

7. The device of claim 1, wherein the content data includes one or more components, the one or more components including at least one of an audio component, a video component, or a closed caption component,
   a role of an audio component represents whether the audio component is complete main audio component or not,
   a role of a video component represents that the video component is for additional video content that is different from primary video content, and
   a role of a closed caption component represents whether the closed caption component is for easy reader content.

8. A method for processing a broadcast signal, the method comprising:
   receiving the broadcast signal;
   time deinterleaving the received broadcast signal including DP (Data Pipe) data interleaved by time interleaving operation, the time interleaving operation including:
   linear writing data in a TI (Time interleaving) block including FEC blocks and one or more virtual FEC blocks, wherein the one or more virtual FEC blocks are ahead of the FEC blocks in the TI block; and
   diagonal wise reading the written data by skipping cells of the written one or more virtual FEC blocks;
   decoding the broadcast signal to obtain content data and service guide information,
   the service guide information including a service fragment including information about a broadcast service and one or more content fragments,
   a content fragment including information about a program of the broadcast service and role information representing a role of a component for the program, the content fragment including preview information for the program; and
   displaying program information representing one or more programs based on the service guide information, the program information including first information representing a first role of a first component and second information representing a second role of a second component.

9. The method of claim 8, comprising:
   displaying the first information on a first portion of the display screen, and the second information on a second portion of the display screen.

10. The method of claim 9, wherein the first portion is distinct from the second portion.

11. The method of claim 8,
    wherein the first component is for a first program and the second component is for a second program that is different from the first program.

12. The method of claim 8, wherein the first component and the second component are for a same program.

13. The method of claim 8, comprising: wherein:
    in response to a user input signal for selecting a program of the one or more programs, the display screen is further configured to display content data for the selected program based on the role information related to the selected program.

14. The method of claim 8, wherein the content data includes one or more components, the one or more components including at least one of an audio component, a video component, or a closed caption component,
  a role of an audio component represents whether the audio component is complete main audio component or not,
  a role of a video component represents that the video component is for additional video content that is different from primary video content, and
  a role of a closed caption component represents whether the closed caption component is for easy reader content.

15. A device for processing a broadcast signal, the device comprising:
  a tuner to receive the broadcast signal;
  a time deinterleaver to deinterleave the received broadcast signal including DP (Data Pipe) data interleaved by time interleaving operation, the time interleaving operation including:
  linear writing data in a TI (Time interleaving) block including FEC blocks and one or more virtual FEC blocks, wherein the one or more virtual FEC blocks are ahead of the FEC blocks in the TI block; and
  diagonal wise reading the written data by skipping cells of the written one or more virtual FEC blocks;
  a decoder to decode the deinterleaved broadcast signal to obtain content data and service guide information,
  the service guide information including a service fragment including information about a broadcast service and one or more content fragments,
  a content fragment including information about a program of the broadcast service and role information representing a role of a component for the program, the content fragment including preview information for the program; and
  a display screen to display program information representing the program, the role of the component of the program and time information representing program start time of the program, the program information including viewing reservation information representing the program to be viewed from the program start time by reservation, wherein:
  the display screen is configured to display a message indicating whether to view the program from the program start time,
  in response to a user input signal for viewing the program, the display screen is further configured to display the program.

16. A method for processing a broadcast signal, the method comprising:
  receiving the broadcast signal;
  deinterleaving the received broadcast signal including DP (Data Pipe) data interleaved by time interleaving operation, the time interleaving operation including:
  linear writing data in a TI (Time interleaving) block including FEC blocks and one or more virtual FEC blocks, wherein the one or more virtual FEC blocks are ahead of the FEC blocks; and
  diagonal wise reading the written data by skipping cells of the written one or more virtual FEC blocks; and
  decoding the deinterleaved broadcast signal to obtain content data and service guide information,
  the service guide information including a service fragment including information about a broadcast service and one or more content fragments,
  a content fragment including information about a program of the broadcast service and role information representing a role of a component for the program, the content fragment including preview information for the program; and
  displaying program information representing the program, the role of the component of the program and time information representing program start time of the program, the program information including viewing reservation information representing the program to be viewed from the program start time by reservation, wherein displaying program information representing the program comprising:
  displaying a message indicating whether to view the program from the program start time,
  in response to a user input signal for viewing the program, the display screen is further configured to display the program.

* * * * *